(12) United States Patent
Zhang et al.

(10) Patent No.: US 11,653,234 B2
(45) Date of Patent: May 16, 2023

(54) CLUSTERING CELL SITES ACCORDING TO SIGNALING BEHAVIOR

(71) Applicant: AT&T Intellectual Property I, L.P., Atlanta, GA (US)

(72) Inventors: Rensheng Zhang, Holmdel, NJ (US); Yaron Koral, Cherry Hill, NJ (US); Arun Jotshi, Parsippany, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 64 days.

(21) Appl. No.: 17/202,999

(22) Filed: Mar. 16, 2021

(65) Prior Publication Data

US 2022/0303796 A1    Sep. 22, 2022

(51) Int. Cl.
*H04W 24/08*    (2009.01)
*G06N 3/04*    (2006.01)
*H04L 43/0823*    (2022.01)

(52) U.S. Cl.
CPC .......... *H04W 24/08* (2013.01); *G06N 3/0454* (2013.01); *H04L 43/0823* (2013.01)

(58) Field of Classification Search
CPC .. H04W 24/08; G06N 3/0454; H04L 43/0823
See application file for complete search history.

(56) References Cited

U.S. PATENT DOCUMENTS

| | | |
|---|---|---|
| 8,255,994 B2 | 8/2012 | Upadhyay et al. |
| 9,363,278 B2 | 6/2016 | Maria |
| 9,992,212 B2 | 6/2018 | Hearn et al. |
| 10,397,892 B2 | 8/2019 | Vrzic et al. |
| 2006/0276173 A1 | 12/2006 | Srey et al. |
| 2014/0274019 A1 | 9/2014 | Batchu et al. |
| 2016/0277926 A1 | 9/2016 | Molina et al. |
| 2016/0282394 A1* | 9/2016 | House ............ G06F 21/44 |
| 2016/0373467 A1 | 12/2016 | Thyni et al. |

(Continued)

OTHER PUBLICATIONS

Non Final Office Action issued for U.S. Appl. No. 16/847,031 dated Jun. 3, 2022, 23 pages.

(Continued)

*Primary Examiner* — Charles C Jiang
*Assistant Examiner* — Shawn D Miller
(74) *Attorney, Agent, or Firm* — Amin, Turocy & Watson, LLP

(57) ABSTRACT

Cells of a network can be clustered based on signaling behavior, and abnormal signaling conditions against cells can be detected and mitigated. A security management component (SMC) can determine a neural network (NN) of NNs that can be representative of the cell network based on analysis of first signal measurement data associated with the cells. The NN can cluster respective cells into respective clusters based on analysis of second signal measurement data associated with the cells. The NN can determine whether an abnormal signaling condition associated with a cell is occurring based on analysis of third signal measurement data associated with the cells, information relating to the cluster to which the cell is assigned, and a defined network security criterion. SMC can perform feature reforming on the first, second, and/or third signal measurement data to reduce dimensionality of such data to facilitate processing by the NN.

20 Claims, 16 Drawing Sheets

(56) References Cited

U.S. PATENT DOCUMENTS

| | | | |
|---|---|---|---|
| 2018/0007084 A1 | 1/2018 | Reddy et al. | |
| 2019/0028493 A1 | 1/2019 | Endo et al. | |
| 2020/0021994 A1 | 1/2020 | Ranjbar et al. | |
| 2020/0195673 A1 | 6/2020 | Lee | |
| 2020/0320106 A1 | 10/2020 | Goldfarb | |
| 2021/0144555 A1 | 5/2021 | Kim et al. | |
| 2021/0306372 A1 | 9/2021 | Koral et al. | |
| 2021/0321259 A1 | 10/2021 | Louafi et al. | |
| 2022/0038157 A1* | 2/2022 | Ali | H04B 17/382 |
| 2022/0086636 A1 | 3/2022 | Trakinat et al. | |
| 2022/0104114 A1 | 3/2022 | Garcia Martin | |
| 2022/0131966 A1 | 4/2022 | Cai | |
| 2022/0207352 A1* | 6/2022 | Barr | G06F 17/18 |
| 2022/0247786 A1* | 8/2022 | Vavilala | G06N 20/00 |
| 2022/0248296 A1 | 8/2022 | Merwaday et al. | |

OTHER PUBLICATIONS

Notice of Allowance issued for U.S. Appl. No. 16/847,031 dated Oct. 12, 2022, 25 pages.

Non Final Office Action issued for U.S. Appl. No. 17/187,208 dated Aug. 22, 2022, 25 pages.

Non Final Office Action received for U.S. Appl. No. 17/475,069 dated Jan. 6, 2023, 73 pages.

Notice of Allowance received for U.S. Appl. No. 17/187,208 dated Jan. 9, 2023, 25 pages.

* cited by examiner

US 11,653,234 B2

CLUSTERING CELL SITES ACCORDING TO SIGNALING BEHAVIOR

TECHNICAL FIELD

This disclosure relates generally to electronic communications, e.g., to clustering cell sites according to signaling behavior.

BACKGROUND

Communication devices can communicate data to other communication devices via a communication network. For example, a wireless device (e.g., mobile, cell, or smart phone; electronic tablet or pad; Internet of Things (IoT) device; or other type of wireless device) can connect to and communicate with a wireless communication network (e.g., core network), via a base station associated with the wireless communication network, to communicate with another communication device connected to the wireless communication network or to another communication network (e.g., Internet Protocol (IP)-based network, such as the Internet) associated with (e.g., communicatively connected to) the wireless communication network. The wireless device can, for instance, communicate information to a base station and associated wireless communication network (e.g., core network) via an uplink and can receive information from the base station (and associated wireless communication network) via a downlink.

The above-described description is merely intended to provide a contextual overview regarding electronic communications, and is not intended to be exhaustive.

DETAILED DESCRIPTION

Figure 1:
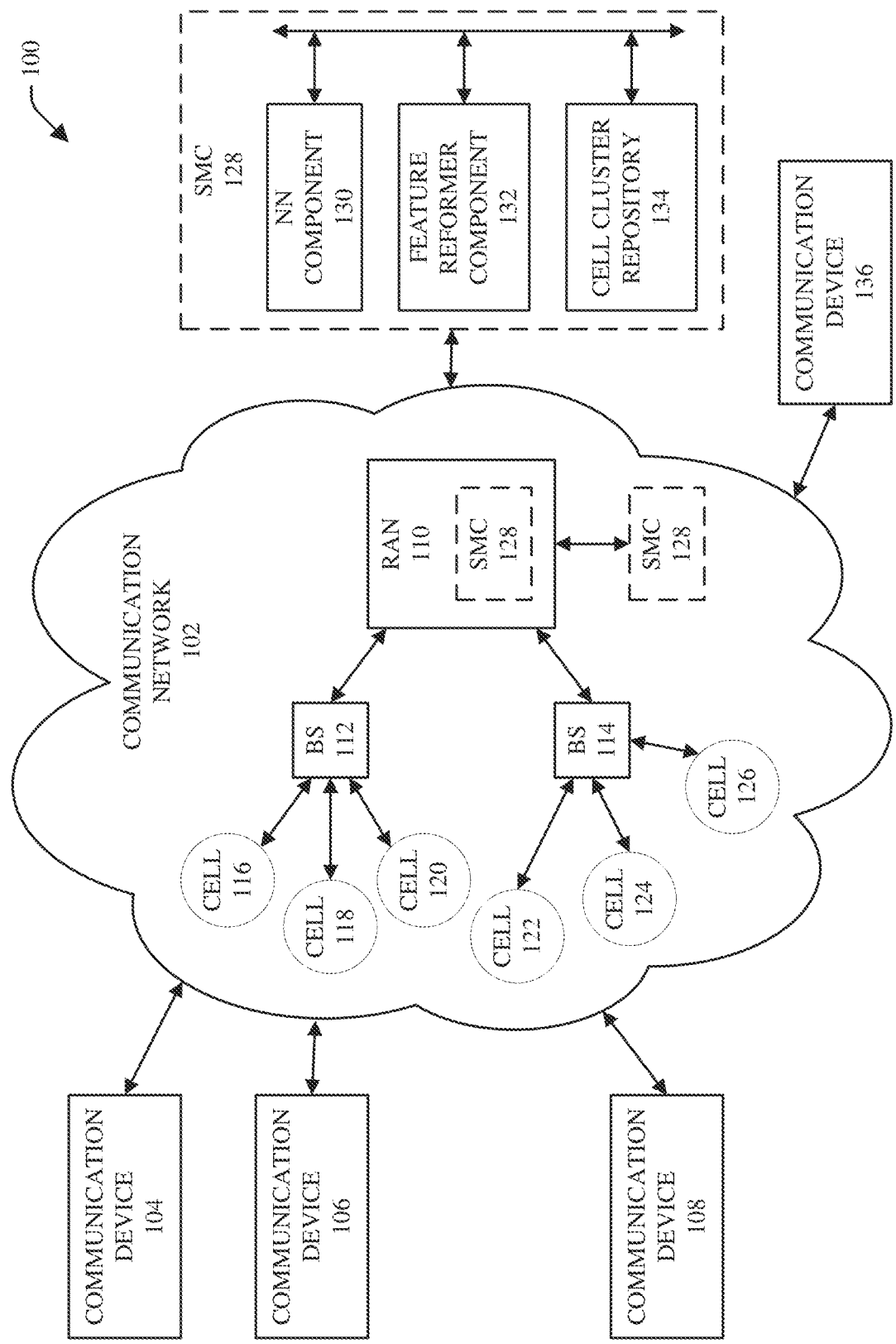
FIG. 1 illustrates a block diagram of an example system that can desirably cluster cells of a communication network (e.g., core or cellular network) based on signaling characteristics, and detect abnormal signaling conditions associated with cells, to facilitate detecting and mitigating aggressive signaling and/or malicious events by communication devices against cells, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Discussed herein are various aspects that relate to classifying and clustering cells of a communication network (e.g., core or cellular network) according to the respective normal signaling behavior associated with the cells to facilitate detecting abnormal behavior (e.g., abnormal or aggressive signaling behavior) associated with a cell(s) due to aggressive (e.g., excessive) signaling by certain communication devices associated with the cell(s). The aggressive signaling can relate to a signaling storm and/or distributed denial of service (DDoS) attack being executed by certain communication devices against the cell(s). The disclosed subject matter can employ a desired (e.g., suitable or most accurate) neural network and artificial intelligence (AI) and/or machine learning techniques and algorithms to facilitate desirably (e.g., suitably or optimally) classifying and clustering cells based at least in part on their respective normal signaling behavior. The disclosed subject matter also can generate and present (e.g., display or communicate) an alert (e.g., alert or notification message) in response to detecting abnormal behavior associated with a cell to notifying a device or user regarding the abnormal behavior, and can facilitate performing one or more desired actions (e.g., logging and learning about the abnormal behavior and cause of the abnormal behavior, determining a set of statistics relating to the abnormal behavior and its cause, or performing a mitigation action), which can include a mitigation action(s) (e.g., blocking or throttling communication devices) to mitigate a cause (e.g., excessive signaling by communication devices) of the abnormal behavior, in response to the detected abnormal behavior. The disclosed subject matter can enhance detection and mitigation of aggressive signaling and/or malicious events against cells of the communication network, enable critical communications and/or benign communications to be communicated via the communication network without disruption, enhance the user experience with regard to communications via the communication network, enhance security of the communication network, and enhance network efficiency of the communication network.

The various aspects described herein can relate to new radio, which can be deployed as a standalone radio access technology or as a non-standalone radio access technology assisted by another radio access technology, such as Long Term Evolution (LTE), for example. It should be noted that although various aspects and embodiments have been described herein in the context of 5G, or other next generation networks, the disclosed aspects are not limited to 5G, a universal mobile telecommunications system (UMTS) implementation, an LTE implementation, and/or other network implementations, as the techniques can also be applied in 3G, or 4G systems. For example, aspects or features of the disclosed embodiments can be exploited in substantially any wireless communication technology. Such wireless communication technologies can include UMTS, global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), LTE, LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

As used herein, "5G" can also be referred to as New Radio (NR) access. Accordingly, systems, methods, and/or machine-readable storage media for reducing interference on reference signals from other co-channel reference signals, and improving the channel estimation performance for channel state information (CSI) estimation and data detection, in 5G systems, and other next generation systems, can be desired. As used herein, one or more aspects of a 5G network can comprise, but is not limited to, data rates of several tens of megabits per second (Mbps) supported for tens of thousands of users; at least one gigabit per second (Gbps) that can be offered simultaneously to tens of users (e.g., tens of workers on the same office floor); several hundreds of thousands of simultaneous connections supported for massive sensor deployments; spectral efficiency that can be significantly enhanced compared to 4G; improvement in coverage relative to 4G; signaling efficiency that can be enhanced compared to 4G; and/or latency that can be significantly reduced compared to LTE.

Multiple Input, Multiple Output (MIMO) technology can be employed in communication networks, wherein MIMO technology can be an advanced antenna technique utilized to improve spectral efficiency and, thereby, boost overall system capacity. Spectral efficiency (also referred to as spectrum efficiency or bandwidth efficiency) refers to an information rate that can be transmitted over a given bandwidth in a communication system.

For MIMO, a notation (M×N) can be utilized to represent the MIMO configuration in terms of a number of transmit antennas (M) and a number of receive antennas (N) on one end of the transmission system. Examples of MIMO configurations used for various technologies can include: (2×1), (1×2), (2×2), (4×2), (8×2) and (2×4), (4×4), (8×4). The configurations represented by (2×1) and (1×2) can be special cases of MIMO known as transmit and receive diversity.

In some cases, MIMO systems can significantly increase the data carrying capacity of wireless communications systems. Further, MIMO can be used for achieving diversity gain, which refers to an increase in signal-to-interference ratio due to a diversity scheme and, thus, can represent how much the transmission power can be reduced when the diversity scheme is introduced, without a corresponding performance loss. MIMO also can be used to achieve spatial multiplexing gain, which can be realized when a communications system is transmitting different streams of data from the same radio resource in separate spatial dimensions (e.g., data is sent/received over multiple channels, linked to different pilot frequencies, over multiple antennas). Spatial multiplexing gain can result in capacity gain without the need for additional power or bandwidth. In addition, MIMO can be utilized to realize beamforming gain. Due to the benefits achieved, MIMO can be an integral part of the third generation wireless system and the fourth generation wireless system. In addition, 5G systems also will employ massive MIMO systems (e.g., hundreds of antennas at the transmitter side and receiver side). Typically, with a ($N_t$, $N_r$), where $N_t$ denotes the number of transmit antennas and $N_r$ denotes the number of receive antennas, the peak data rate can multiply with a factor of $N_t$ over single antenna systems in a rich scattering environment.

Communication devices can communicate information (e.g., voice and/or data traffic) to other communication devices via a communication network, which can comprise a core network that can operate to enable wireless communication between communication devices. For example, a wireless communication device (e.g., mobile, cell, or smart phone; electronic tablet or pad; computer; or other type of communication device) can connect to and communicate with a wireless communication network (e.g., core network) to communicate with another communication device connected to the wireless communication network or to another communication network (e.g., Internet Protocol (IP)-based network, such as the Internet) associated with (e.g., communicatively connected to) the wireless communication network.

Communication devices can operate and communicate via wireless or wireline communication connections (e.g., communication links or channels) in a communication network to perform desired transfers of data (e.g., voice and/or data communications), utilize services, engage in transactions or other interactions, and/or perform other operations. In addition to wireless phones, electronic pads or tablets, and computers being used and connected to the communication network, increasingly Internet of Things (IoT) devices are being used and connected to the communication network. The number of IoT devices being employed is expected to increase exponentially into the tens of billions of IoT devices, which has been referred to as massive IoT. Massive IoT can be one of the key service drivers for 5G and other next generation communication networks.

Many IoT devices can have security vulnerabilities, such as, for example, Zero Day vulnerabilities, which can be security holes or flaws in the software of the IoT devices that can be unknown to the vendor and can be exploited by malicious users (e.g., hackers or criminals). Malicious users can exploit such vulnerabilities in IoT devices, for example, to create botnet armies by infecting IoT devices with stealthy malware (e.g., by surreptitiously installing stealthy malware on IoT devices). This security threat can be expected to increase in magnitude due to the "massive" factor in massive IoT.

One of the main goals of these botnet armies of infected IoT devices can be to disrupt communication services, including mission critical 5G and other next generation services, of a communication network by means of DDoS attacks, which also are known as signaling storms, which can be characterized surges of a relatively large number of signaling messages generated by one or more communication devices. Since 5G and other next generation communication networks will facilitate massive IoT accessing the 5G and other next generation radio access network (RAN), this can increase the risk of RAN resource (e.g., 5G or other next generation RAN resource) overload by means of DDoS attacks disrupting services, including mission critical 5G and other next generation services, of the communication network.

Core networks (e.g., mobility network) today do not have adequate protection against DDoS attacks originated from devices that are connected to the network. Currently, this is not expected to change with 5G networks. Yet, 5G networks can be expected to support a significantly larger number of devices, including massive IoT. Therefore, the threat landscape posed by attacks originated by devices toward their network can be expected to grow significantly over the coming years.

While 3GPP standards do set some limits to the rate of signaling messages each communication device is allowed to generate, it is often the case that devices do exceed this limit by design and are able to override or get around such limits. For example, connected automobiles cannot allow the implementation of the back off time defined by 3GPP to wait 12 minutes after a few failed attach attempts to the core network. Connected automobiles have to be connected earlier than that 12 minute time period. Because of this, connected automobile vendors override this mechanism to enable connected automobiles to avoid implementing the back off time and, even after a few failed attach attempts, connected automobiles still can continue to make attach attempts without waiting 12 minutes before doing so. While this is not unusual for connected automobiles, in other cases, for other types of devices, devices continuing to make attach attempts, after a few failed attach attempts, without waiting in accordance with the back off time can be considered an anomaly. Furthermore, a single aggressive device typically does not pose a risk to the network. Rather, the problem can start when there are a relatively large number of devices (e.g., thousands of devices) that simultaneously act aggressively against a cell or RAN.

Detecting signaling storms can be a challenging task because each cell can have different signaling characteristics and what may be considered normal behavior for one cell can be, in fact, a signaling storm for another cell. Signaling characteristics and other characteristics of cells can vary based at least in part on a variety of factors, including, for example, the activity level associated with a cell, location of the cell, terrain geography of the cell site of the cell, and/or other factors. For instance, a first cell or base station may be in a busy metropolitan area, a second cell or base station may be located in a relatively rural and less busy area, a third cell or base station may be located in an area where there are various significant obstructions (e.g., hills, mountains, or tall buildings) that can impact the operation of the third cell or base station. A relatively high amount of signaling at a cell may be the norm for a cell located in a busy metropolitan area, while a relatively high amount of signaling at a cell in a rural area may be an extreme anomaly. Another issue can be that a cell may be located near a busy terminal of a subway station or an airport where all incoming passengers reconnect their devices (e.g., mobile phones) simultaneously or substantially simultaneously because they just came out of a tunnel of the subway station or just got off a plane at the airport. This can result in a lot of devices sending signals to the cell simultaneously or substantially simultaneously, which is not abnormal under the circumstances. Further, it can be difficult and/or impractical to build a profile for each cell in a core network, since a core network can have hundreds of thousands of cells. Managing this magnitude of separate cell profiles and configurations can be undesirably expansive. It can be desirable to have a dedicated policy for determining whether a cell is under abnormal signaling storm conditions or not though.

There have been a few limited attempts to deal with attacks that originate from devices within the network itself. However, traditional efforts to try to protect the cellular network from attacks by devices originated in the Internet or other carrier networks, and are not adequate or sufficient to detect and mitigate attacks by devices within the cellular network. Also, traditional techniques tend to merely focus on blocking devices, sometimes indiscriminately, and these traditional techniques are further deficient in that they do not provide a dedicated anomaly detection configuration for each cell.

To that end, techniques for clustering cells of a network based on signaling behavior, and detecting abnormal signaling conditions associated with cells, are presented. A security management component (SMC) can manage a multi-stage process for clustering cells of the network based on signaling behavior of the cells, and detecting abnormal signaling conditions associated with one or more of the cells. The SMC can utilize AI and/or machine learning techniques and neural networks to create (e.g., automatically create, construct, or build) a normal behavior profile (e.g., normal signaling behavior profile) for each cell of a group of cells of the network (e.g., core or cellular network) and group (e.g., cluster) cells with similar behavior to form cell clusters that can have the same anomalous condition detection algorithms and configuration, using a clustering algorithm. The disclosed clustering algorithm for grouping cells into cell clusters can make it feasible to apply desirable (e.g., suitable or optimal) anomalous condition detection algorithms for each cell cluster type, which can thereby enable the detection of anomalous conditions associated with cells to be more accurate, which can reduce or minimize instances of false positive detection. Further, the SMC can provide a mechanism to communicate an alert signal when anomalous behavior associated with a certain cell has been detected by the SMC. This can enable appropriate action to be taken in response to the detected anomalous behavior.

As part of the first stage of the multi-stage process, the SMC can employ a neural network (NN) component that can facilitate determining a desirable NN that can be utilized to determine a desirable (e.g., a most accurate) representation of a communication network (e.g., core or cellular network) of cells. The SMC can employ a feature reformer component that can process (e.g., perform feature reforming on) first signal measurement data representative of first signal measurements (e.g., time series of first signal measurements) of first signals associated with a group of cells to reduce the dimensionality the first signal measurements to respective frequency feature reduced dimensionality vectors associated with the respective cells of the group of cells. Signals can comprise, for example, control signals or other types of signals (e.g., traffic signals, messages, or communications) that can be communicated by communication devices. Control signals can comprise, for example, an attach request signal to request an attachment to a cell or base station (e.g., an initial attach request or an update attach request), a connection request signal to request a connection to the cell or base station, a handover-related signal associated with a handover of a communication device to or from the cell or base station, or another type of control signal.

The NN component can comprise a group of NNs that can be respectively configured based at least in part on respective parameters (e.g., respective encoding and decoding parameters). The SMC or NN component can determine a NN of the group of NNs to utilize to determine a representation (e.g., a most accurate representation) of the cellular network, comprising the group of cells based at least in part on analysis (e.g., respective NN analyses) of the respective frequency feature reduced dimensionality vectors associated with the respective cells. For instance, each NN of the group of NNs can respectively encode the respective frequency feature reduced dimensionality vectors associated with the respective cells to generate respective encoded reduced dimensionality (e.g., 2×1) vectors that can have smaller vector dimensionality than the respective frequency feature reduced dimensionality vectors, in accordance with the respective parameters of the respective NNs. Each NN of the group of NNs also can respectively decode the respective encoded reduced dimensionality vectors associated with the respective cells to generate respective decoded versions of the encoded reduced dimensionality vectors, in accordance with the respective parameters of the respective NNs, wherein the respective decoded vectors can have vector dimensionality that can be the same as the respective frequency feature reduced dimensionality vectors. The NNs essentially can decode the encoded vectors to reconstruct the frequency feature reduced dimensionality vectors as accurately as the NNs can, based at least in part on their respective parameters and configurations. The SMC or NN component can determine and select the NN of the group of NNs that can most accurately represent the cellular network (e.g., determine and select the NN that can most accurately decode the encoded vectors such that the decoded vectors as output by the NN most closely matches the frequency feature vectors input to the NN, as compared to the other NNs of the group of NNs).

The NN can be employed to cluster respective cells into respective clusters based at least in part on the results of an analysis of second signal measurement data representative of second signal measurements of second signals associated with the cells, wherein the second signal measurement data can be different from or same as the first signal measurement data. The feature reformer component can process the second signal measurement data (e.g., time series of second signal measurements) of second signals associated with the group of cells to reduce the dimensionality the second signal measurements to respective frequency feature reduced dimensionality vectors associated with the respective cells. The NN can encode the respective frequency feature reduced dimensionality vectors associated with the respective cells to generate respective encoded reduced dimensionality (e.g., 2×1) vectors that can have smaller vector dimensionality than the respective frequency feature reduced dimensionality vectors, in accordance with the parameters of the NN. The NN can determine the relative proximities (e.g., relative distances or numerical differences) of the respective encoded vectors associated with the respective cells to each other. The NN can cluster (e.g., iteratively cluster) the respective cells based at least in part on the relative proximities of the respective encoded vectors associated with the respective cells to each other, wherein, for example, the NN can cluster (e.g., group) together cells that have encoded vectors that are in relatively close proximity to each other to form a small cluster and can iteratively combine smaller cell clusters in relatively close proximity together to form larger clusters until a desired number of cell clusters is achieved. The SMC or NN can store information relating to the respective clusters of cells in a cell cluster repository, wherein such information can indicate which cells are in which clusters, respective vector ranges of the respective cell clusters, respective characteristics (e.g., signaling-related characteristics or classifications, cell types) of the respective cell clusters and/or respective cells of the clusters, respective geographic locations of the respective cells, and/or other desired information.

Using the cell clusters, the NN can determine whether an abnormal signaling condition associated with a cell is occurring based at least in part on an analysis of third signal measurement data representative of third signal measurements of third signals associated with the cells, information relating to the cluster to which the cell is assigned, and a defined network security criterion. The feature reformer component can process the third signal measurement data (e.g., time series of third signal measurements) of third signals associated with the group of cells to reduce the dimensionality the third signal measurements to respective frequency feature reduced dimensionality vectors associated with the respective cells. The NN can encode the respective frequency feature reduced dimensionality vectors associated with the respective cells to generate respective encoded reduced dimensionality (e.g., 2×1) vectors that can have smaller vector dimensionality than the respective frequency feature reduced dimensionality vectors, in accordance with the parameters of the NN. With regard to a cell of a cell cluster, the NN can compare the encoded reduced dimensionality vector associated with the cell to the vector range associated with the cell cluster to determine whether the encoded reduced dimensionality vector associated with the cell is located within or outside of the vector range of the cell cluster to which the cell has been assigned. If the NN determines that the encoded reduced dimensionality vector is within the vector range of the cell cluster, the NN can determine that no abnormal condition (e.g., no abnormal signaling condition) has been detected with respect to that cell. If, instead, the NN determines that the encoded reduced dimensionality vector is outside of the vector range of the cell cluster, the NN can determine that there is an indication that an abnormal condition (e.g., an abnormal signaling condition) is occurring or has occurred with respect to that cell. If an abnormal condition, or at least an indication of an abnormal condition, associated with a cell has been detected, the SMC or NN can present (e.g., display or communicate) an alert signal (e.g., alert or notification message) regarding the detected abnormal (or potentially abnormal) condition to an interface component, a communication device, and/or a user for consideration and/or further action (e.g., performing a mitigation action or other action).

These and other aspects and embodiments of the disclosed subject matter will now be described with respect to the drawings. It is to be appreciated and understood that, while various aspects and embodiments of the disclosed subject matter are described herein with regard to 5G and other next generation communication networks, the techniques of the disclosed subject matter described herein can be utilized (e.g., applied to), in same or similar form, to 4G communication networks, and the disclosed subject matter includes all such aspects and embodiments relating to implementation of the techniques of the disclosed subject matter to 4G communication networks.

Referring now to the drawings, FIG. 1 illustrates a block diagram of an example system 100 that can desirably cluster cells of a communication network (e.g., core or cellular network) based on signaling characteristics, and detect abnormal signaling conditions associated with cells, to facilitate detecting and mitigating aggressive signaling (e.g., excessive signaling) and/or malicious events (e.g., malicious attacks) by communication devices (e.g., aggressive or malicious communication devices) against cells, in accordance with various aspects and embodiments of the disclosed subject matter. The system 100 can thereby detect aggressive communication devices undesirably acting against a cell (e.g., cell of a radio access network (RAN)) and/or mitigate such aggressive actions against the cell, while allowing other communication devices (e.g., benign, non-aggressive, and/or non-malicious communication devices) to connect and communicate via the cell and/or RAN. The system 100 can comprise a communication network 102 can comprise a mobility core network (e.g., a core, cellular, and/or wireless communication network). In some embodiments, the communication network 102 can comprise or be associated with a packet data network (e.g., an Internet Protocol (IP)-based network, such as the Internet and/or intranet) that can be associated with the mobility core network.

The communication network 102 (e.g., the mobility core network of the communication network 102) can operate to enable wireless communication between communication devices and/or between a communication device and the communication network 102. The communication network 102 can comprise various components, such as network (NW) nodes (e.g., radio network nodes), that can be part of the communication network 102 to facilitate communication of information between devices (e.g., communication devices) that can be associated with (e.g., communicatively connected to) the communication network 102. In some embodiments, the communication network 102 can employ MIMO technology to facilitate data communications between devices (e.g., network devices, communication devices, or other type of device) associated with the communication network 102.

As used herein, the terms "network node," "network node component," and "network component" can be interchangeable with (or include) a network, a network controller, or any number of other network components. Further, as utilized herein, the non-limiting term radio network node, or network node can be used herein to refer to any type of network node serving communications devices and/or connected to other network nodes, network elements, or another network node from which the communications devices can receive a radio signal. In cellular radio access networks (e.g., UMTS networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes also can comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Network nodes can be, for example, Node B devices, base station (BS) devices, access point (AP) devices, TRPs, and radio access network (RAN) devices. Other examples of network nodes can include multi-standard radio (MSR) nodes, comprising: an MSR BS, a gNodeB, an eNodeB, a network controller, a radio network controller (RNC), a base station controller (BSC), a relay, a donor node controlling relay, a BTS, an AP, a transmission point, a transmission node, a Remote Radio Unit (RRU), a Remote Radio Head (RRH), nodes in distributed antenna system (DAS), and the like. In accordance with various embodiments, a network node can be, can comprise, or can be associated with (e.g., communicatively connected to) a network device of the communication network 102.

At given times, one or more communication devices, such as, for example, communication device 104, communication device 106, and communication device 108, can connect or attempt to connect to the communication network 102 to communicate with other communication devices associated with the communication network 102. A communication device (e.g., 104, 106, or 108) also can be referred to as, for example, a device, a mobile device, or a mobile communication device. The term communication device can be interchangeable with (or include) a UE or other terminology. A communication device (or UE or device) can refer to any type of wireless device that can communicate with a radio network node in a cellular or mobile communication system. Examples of communication devices can include, but are not limited to, a device to device (D2D) UE, a machine type UE or a UE capable of machine to machine (M2M) communication, a Personal Digital Assistant (PDA), a tablet or pad (e.g., an electronic tablet or pad), an electronic notebook, a mobile terminal, a cellular and/or smart phone, a computer (e.g., a laptop embedded equipment (LEE), a laptop mounted equipment (LME), or other type of computer), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of health-related device or sensor), a broadband communication device (e.g., a wireless, mobile, and/or residential broadband communication device, transceiver, gateway, and/or router), a dongle (e.g., a Universal Serial Bus (USB) dongle), an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a music or media player, speakers (e.g., powered speakers having wireless communication functionality), an appliance (e.g., a toaster, a coffee maker, a refrigerator, an oven, or other type of appliance having wireless communication functionality), a set-top box, an IP television (IPTV), a device associated or integrated with a vehicle (e.g., automobile, airplane, bus, train, ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs).

It is noted that the various aspects of the disclosed subject matter described herein can be applicable to single carrier as well as to multicarrier (MC) or carrier aggregation (CA) operation of the communication device. The term carrier aggregation (CA) also can be referred to (e.g., interchangeably called) "multi-carrier system," "multi-cell operation," "multi-carrier operation," "multi-carrier" transmission and/or reception. In addition, the various aspects discussed can be applied for Multi RAB (radio bearers) on some carriers (e.g., data plus speech can be simultaneously scheduled).

It is to be appreciated and understood that the terms element (e.g., element in connection with an antenna), elements, and antenna ports also can be used interchangeably, but can carry the same meaning, in this subject disclosure. In some embodiments, more than a single antenna element can be mapped to a single antenna port.

As disclosed, communication network 102 (e.g., the mobility core network of the communication network 102) can comprise various network components or devices, which can include one or more RANs, such as, for example, RAN 110, wherein each RAN can comprise or be associated with a set of base stations (e.g., access points (APs), such as base station (BS) 112 and base station 114, that can serve communication devices located in respective coverage areas served by respective base stations in the mobility core network of the communication network 102. The respective base stations (e.g., base stations 112 and 114) can be associated with one or more sectors (not shown), wherein respective sectors can comprise one or more respective cells, such as, for example, cells 116, 118, 120, 122, 124, and 126.

The one or more cells can have respective coverage areas that can form the coverage area covered by the one or more sectors. The respective communication devices can be communicatively connected to the communication network 102 via respective wireless or wireline communication connections with one or more of the respective cells (e.g., cells 116, 118, 120, 122, 124, or 126).

In some embodiments, the one or more RANs (e.g., RAN 110) can be an open-RAN (O-RAN) that can employ an open interface that can support interoperability of devices (e.g., network devices) from different entities (e.g., vendors). The O-RAN can build or establish wireless connections through virtualization. In certain embodiments, the O-RAN can utilize a common platform that can reduce reliance on proprietary platforms of service providers. The O-RAN also can employ standardized interfaces and application programming interfaces (APIs) to facilitate open source implementation of the O-RAN.

The number of communication devices, particularly IoT devices, being utilized is increasing at a significant rate and can be expected to continue to increase significantly into the future (e.g., increase to tens of billions of devices). While in most instances, the communication devices (e.g., 104, 106, or 108) and associated users can be attempting to connect to the RAN 110 for appropriate or benign reasons, in some instances, aggressive and/or malicious actors can utilize communication devices to attempt to connect to cells (e.g., cells 116, 118, 120, 122, 124, or 126) of the RAN 110 to disrupt (e.g., obstruct or interrupt) services, such as mobility services, provided by the communication network 102, including the RAN 110. For example, malicious actors can utilize communication devices (e.g., 104 or 106), such as IoT devices, and exploit vulnerabilities of such devices (e.g., by installing malware on such communication devices) to initiate a malicious event, such as a DDoS attack, against the RAN 110 or associated cell to overwhelm the RAN 110 (e.g., RAN 110, and/or an associated base station or cell) and disrupt the services provided by the RAN 110 and/or associated communication network 102, including disrupting communication between communication devices (e.g., non-malicious acting communication devices) connected to or attempting to connect to the RAN 110 and/or associated communication network 102, as more fully described herein.

The disclosed subject matter can determine (e.g., intelligently, automatically, and/or dynamically) determine or characterize respective signaling behavior associated with cells (e.g., cells 116, 118, 120, 122, 124, or 126), determine when a cell is or at least appears to be experiencing abnormal signaling behavior, which can indicate that the cell is being subjected to undesirably excessive signaling by communication devices, and can perform (e.g., in real time or substantially in real time) a desired response action (e.g., mitigation action or other action) to respond to the abnormal signaling behavior and/or undesirable event (e.g., excessive signaling and/or malicious event) against the cell or associated RAN (e.g., RAN 110) by certain (e.g., aggressive, malicious, and/or malware infected) communication devices, as more fully described herein.

In some cases, there can be communication devices that are attempting to connect to a RAN 110 (e.g., RAN 110, and/or an associated base station or cell) to communicate benign messages and/or to communicate priority (e.g., high priority or critical) messages, via the RAN 110, to other communication devices associated with the communication network 102. If there is aggressive communication (e.g., aggressive or excessive signaling) and/or a malicious event against the RAN 110, the aggressive communication and/or malicious event, if not mitigated, can disrupt services of the RAN 110 to prevent a communication device attempting to connect and communicate benign or priority message via the RAN 110, and/or, if all communication devices attempting to connect to the RAN 110 during an aggressive communication and/or malicious event were to be blocked from connecting, that can undesirably (e.g., negatively) impact the ability of benign (e.g., non-aggressive or otherwise appropriately acting) communication devices that are attempting to connect to the RAN 110 to communicate benign or priority messages from doing so. The disclosed subject matter can desirably (e.g., intelligently, automatically, and/or dynamically in real time or substantially in real time) manage communication connections of communication devices to the RAN 110 (e.g., RAN 110, and/or an associated base station or cell) and the communication network 102 (e.g., core network), including detecting and mitigating excessive signaling (e.g., aggressive signaling) and/or malicious events (e.g., malicious attacks) by communication devices (e.g., aggressive or malicious communication devices) against the RAN 110, while allowing other communication devices (e.g., non-aggressive and/or non-malicious communication devices) to connect (or remain connected) and communicate via the base station 112 and/or RAN 110.

To that end, in some embodiments, the communication network 102 can comprise or be associated with a security management component (SMC) 128 that can manage various functions and resources of or associated with RANs (e.g., RAN 110) in real time or substantially close (e.g., near) to real time. In some embodiments, the SMC 128 can be part of an O-RAN (e.g., part of an overall architecture of the O-RAN). To facilitate securing the RAN 110 and communication network 102 overall from aggressive and/or malicious communication devices and/or malicious events (e.g., malicious attacks, such as DDoS attacks), the SMC 128 can desirably (e.g., suitably or optimally) group respective cells (e.g., cells 116, 118, 120, 122, 124, or 126) of the communication network 102 (e.g., core or cellular network) into respective cell clusters based at least in part on respective signaling characteristics or behavior associated with respective cells, and can detect abnormal signaling conditions associated with cells, to facilitate detecting and mitigating aggressive signaling (e.g., excessive signaling) and/or malicious events (e.g., malicious attacks) by communication devices (e.g., aggressive or malicious communication devices) against cells and the RAN 110, in accordance with defined communication management criteria, which can comprise defined network security criteria. The SMC 128 also can manage connection of communication devices (e.g., 104, 106, or 108) to the RAN 110 (e.g., manage connection of communication devices during aggressive signaling and/or malicious events), including the cells (e.g., cells 116, 118, 120, 122, 124, or 126) and base stations (e.g., base stations 112 or 114) associated with the RAN 110, in accordance with the defined communication management criteria. In some embodiments, the SMC 128, or a desired portion thereof, can employ or comprise a security application (e.g., anomalous signaling detection, malicious event, and/or DDoS application) to facilitate detecting anomalous signaling conditions associated with cells, facilitate detecting and mitigating aggressive signaling and/or malicious events against the RAN 110, and managing (e.g., controlling) connections of communication devices to the RAN 110. In certain embodiments, the security application can be or can comprise a micro services application (e.g., xApp). In that regard, for instance, as part of the capabilities of the SMC 128 and/or a RAN intelligent controller (RIC) (not explicitly shown) associated with the SMC 128, xApps can be written or implemented on top of the RIC, and the SMC 128, or a desired portion thereof, can be or can comprise the security application, which can be an xApp that can be implemented on top of the RIC.

Communication devices (e.g., 104, 106, or 108) can communicate control signals (e.g., attach requests or other types of control signals) or other types of communications (e.g., other types of signals) to cells (e.g., cells 116, 118, 120, 122, 124, or 126) with which the communication devices are associated, and, accordingly, associated base stations (e.g., base stations 112 or 114) and RAN 110, to facilitate obtaining services or resources from cell, base station, and RAN. For instance, a communication device (e.g., communication device 104) can communicate an initial attach request to the RAN 110 (e.g., via cell 116 and base station 112) to request connection to the RAN 110, can communicate another type of attach request (e.g., update request, such as an authentication update request, a packet data network (PDN) gateway (PGW) update request, or other type of update request) to the RAN 110 to request another type of service or resources from the RAN 110, can communicate a connection request signal to the RAN 110 to request a connection to the cell or base station (e.g., cell 116 or base station 112), can communicate a handover-related signal associated with a handover of a communication device to or from the cell or base station, or can communicate another type of control signal to the RAN 110.

When communication devices (e.g., 104, 106, or 108) communicate control signals (e.g., attach requests or other types of control signals) to the RAN 110 (e.g., via a cell and associated base station), the SMC 128 can receive information comprising or relating to such control signals. The RAN 110 and the SMC 128 can receive the information contained in the control signal (e.g., in an attach request or other type of control signal) from the communication device (e.g., communication device 104) and/or can receive other information (e.g., other control signal-related information) from the communication device or network devices of the communication network 102. For instance, the RAN 110 can receive device identifier information (e.g., international mobile equipment identity (IMEI) number, international mobile subscriber identity (IMSI) number, or other unique device identifier or serial number) that can identify the communication device, device location information that can identify the location of the communication device, device type information that can identify the type of device the communication device is, priority information that can indicate or specify a priority level associated with the communication device or message associated with the communication device, time data (e.g., time stamp data) that can indicate the time of the attach request or type of communication or time(s) associated with another item(s) of attach request-related information, metadata associated with the attach request and/or communication device, and/or other type of control signal-related information.

It is noted that, with regard to the device identifier information (e.g., IMEI, IMSI), while the RAN 110 can receive the device identifiers (e.g., IMEI, IMSI), the device identifiers are not revealed to the RAN 110, because the network is not supposed to reveal device or subscriber identifiers of communication devices in part because it is assumed that the radio interface can be more exposed to or compromised by eavesdropping, and antenna sites potentially can be physically accessed. For this reason, the RAN (e.g., RAN 110) and other network components can utilize temporal (e.g., temporary) random identifiers as a reference to communication devices (e.g., mobile or wireless communication devices) and/or associated subscribers. Examples of temporal random identifiers can comprise cell radio network temporary identifier (C-RNTI) and temporary mobile subscriber identity (TMSI). A C-RNTI can be a temporary unique identifier that can be used, instead of the IMEI, for example, for identifying the RRC connection and scheduling that can be dedicated to a communication device. A TMSI can be a temporary unique identifier that can be used, instead of the IMSI, to ensure or maintain the privacy of the subscriber associated with a communication device.

The SMC 128 can analyze and process the respective signals (e.g., control signals or other signals) received by respective cells (e.g., cells 116, 118, 120, 122, 124, and/or 126) of the communication network 102 over a desired time period (e.g., an hour, a day, a week, a month, or other desired period of time). The SMC 128 can generate signal measurement data based at least in part on the received signals (e.g., raw signal data), wherein the signal measurement data can comprise, for example, respective data regarding respective signal measurements time series associated with respective cells (e.g., cells 116, 118, 120, 122, 124, and/or 126) of the group of cells. The length of time of a signal measurements time series associated with a cell can be virtually any desired length of time (e.g., a day, a week, a month, or other desired length of time) and can have a desired granularity with regard to the timing of measurements of the signals (e.g., measurements every minute, every five minutes, every ten minutes, every fifteen minutes, every hour, every three hours, or every day, or another desired granularity for the signaling measurements). The signal measurement data can have a time dimensionality (e.g., 96×1 time dimensionality, 144×1 time dimensionality, or other time dimensionality) that can be based at least in part on the signaling measurement granularity and the time length of measurements of the signal measurements time series.

The SMC 128 can manage a multi-stage (e.g., three stage) process for clustering cells of the network based on signaling behavior of the cells (e.g., cells 116, 118, 120, 122, 124, and/or 126), and detecting abnormal signaling conditions associated with one or more of the cells. The multi-stage process can comprise a first stage that can involve selection of a desirable neural network (NN) as part of training, a second stage that can involve cell cluster assignment as part of the training, and a third stage that can comprise detecting or identifying outlier cells (e.g., a cell with an abnormal signaling condition). As part of the first stage of the multi-stage process, the SMC 128 can employ a NN component 130 that can facilitate determining a desirable (e.g., suitable, appropriate, optimal, and/or most accurate) NN that can be utilized to determine a desirable (e.g., suitable, appropriate, optimal, and/or most accurate) representation of the communication network 102 (e.g., core or cellular network) of cells, as more fully described herein. The NN component 130 can comprise or can employ a group of NNs, wherein the NN component 130 can initiate, operate, or configure respective NNs of the group of NNs based at least on respective parameters (e.g., encoding parameters, decoding parameters, and/or other desired parameters). For instance, the NN component 130 NN component 130 can initiate, operate, or configure a first NN of the NN group based at least in part on first parameters, initiate, operate, or configure a second NN of the NN group based at least in part on second parameters, and/or initiate, operate, or configure a third NN of the NN group based at least in part on third parameters, and so on, up to a desired number of NNs.

The SMC 128 also can employ a feature reformer component 132 that perform a feature reforming process on respective signal measurement data representative of respective signal measurements of signals associated with respective cells (e.g., cells 116, 118, 120, 122, 124, and/or 126) to reform the signal measurement data with regard to frequency and reduce the dimensionality of the signal measurement data to facilitate desirable processing (e.g., encoding and decoding) of such data by the desired NN or other NNs of the NN group, as more fully described herein. The feature reformer component 132 can perform the feature reforming process on signal measurement data during the first, second, and/or third stage of the multi-stage process. Signals can comprise, for example, control signals or other types of signals (e.g., traffic signals, messages, or communications) that can be communicated by communication devices (e.g., communication devices 104, 106, or 108) to the cells (e.g., cells 116, 118, 120, 122, 124, or 126). Control signals can comprise, for example, an attach request signal to request an attachment to a cell or base station (e.g., an initial attach request or an update attach request), a connection request signal to request a connection to the cell or base station, a handover-related signal associated with a handover of a communication device to or from the cell or base station, or another type of control signal.

For instance, during the first stage of the multi-stage process, the feature reformer component 132 can perform feature reforming first signal measurement data that can be representative of first signal measurements (e.g., respective time series of respective first signal measurements) of first signals associated with respective cells (e.g., cells 116, 118, 120, 122, 124, and/or 126) of the group of cells to transform such data to the frequency domain and reduce the dimensionality the first signal measurements to respective frequency feature reduced dimensionality vectors associated with the respective cells, as more fully described herein. As an example, if the respective times series of the respective first signal measurements associated with the respective cells (e.g., cells 116, 118, 120, 122, 124, and/or 126) is 96×1 (or some other relatively higher dimensionality), the feature reformer component 132 can perform feature reforming on such measurement data to transform such measurement data to the frequency domain and reduce the dimensionality such measurement data to respective frequency feature reduced dimensionality (e.g., 24×1 or 48×1) vectors associated with the respective cells.

The NN component 130 can manage the NNs of the NN group to have each NN of the NN group respectively encode the respective frequency feature reduced dimensionality vectors associated with the respective cells to generate respective encoded reduced dimensionality (e.g., 2×1) vectors that can have smaller vector dimensionality than the respective frequency feature reduced dimensionality vectors associated with the respective cells (e.g., cells 116, 118, 120, 122, 124, and/or 126), in accordance with the respective parameters of the respective NNs. The NN component 130 can manage the NNs of the NN group to have each NN of the NN group respectively decode the respective encoded reduced dimensionality vectors associated with the respective cells (e.g., cells 116, 118, 120, 122, 124, and/or 126) to generate respective decoded versions of the encoded reduced dimensionality vectors, in accordance with the respective parameters of the respective NNs, wherein the respective decoded vectors can have vector dimensionality (e.g., 24×1 or 48×1) that can be the same as the respective frequency feature reduced dimensionality vectors that were input to each of the NNs. Each of the NNs essentially can decode the encoded vectors to reconstruct the frequency feature reduced dimensionality vectors as accurately as each of the NNs can, based at least in part on the respective parameters and configurations of the respective NNs. The NN component 130 (e.g., an NN of the NN component 130) can determine and select the NN of the NN group that can most accurately represent the cellular network as compared to the other NNs of the NN group (e.g., can determine and select the NN that can most accurately decode the encoded vectors such that the decoded vectors as output by the NN most closely matches the frequency feature vectors input to the NN, as compared to the other NNs of the NN group).

During the second stage of the multi-stage process, the SMC 128 can utilize the desired (e.g., most accurate, suitable, or optimal) NN to cluster respective cells (e.g., cells 116, 118, 120, 122, 124, and/or 126) into respective clusters of cells based at least in part on the results of an analysis of second signal measurement data that can be representative of respective second signal measurements of respective second signals associated with the respective cells. In accordance with various embodiments, the second signal measurement data can be different from or same as the first signal measurement data. If the second signal measurement data is different from the first signal measurement data, the feature reformer component 132 can perform feature reforming on the second signal measurement data (e.g., respective time series of second signal measurements) of respective second signals associated with the respective cells (e.g., cells 116, 118, 120, 122, 124, and/or 126) to reduce the dimensionality the second signal measurements to respective frequency feature reduced dimensionality vectors associated with the respective cells. The NN (e.g., as controlled by the NN component 130) can encode the respective frequency feature reduced dimensionality vectors associated with the respective cells to generate respective encoded reduced dimensionality (e.g., 2×1) vectors that can have smaller vector dimensionality than the respective frequency feature reduced dimensionality (e.g., 24×1 or 48×1) vectors, in accordance with the parameters of the NN. The NN (e.g., as controlled by the NN component 130) can determine the relative proximities (e.g., relative distances or numerical differences) of the respective encoded vectors associated with the respective cells to each other.

The NN (e.g., as controlled by the NN component 130) can cluster (e.g., iteratively cluster) the respective cells (e.g., cells 116, 118, 120, 122, 124, and/or 126) into a desired number of respective clusters based at least in part on the relative proximities of the respective encoded vectors associated with the respective cells to each other, in accordance with defined network security criteria. For example, the NN can cluster (e.g., group) together cells that have encoded vectors that are in relatively close proximity to each other to form a small cluster and can iteratively combine smaller cell clusters in relatively close proximity together to form larger clusters until a desired number of cell clusters is achieved. The NN component 130 or NN can store information relating to the respective clusters of cells in a cell cluster repository 134 of or associated with the SMC 128, wherein such cell cluster information can indicate which cells are in which cell clusters, respective vector ranges of the respective cell clusters, respective characteristics (e.g., signaling-related characteristics or classifications, cell types, and/or other characteristics) of the respective cell clusters and/or respective cells of the respective cell clusters, respective geographic locations of the respective cells, and/or other desired information.

During the third stage of the multi-stage process, using the cell clusters, the NN (e.g., as controlled by the NN component 130) can determine whether an abnormal (e.g., anomalous) signaling condition associated with a cell (e.g., cells 116, 118, 120, 122, 124, or 126) is occurring or has occurred based at least in part on an analysis of third signal measurement data that can be representative of respective third signal measurements of respective third signals associated with the respective cells, information relating to the cluster to which the cell is assigned, and the defined network security criteria. The feature reformer component 132 can perform feature reforming on the third signal measurement data (e.g., respective time series of third signal measurements) of respective third signals associated with the respective cells (e.g., cells 116, 118, 120, 122, 124, and/or 126) to reduce the dimensionality the third signal measurements to respective frequency feature reduced dimensionality vectors associated with the respective cells. The NN (e.g., as controlled by the NN component 130) can encode the respective frequency feature reduced dimensionality vectors associated with the respective cells to generate respective encoded reduced dimensionality (e.g., 2×1) vectors that can have smaller vector dimensionality than the respective frequency feature reduced dimensionality (e.g., 24×1 or 48×1) vectors, in accordance with the parameters of the NN. With regard to a cell (e.g., cells 116, 118, 120, 122, 124, or 126) of a cell cluster, the NN (e.g., as controlled by the NN component 130) can compare the encoded reduced dimensionality vector associated with the cell to the vector range associated with the cell cluster to determine whether the encoded reduced dimensionality vector associated with the cell is located within or outside of the vector range of the cell cluster to which the cell has been assigned. If the NN determines that the encoded reduced dimensionality vector is within the vector range of the cell cluster, the NN (e.g., as controlled by the NN component 130) can determine that no abnormal condition (e.g., no abnormal signaling condition) has been detected with respect to that cell. If, instead, the NN determines that the encoded reduced dimensionality vector is outside of the vector range of the cell cluster, the NN (e.g., as controlled by the NN component 130) can determine that there is at least an indication that an abnormal condition (e.g., an abnormal signaling condition) is occurring or has occurred with respect to that cell. If an abnormal condition, or at least an indication of an abnormal condition, associated with a cell (e.g., cells 116, 118, 120, 122, 124, or 126) has been detected, the SMC 128 can present (e.g., display or communicate) an alert signal (e.g., alert or notification message) regarding the detected abnormal (or potentially abnormal) condition to an interface component, a communication device (e.g., communication device 136), and/or a user for consideration and/or further action (e.g., performing a mitigation action or other action), such as more fully described herein.

Figure 2:
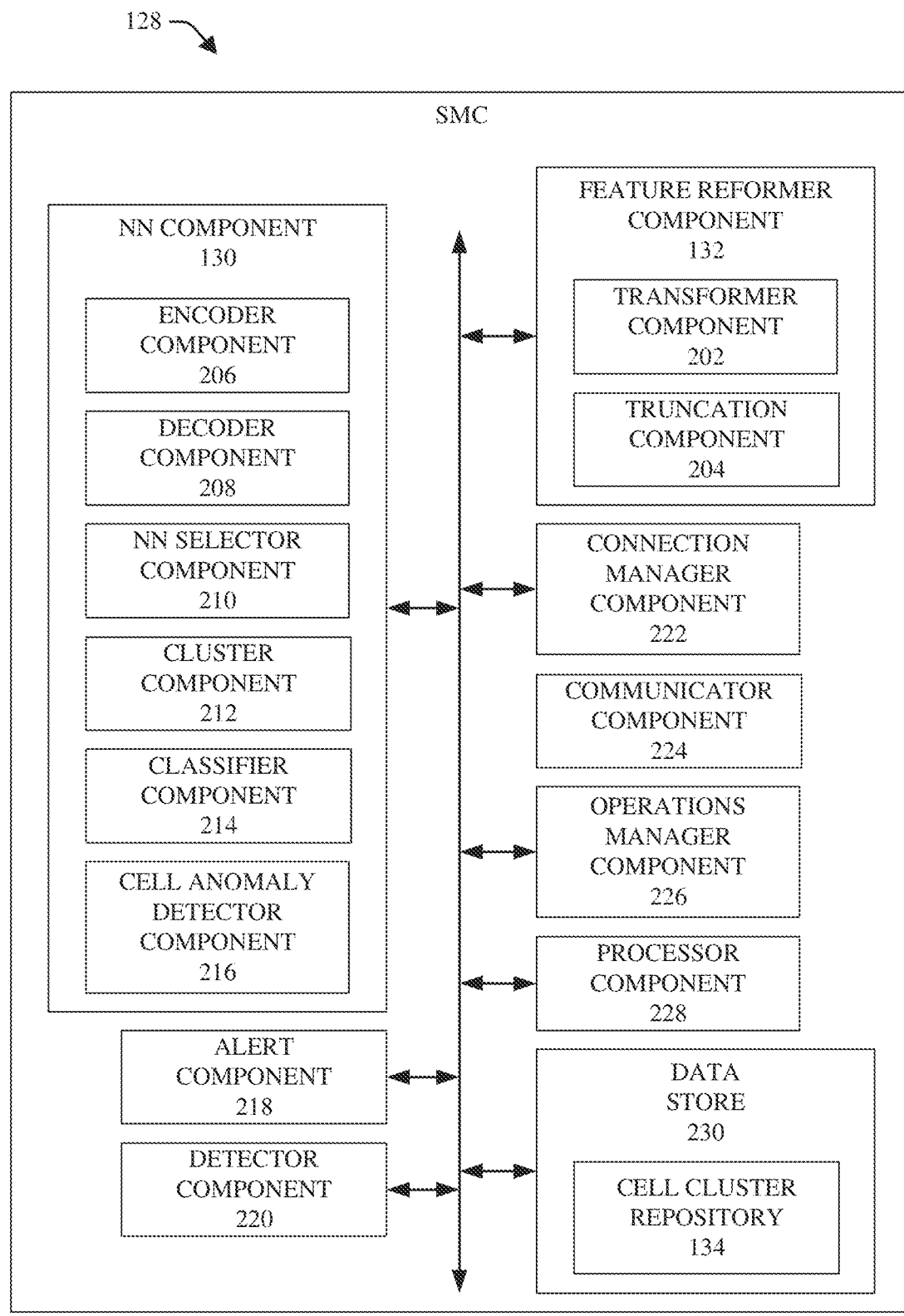
FIG. 2 depicts a block diagram of an example security management component, in accordance with various aspects and embodiments of the disclosed subject matter.
Figure 3:
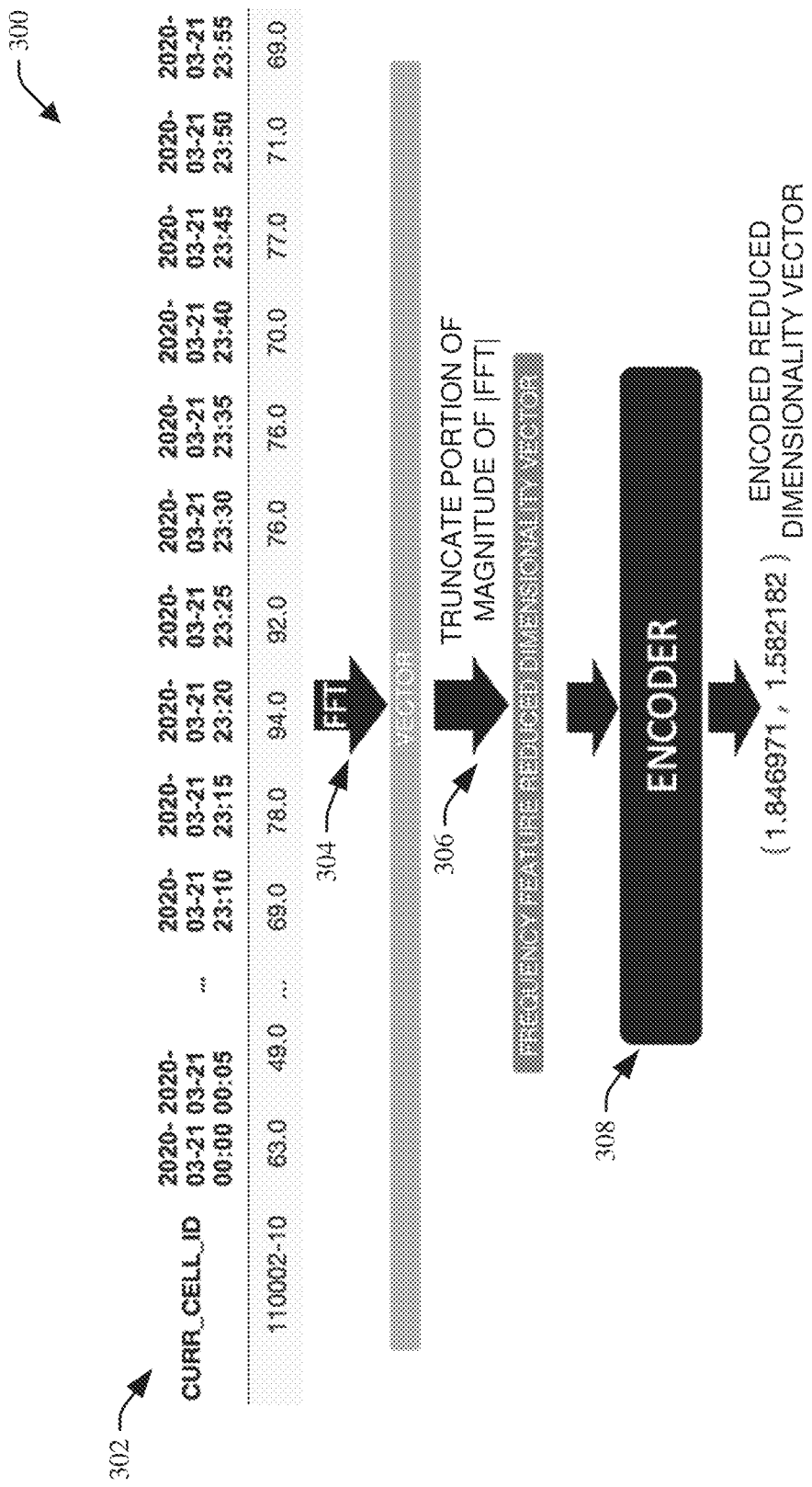
FIG. 3 illustrates a diagram of an example feature reforming process that can be performed on signal measurement data, in accordance with various aspects and embodiments of the disclosed subject matter.

Referring to FIGS. 2 and 3 (along with FIG. 1), FIG. 2 depicts a block diagram of the SMC 128, in accordance with various aspects and embodiments of the disclosed subject matter. FIG. 3 illustrates a diagram of an example feature reforming process 300 that can be performed by the feature reformer component 132 on signal measurement data, in accordance with various aspects and embodiments of the disclosed subject matter. The feature reformer component 132 can comprise a transformer component 202 that can transform data, such as signal measurement data, from the time domain to the frequency domain, and a truncation component 204 that can truncate data to facilitate reducing the dimensionality of signal measurement data, as more fully described herein.

As depicted at reference numeral 302 of the feature reforming process 300, the SMC 128, employing the feature reformer component 132 or another component of the SMC 128, can process respective signal measurement data associated with respective cells (e.g., cells 116, 118, 120, 122, 124, and/or 126) of the cell group for a defined time period (e.g., day, half-day, week, hour, month, or other desired time period) to form, for each cell, a respective time-intervaled signal measurements time series, wherein the time interval can be selected as desired. Cells often can exhibit or have different expected normal signaling behavior for different times of the day, different days of the week, and/or for other reasons, such as described herein, so it can be desirable to form time-intervaled signal measurements time series that comprise enough measurement data over a long enough period of time to account for the variations in activity and operations of the cells over time. Therefore, each timed measurement of cell activity (e.g., receiving of signals from communication devices) can represent a different variable in the cell network model that can be generated (e.g., created or formed) and updated, by the SMC 128, to represent (e.g., to model and/or correspond to the activity of) the group of cells (e.g., cells 116, 118, 120, 122, 124, and/or 126) of the communication network 102.

The SMC 128 or a user can determine or select a desired time interval for the signal measurements based at least in part on how online the SMC 128 and the associated algorithms (e.g., anomaly detection algorithm, malicious event detection algorithm, or other algorithm, such as described herein) are desired to be, in accordance with the defined network security criteria. For example, if anomaly detection (e.g., abnormal signaling detection) and associated alerts (if any) are desired at least in five minute intervals, it can be desirable to measure the activity (e.g., receiving of signals from communication devices) of cells at least at five-minute intervals, and to have the SMC 128 form, for each cell (e.g., cells 116, 118, 120, 122, 124, or 126), a respective five-minute interval signal measurements time series. If anomaly detection and associated alerts (if any) are desired at least in ten minute (or hourly) intervals, it can be desirable to measure the activity of cells at least at ten-minute (or hourly) intervals, and to have the SMC 128 form, for each cell, a respective ten-minute (or one-hour) interval signal measurements time series. If the time interval is five minutes, and the defined time period is one day, the respective five-minutes interval signal measurements time series for the respective cells can have a dimensionality (e.g., time dimensionality) that can be relatively large (e.g., 96×1). As depicted at reference numeral 302, the example measurements for the cell (e.g., cell with curr_cell_id: 110002-10) are at five-minute intervals, where at the first time interval, 63 signal events (e.g., attach events) associated with the cell were measured or detected, at the second time interval, 49 signal events associated with the cell were measured or detected, and so on.

The variables (e.g., the respective timed measurement of cell activity of the respective cells) can or may have correlation between them. The resulting data set (e.g., respective time-intervaled signal measurements time series associated with the respective cells) can comprise a relatively large set of inter-connected variables. In some embodiments, the SMC 128, employing the feature reformer component 132 and NN component 130, can learn and/or determine coefficients between the different variables of the set of variables, and can use those coefficients to facilitate desirably reducing the dimensionality of the data set (e.g., set of variables) to a desirably small dimension, such as, for example, two (e.g., 2×1 vectors). By reducing the dimension of the data set down to two, this can facilitate (e.g., can enable, can make it easier for) the SMC 128, employing the feature reformer component 132 and NN component 130, to desirably create two-dimensional (2-D) clusters of cells.

To facilitate desirably reducing the dimensionality of the data set, the feature reformer component 132 can utilize the feature reforming at frequency bins associated with the data set to reduce the dimensions of the data set in half or to less than half, and the NN component 130, employing the desired (e.g., selected) NN, can utilize an encoder algorithm (e.g., auto-encoder algorithm) to enforce or further reduce the dimension of the data set down to two (or other desirably smaller dimension number).

Figure 4:
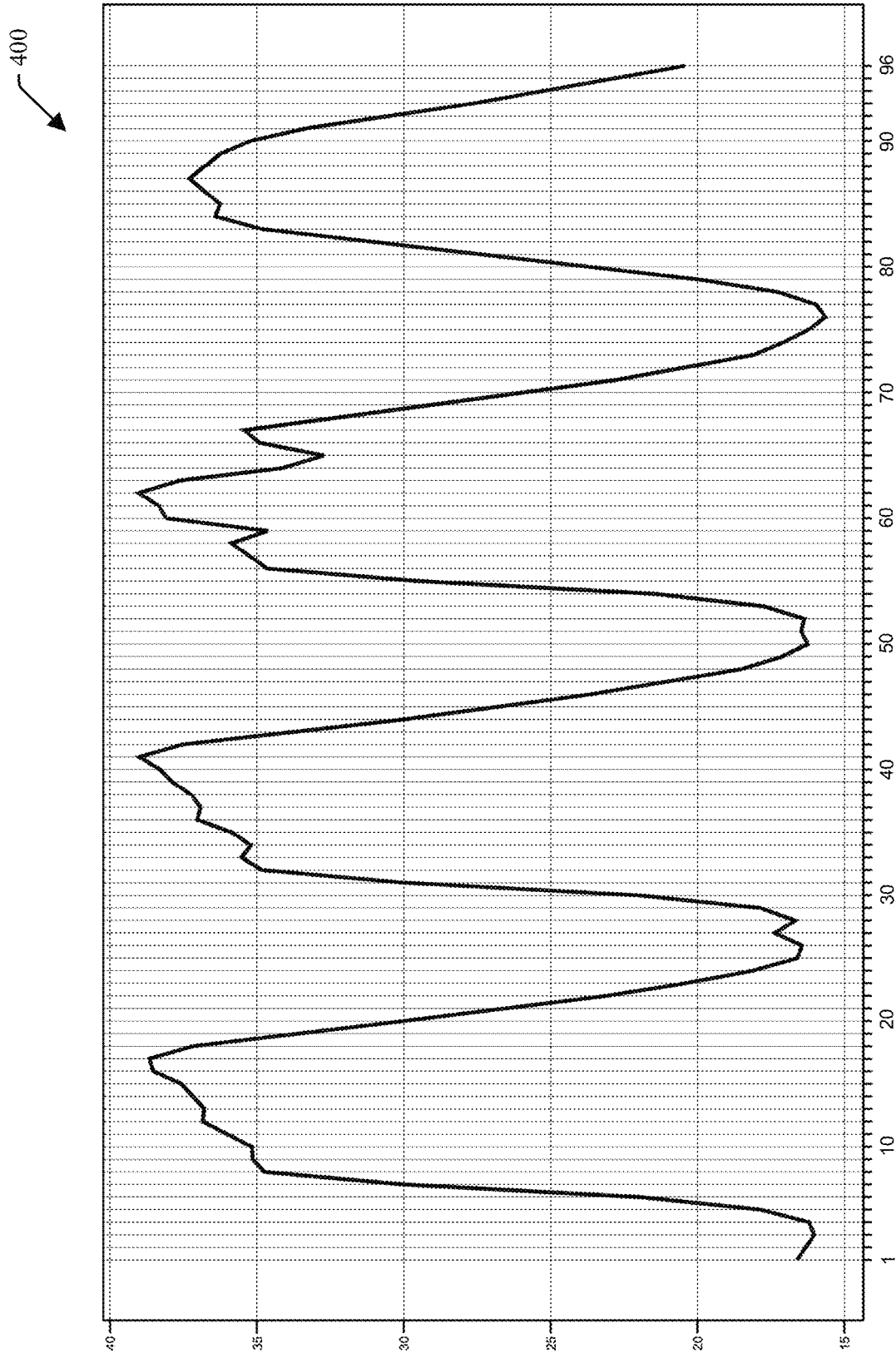
FIG. 4 presents a diagram of an example graph of a time-series signal measurements of cells, in accordance with various aspects and embodiments of the disclosed subject matter.
Figure 5:
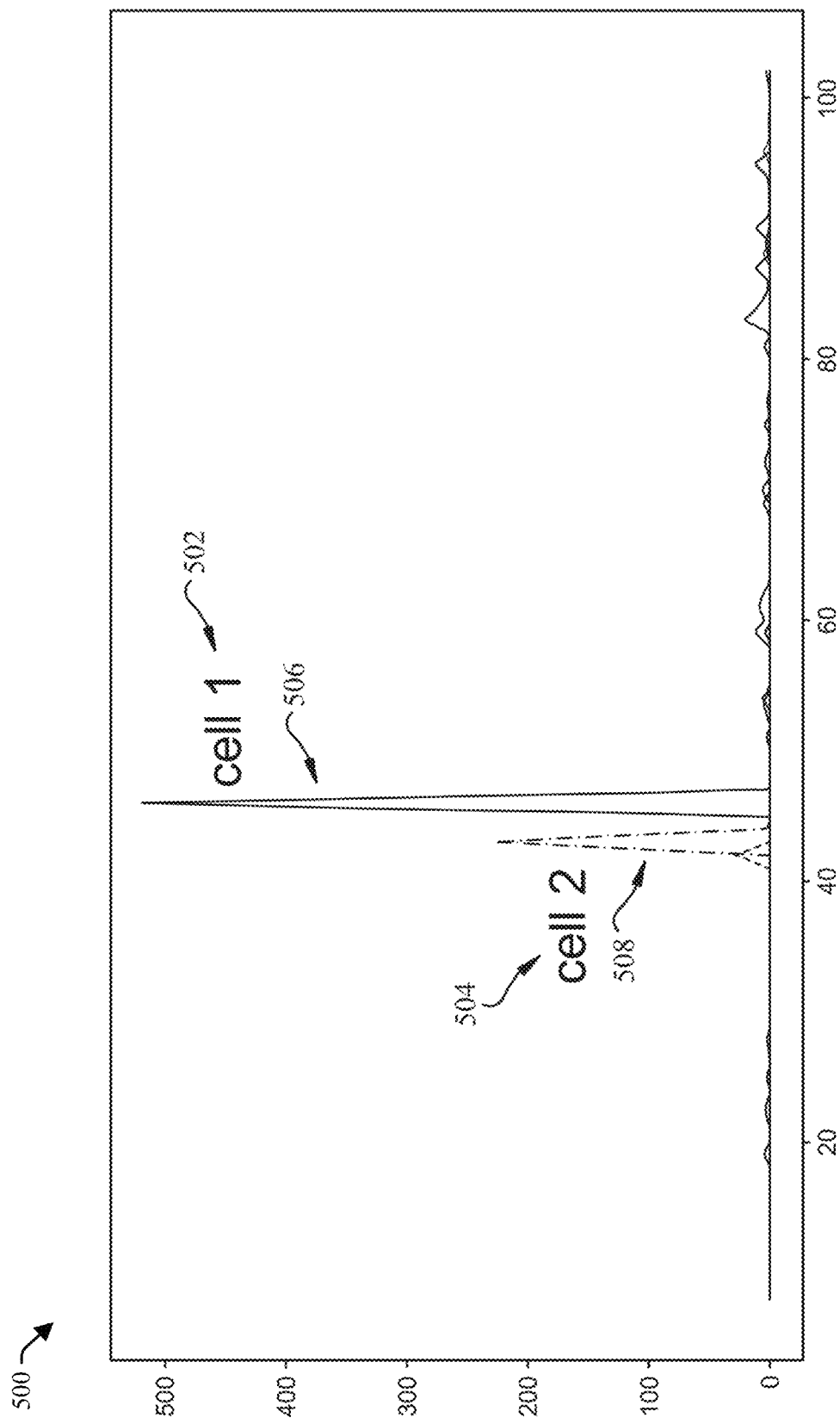
FIG. 5 presents a diagram of an example graph that can illustrate example time delays in cell activity and time-series signal measurements for different cell sites, in accordance with various aspects and embodiments of the disclosed subject matter.

One reason for the feature reformer component 132 to utilize the disclosed feature reforming can be that a traditional auto-encoder algorithm typically is not able to desirably or fully exploit the time-series properties (e.g., the time dependency) among all of the measurement samples of the data set. Referring briefly to FIGS. 4 and 5 (along with FIGS. 1-3), FIG. 4 presents a diagram of an example graph 400 of a time-series signal measurements of cells, and FIG. 5 presents a diagram of an example graph 500 that can illustrate example time delays in cell activity and time-series signal measurements for different cell sites, in accordance with various aspects and embodiments of the disclosed subject matter. As can be observed in the graph 400 of FIG. 4, with regard to an averaged cell signal (e.g., cell attach) measurement time series, the time-series signal measurements of cells typically can be sinusoidal waveforms, or at least substantially close to being sinusoidal waveforms, with such waveforms repeating daily or over other identifiable time periods. FFT at the frequency domain can be a particularly useful tool to capture this type of periodicity and sinusoidal or substantially sinusoidal patterns, as FFT can transform the signal measurement data to decompose the time-series signal measurements into different sinusoids (or at least substantially sinusoidal waveforms).

As can be observed in the graph 500 of FIG. 5, which presents the number of signal events (e.g., cell attach events) along the y-axis as a function of time along the x-axis, different cells (e.g., cell 1 502, cell 2 504) often can have similar but different signal measurement waveforms (e.g., waveform 506, waveform 508, respectively) where, although the signal measurement waveforms can be somewhat similar in form, such signal measurement waveforms can have different time delays due, for example, to the time difference between the different locations of the cells (e.g., cell 1 502, cell 2 504) and/or different functional zone patterns (e.g., residential vs. business) associated with the different cells (e.g., cell 1 502, cell 2 504). These time delay differences can be problematic for a traditional auto-encoder, since the auto-encoder typically will treat the same traffic pattern with different time zones as distinctive (e.g., different) patterns, even though the traffic patterns associated with the cells are the same or substantially the same, but merely are separated from each other by a time delay or difference. It can be desirable to not treat signal measurement time series of cells with time shifting or time delays as different patterns. The disclosed feature reforming process 300, which can be performed by the feature reformer component 132, can eliminate the confusion or problems that an auto-encoder can have with such time delay differences due in part to the time shifting property of the FFT (e.g., time shifting of the measurement data in time series can have no impact on and will not change the frequency domain magnitudes of the frequency bins). Another advantage of the disclosed feature reforming process 300 can be that the feature reformer component 132 can perform the feature reforming process 300 over the frequency bins, since most of the high-frequency bins can be close to zero. This can facilitate (e.g., enable) the feature reformer component 132 to reduce the dimensionality of the signal measurement data by a desired amount (e.g., reduce the dimensionality of the data in half or even further) before feeding the signal measurement data to the auto-encoder employed by the NN(s) and can enhance the encoding robustness.

In that regard, as part of the feature reforming process 300, as indicated at reference numeral 304, for each cell, the feature reformer component 132 can employ the transformer component 202 to transform the time-intervaled signal measurements time series associated with the cell from the time domain to the frequency domain by calculating the FFT of the time-intervaled signal measurements time series to generate a vector (e.g., 96×1 frequency vector) having the same relatively larger dimensionality (e.g., 96×1 or other relatively larger dimensionality) as the time-intervaled signal measurements time series. The feature reformer component 132 can learn and/or determine coefficients between the different variables of the set of variables of the vector that can be representative of the time-intervaled signal measurements time series, and can use those coefficients to facilitate desirably reducing the dimensionality of such data set to a desirably smaller dimension. As depicted at reference numeral 306 of the feature reforming process 300, using the learned or determined coefficients, the feature reformer component 132 can employ the truncation component 204 to truncate half or more of the magnitudes of the absolute value of the FFT (e.g., |FFT|) at the high-frequency bins to generate a frequency feature reduced dimensionality vector that can have a desirably reduced (e.g., smaller) dimensionality (e.g., 24×1 or 48×1, or other smaller dimensionality) than the non-truncated (e.g., 96×1) frequency vector.

At this point, the frequency reforming can be completed, and, as indicated at reference numeral 308, the frequency feature reduced dimensionality vector can be input to an encoder component 206 (e.g., auto-encoder) employed by one or more NNs of the NN component 130 (e.g., one or more NNs during the first stage of the multi-stage process, or the desired NN during the second stage and/or third stage of the multi-stage process), wherein, utilizing other learned or determined coefficients, the encoder component 206 can further reduce the dimensionality of the data set by encoding the frequency feature reduced dimensionality vector to generate an encoded reduced dimensionality vector (e.g., vector (1.846971, 1.582182) for the example cell with cell id: 110002-10) that can have a desirably small dimensionality (e.g., 2×1 or other desirably smaller dimensionality). Depending on the configuration and the parameters of the NN(s), the encoder component 206 employed by the NN can encode each of the frequency feature reduced dimensionality vectors over several stages or iterations to reduce each such vector until the encoded reduced dimensionality vector is ultimately generated (e.g., can encode to reduce a frequency feature reduced dimensionality vector from 24×1 to 8×1, from 8×1 to 4×1, and from 4×1 to 2×1; or can encode to reduce a frequency feature reduced dimensionality vector from 24×1 to 12×1, from 12×1 to 8×1, from 8×1 to 4×1, and from 4×1 to 2×1; or can otherwise encode the vector and reduce the dimensionality over a desired number of stages).

During the first stage of the multi-stage process, the NN component 130 can utilize the respective encoded reduced dimensionality vectors associated with the respective cells (e.g., cells 116, 118, 120, 122, 124, and/or 126) to facilitate determining a desirable (e.g., suitable, optimal, or most accurate) NN of the group of NNs to use to perform the clustering of cells and the anomaly detection), as more fully described herein. During the second stage of the multi-stage process, the NN component 130 can utilize the respective encoded reduced dimensionality vectors associated with the respective cells (e.g., cells 116, 118, 120, 122, 124, and/or 126) that are determined or generated during the second stage to facilitate clustering respective cells into respective clusters), as more fully described herein. During the third stage of the multi-stage process, the NN component 130 can utilize the respective encoded reduced dimensionality vectors associated with the respective cells (e.g., cells 116, 118, 120, 122, 124, and/or 126) that are determined or generated during the third stage to facilitate detecting an anomalous (e.g., an abnormal) condition(s) associated with a cell(s), as more fully described herein.

Figure 6:
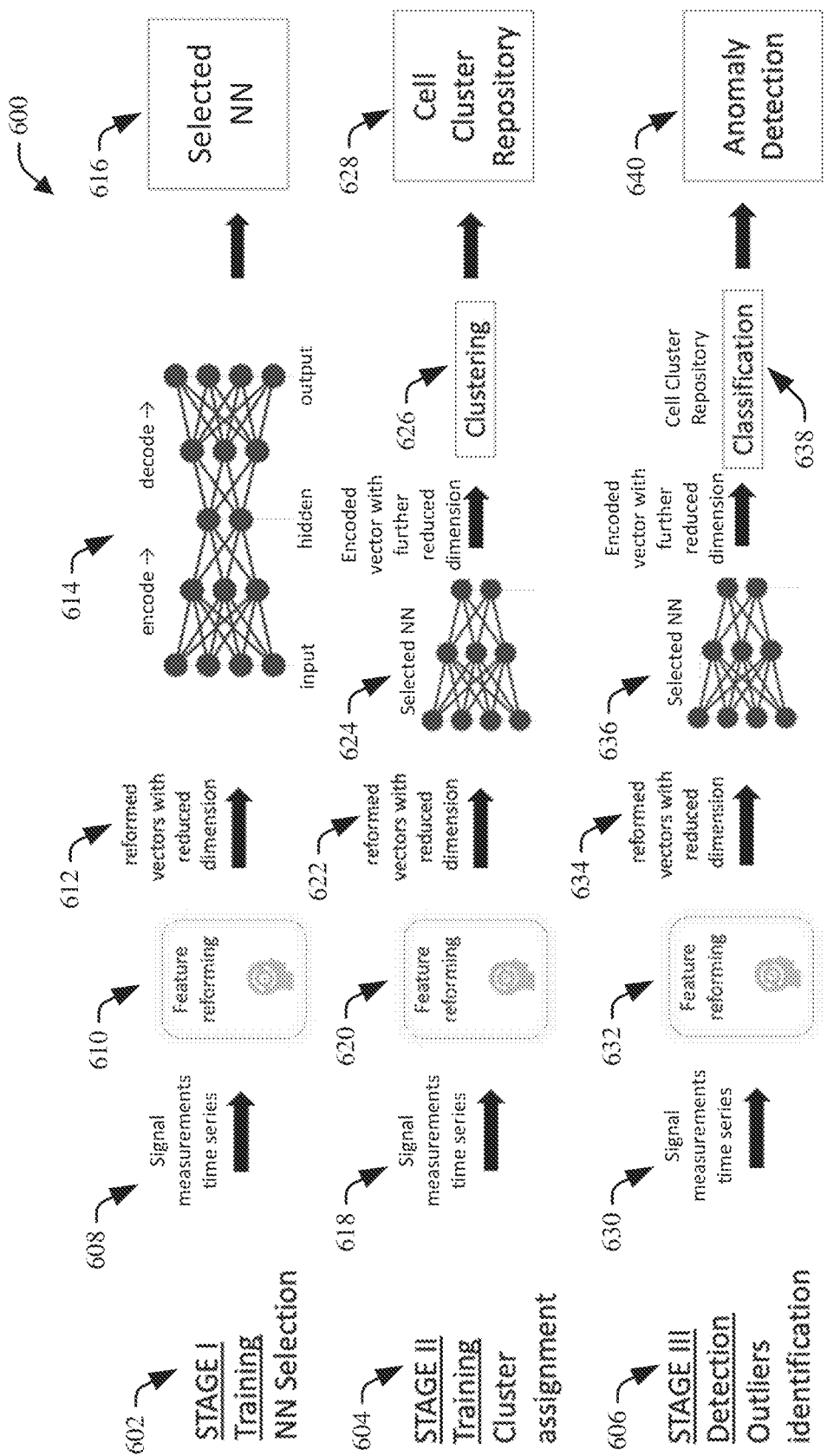
FIG. 6 illustrates a block diagram of an example multi-stage process for neural network selection, cluster assignment, and detection of anomalous conditions associated with cells, in accordance with various aspects and embodiments of the disclosed subject matter.

Turning to FIG. 6 (along with FIGS. 1 and 2), FIG. 6 illustrates a block diagram of an example multi-stage process 600 for NN selection, cluster assignment, and detection of anomalous conditions associated with cells, in accordance with various aspects and embodiments of the disclosed subject matter. The example multi-stage process 600 can comprise the first stage (STAGE I), which can be part of the training and can be performed by the SMC 128, employing the feature reformer component 132 and the NN component 130, to determine and select a desirable NN, as indicated at reference numeral 602. The example multi-stage process 600 also can comprise the second stage (STAGE II), which also can be part of the training and can be performed by the SMC 128, employing the feature reformer component 132 and the NN component 130, in particular the desired NN, to assign respective cells to respective clusters of cells, as indicated at reference numeral 604. The example multi-stage process 600 also can comprise the third stage (STAGE III), which can be performed by the SMC 128, employing the feature reformer component 132 and the NN component 130, in particular the desired NN, and using information relating to the cell clusters, to detect outlier cells that are experiencing anomalous conditions, as indicated at reference numeral 606.

As part of the first stage 602 of the multi-stage process 600, the SMC 128 can form respective first time-intervaled signal measurements time series associated with the respective cells (e.g., cells 116, 118, 120, 122, 124, and/or 126) of the communication network 102 based at least in part on the results of analyzing respective first signal data received from or with regard to the respective cells, as indicated at reference numeral 608, and as more fully described herein. The feature reformer component 132 can analyze the respective first time-intervaled signal measurements time series, and, based at least in part on such analysis, can perform feature reforming on the respective first time-intervaled signal measurements time series to generate respective frequency feature reduced dimensionality (e.g., 24×1 or 48×1) vectors associated with the respective cells (e.g., cells 116, 118, 120, 122, 124, and/or 126), as indicated at reference numerals 610 and 612, and as more fully described herein.

As indicated at reference numeral 614 of the multi-stage process 600, the SMC 128 can input the respective frequency feature reduced dimensionality vectors associated with the respective cells (e.g., cells 116, 118, 120, 122, 124, and/or 126) to respective NNs of the group of NNs, and, using the encoder component 206 (e.g., auto-encoder) of the NN component 130, the respective NNs each can encode the respective frequency feature reduced dimensionality vectors to generate respective encoded reduced dimensionality (e.g., 2×1) vectors associated with the respective cells, and, using decoder component 208 of the NN component 130, can decode the respective encoded reduced dimensionality vectors to generate respective decoded versions of the respective encoded reduced dimensionality vectors, wherein the respective decoded vectors associated with the cells can be output from each of the NNs. The respective decoded vectors generated by each NN can be a reconstruction, by the NN (e.g., using the decoder component 208), of the respective frequency feature reduced dimensionality vectors input to the NN. Since the respective NNs can have different parameters and configurations, the respective encoding and decoding of vectors by the respective NNs can produce different decoded vectors as output. In some embodiments, two or more of the respective NNs can encode and decode vectors in parallel (e.g., concurrently).

As indicated at reference numeral 616, the NN component 130 (e.g., an NN of the NN component 130), using an NN selector component 210, can determine and select a desirable (e.g., suitable, optimal, or most accurate) NN from the group of NNs based at least in part on the how accurately the NNs represent the communication network 102 (e.g., the group of cells), in accordance with the defined network security criteria. For instance, for each NN, the NN selector component 210 can compare the respective decoded vectors associated with the respective cells that were generated by the NN to the respective frequency feature reduced dimensionality vectors associated with the respective cells that were input to the NN, and, based at least in part on the results of such comparison, can determine an amount of error between the respective decoded vectors and the respective frequency feature reduced dimensionality vectors. For instance, for each NN of the NN group, the NN selector component 210 can determine an amount of error between the respective decoded vectors and the respective frequency feature reduced dimensionality vectors as a function of the differences between the respective decoded vectors and the respective frequency feature reduced dimensionality vectors. The NN selector component 210 can determine the NN of the group of NNs that has the lowest amount of error between the respective decoded vectors at the output of the NN to the respective frequency feature reduced dimensionality vectors input to and encoded by the NN, wherein the NN with the lowest amount of error can be the NN that can most accurately represent the group of cells (e.g., cells 116, 118, 120, 122, 124, and/or 126) of the communication network 102.

In some embodiments, as part of the second stage 604 of the multi-stage process 600, the SMC 128 can form respective second time-intervaled signal measurements time series associated with the respective cells (e.g., cells 116, 118, 120, 122, 124, and/or 126) of the communication network 102 based at least in part on the results of analyzing respective second signal data received from or with regard to the respective cells, as indicated at reference numeral 618, and as more fully described herein. The feature reformer component 132 can analyze the respective second time-intervaled signal measurements time series, and, based at least in part on such analysis, can perform feature reforming on the respective second time-intervaled signal measurements time series to generate respective frequency feature reduced dimensionality (e.g., 24×1 or 48×1) vectors associated with the respective cells (e.g., cells 116, 118, 120, 122, 124, and/or 126), as indicated at reference numerals 620 and 622, and as more fully described herein. In other embodiments, if the second signal data is the same as the first signal data, the SMC 128 can bypass forming the respective second time-intervaled signal measurements time series, the feature reformer component 132 can bypass performing the feature reforming on the respective second time-intervaled signal measurements time series, and the SMC 128 can utilize the respective frequency feature reduced dimensionality vectors associated with the respective cells that were generated during the first stage 602 of the multi-stage process 600.

As indicated at reference numeral 624 of the multi-stage process 600, the SMC 128 can input the respective frequency feature reduced dimensionality vectors associated with the respective cells (e.g., cells 116, 118, 120, 122, 124, and/or 126) to the desired (e.g., selected, suitable, optimal, or most accurate) NN, and the NN (e.g., employing the encoder component 206) can encode the respective frequency feature reduced dimensionality vectors to generate respective encoded reduced dimensionality (e.g., 2×1) vectors associated with the respective cells. In some embodiments, each output point (e.g., each of the respective encoded reduced dimensionality vectors) output from the encoder component 206 can represent a reduced form of a signal measurement from a single cell (e.g., cell 116) at a single time (e.g., single moment or period in time). The output (e.g., the respective encoded reduced dimensionality vectors) from the NN (and associated encoder component 206) can be overlayed in a 2-D area, and the clustering process can be performed on the respective output points associated with the respective cells e.g., cells 116, 118, 120, 122, 124, and/or 126).

As indicated at reference numeral 626, utilizing a cluster component 212 of the NN component 130 and a clustering algorithm, the NN can cluster the respective cells (e.g., cells 116, 118, 120, 122, 124, and/or 126) into respective clusters based at least in part on the results of analyzing (e.g., performing an NN analysis on) the respective encoded reduced dimensionality vectors associated with the respective cells. For instance, the desired NN (e.g., as controlled by the cluster component 212) can cluster (e.g., iteratively cluster) the respective cells (e.g., cells 116, 118, 120, 122, 124, and/or 126) into a desired number of respective clusters based at least in part on the relative proximities of the respective encoded reduced dimensionality vectors associated with the respective cells to each other, in accordance with defined network security criteria. For example, the NN (e.g., as controlled by the cluster component 212) can cluster (e.g., group) together cells that have encoded reduced dimensionality vectors that are determined by the NN to be in relatively close proximity to each other (e.g., relatively close proximity to each other numerically based on their respective encoded vectors and/or relatively close proximity to each other based on the spatial or graphical distance between the respective encoded vectors (e.g., as graphically plotted)) to form a small cluster. The NN (e.g., as controlled by the cluster component 212) can iteratively combine smaller cell clusters that are determined by the NN to be in relatively close proximity together to form larger clusters until a desired number of cell clusters is achieved, in accordance with the defined network security criteria (e.g., defined network security criteria relating to clustering of cells).

In some embodiments, the NN (e.g., as controlled by the cluster component 212) can continue to perform the clustering of cells until a defined number of clusters has been formed, wherein the defined number of clusters (e.g., two clusters, three clusters, four clusters, five clusters, or more than five clusters) can be specified by the defined network security criteria and/or a user. In other embodiments, the number of clusters of cells to be formed can be determined by the NN (e.g., as controlled by the cluster component 212), wherein the NN can form as many clusters of cells as the NN determines to be suitable, or wherein the NN can form as many clusters of cells as the NN determines to be suitable up to a defined maximum number of cell clusters, when and as specified by the defined network security criteria and/or the user.

As indicated at reference numeral 628 of the multi-stage process 600, the NN component 130 or the associated desired NN can store information relating to the respective clusters of cells in the cell cluster repository 134 of or associated with the SMC 128. Such cell cluster information can indicate which cells (e.g., cells 116, 118, 120, 122, 124, and/or 126) are in which cell clusters, respective vector ranges of the respective cell clusters, respective characteristics (e.g., signaling-related characteristics or classifications, cell types, and/or other characteristics) of the respective cell clusters and/or respective cells of the respective cell clusters, respective geographic locations of the respective cells, and/or other desired information. In some embodiments, the clustering algorithm does not explicitly assign a meaning to each cell cluster or explain the meaning of each cell cluster. The SMC 128 and/or a user can assign a meaning to and/or explain the meaning of each cell cluster based at least in part on the results of observing and analyzing the respective cells (e.g., the respective signaling activity of the respective cells) of the respective cell clusters. For instance, the SMC 128 and/or the user can observe and/or analyze the average amount of signaling over a defined period and/or the maximum amount of signaling (e.g., over the defined period) with regard to cells and cell clusters, and can determine or identify respective characteristics of respective cells and/or respective cell clusters based at least in on the results of such analysis the average amount of signaling and/or maximum amount of signaling, and can assign the respective characteristics and/or corresponding meanings or explanations to each cluster.

Figure 7:
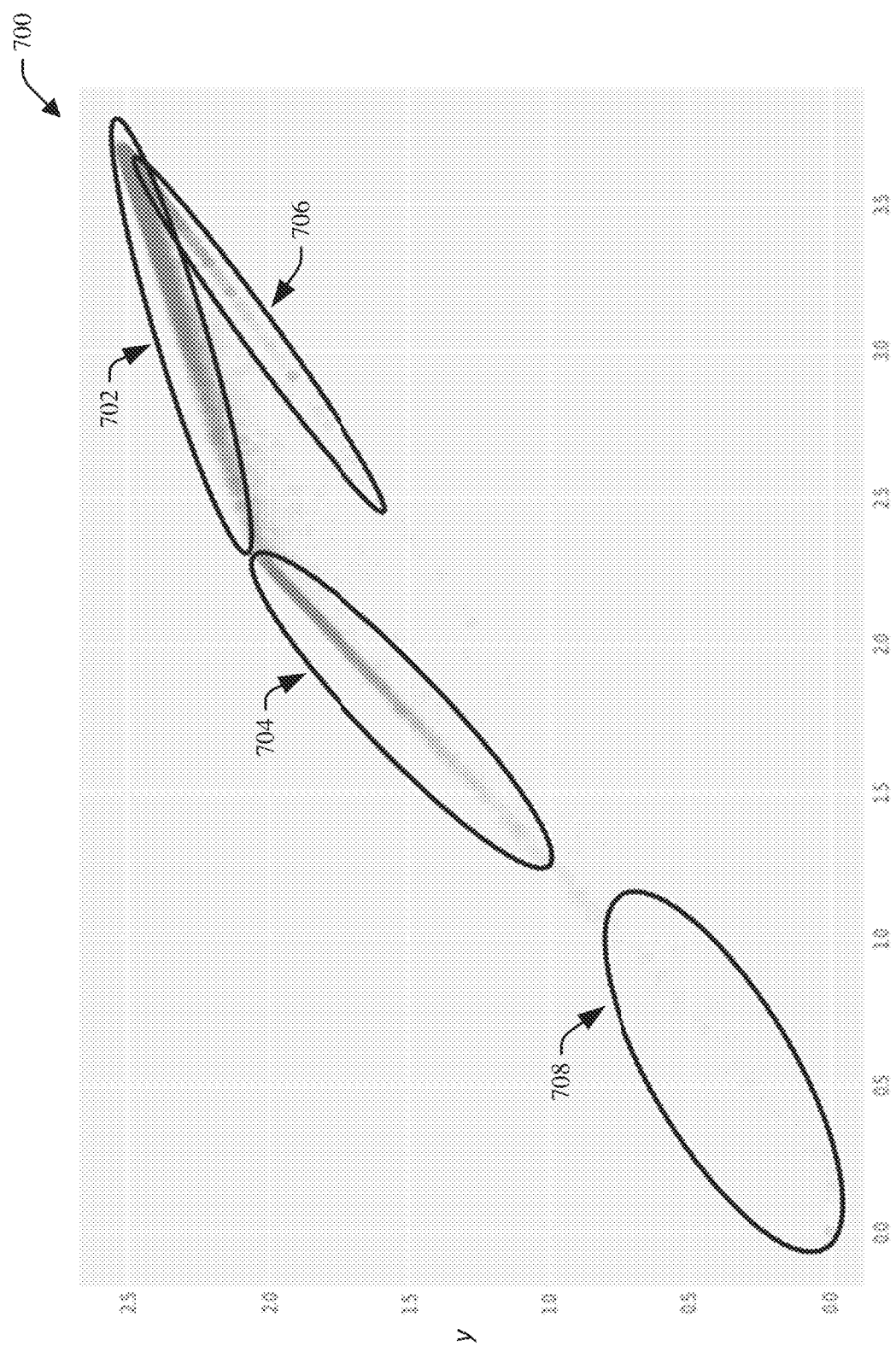
FIG. 7 presents a diagram of an example graph that can comprise an encoded mapping of cells that can illustrate the spatial or graphical layout of respective cells in a two-dimensional space, based at least in part on the respective encoded reduced dimensionality vectors associated with the respective cells, and clustering of respective cells into respective clusters, in accordance with various aspects and embodiments of the disclosed subject matter.
Figure 8:
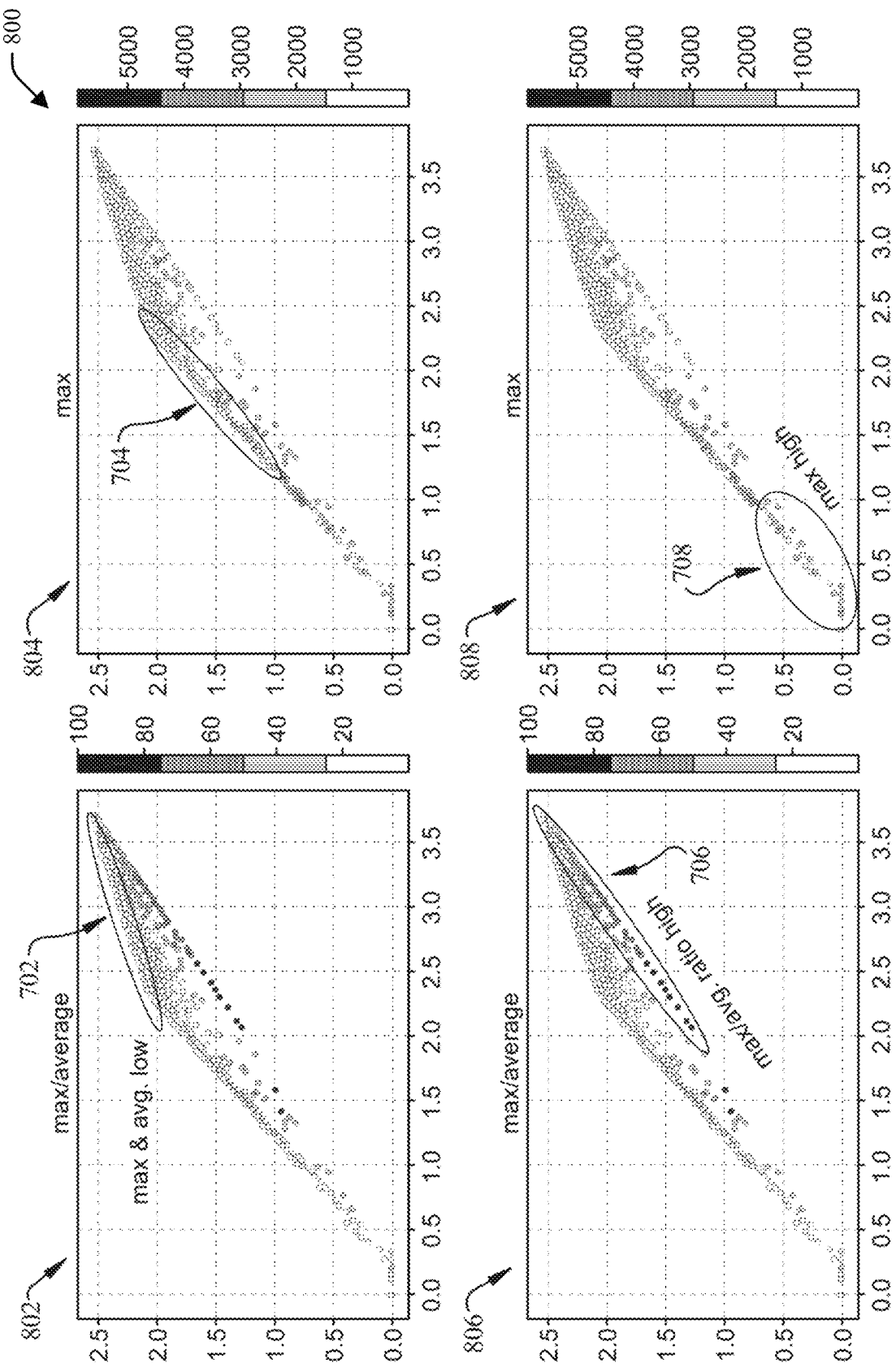
FIG. 8 presents a diagram of an example graphs that can illustrate respective characteristics of respective cells and cell clusters with regard to signaling associated with cells, in accordance with various aspects and embodiments of the disclosed subject matter.

Referring briefly to FIGS. 7 and 8 (along with FIGS. 1, 2, and 6), FIG. 7 presents a diagram of an example graph 700 that can comprise an encoded mapping of cells that can illustrate the spatial or graphical layout of respective cells in a 2-D space (e.g., a 2-D area or graph), based at least in part on the respective encoded reduced dimensionality vectors associated with the respective cells, and clustering of respective cells into respective clusters, in accordance with various aspects and embodiments of the disclosed subject matter. FIG. 8 presents a diagram of an example graphs 800 that can illustrate respective characteristics (e.g., signaling-related characteristics) of respective cells and cell clusters with regard to signaling associated with cells, in accordance with various aspects and embodiments of the disclosed subject matter.

With further regard to the example graph 700 of FIG. 7, the example graph 700 comprises a scatter plot of an encoded mapping of cells that can illustrate the plotting of respective encoded reduced dimensionality (e.g., 2×1) vectors associated with respective cells for over 10,000 time-intervaled signal measurements time series associated with the over 10,000 respective cells as part of training using the multi-stage process 600, wherein the respective encoded reduced dimensionality vectors can be determined by the desired NN, employing the encoder component 206, such as more fully described herein. Each encoded reduced dimensionality vector (x, y) can be plotted on the graph 700, wherein the x variable of each respective encoded vector can be a respective value along the x-axis of the graph 700 for each respective cell, and the y variable of each respective encoded vector can be a respective value along the y-axis of the graph 700 for each respective cell. As can be observed in the graph 700, the desired NN, employing the cluster component 212, has clustered respective cells into respective clusters, comprising cell cluster 1 702, cell cluster 2 704, cell cluster 3 706, and cell cluster 4 708. In this example case, the defined number of clusters was selected to be four, so four cell clusters have been formed.

As also can be observed in the graph 700, most of the cells have been clustered into cell cluster 1 702 and cell cluster 2 704, whereas cell cluster 3 706 and cell cluster 4 708 comprise only approximately 1% of the samples (e.g., approximately 1% of the encoded reduced dimensionality vectors associated with approximately 1% of the cells). As further can be observed, cell cluster 1 702 and cell cluster 2 704 can be well defined, and accordingly, the respective characteristics of cell cluster 1 702 and cell cluster 2 704, and the respective characteristics of the respective cells within each of cell cluster 1 702 and cell cluster 2 704, can be readily ascertainable by the SMC 128 and/or the user. Cell cluster 3 706 and cell cluster 4 708 are not quite as well defined as cell cluster 1 702 and cell cluster 2 704, although the respective characteristics of cell cluster 3 706 and cell cluster 4 708, and the respective characteristics of the respective cells within each of cell cluster 3 706 and cell cluster 4 708, also can or may be ascertained by the SMC 128 and/or the user, however, the SMC 128 and/or the user may have to perform a more extensive analysis of the cell cluster 3 706 and/or cell cluster 4 708 in order to ascertain the respective characteristics of cell cluster 3 706 and cell cluster 4 708, and/or the respective characteristics of the respective cells within each of cell cluster 3 706 and cell cluster 4 708.

With further regard to the example graphs 800 of FIG. 8 as well as the cell clusters, cell cluster 1 702, cell cluster 2 704, cell cluster 3 706, and cell cluster 4 708, the graphs 800 can comprise graph 802, graph 804, graph 806, and graph 808 that each can comprise respective data points regarding respective encoded reduced dimensionality vectors associated with respective cells and information relating to the respective maximum or highest hourly signaling (e.g., cell attaches) and respective average number of signaling associated with the respective cells. The graph 802 can relate to cell cluster 1 702, the graph 804 can relate to cell cluster 2 704, the graph 806 can relate to cell cluster 3 706, and the graph 808 can relate to cell cluster 4 708.

Based at least in part on the results of analyzing the example graphs 800 (and/or information, such as the signal measurement data and/or the encoded reduced dimensionality vectors, utilized to facilitate generating the example graphs 800 and/or example graph 700), the SMC 128 and/or the user can observe, determine, and/or identify respective characteristics (e.g., signaling-related characteristics) relating to signaling of the respective cells and cell clusters (e.g., 702, 704, 706, and 708) in the example graphs 800, and/or can assign the respective characteristics relating to signaling to the respective cells and respective cell clusters. The example graphs 800 (and/or the information, such as the signal measurement data and/or the encoded reduced dimensionality vectors, utilized to facilitate generating the example graphs 800 and/or example graph 700) can be analyzed or observed with regard to the maximum hourly signaling (e.g., maximum or highest number of hourly signaling, such as cell attaches) associated with the cells over the evaluated time period, the average number of signals (e.g., cell attaches) associated with the cells across all signal measurements during the evaluated time period, the maximum hourly signaling versus the average number of signals associated with the cells, and/or other desired factors or characteristics, in accordance with the defined network security criteria.

For instance, with regard to cell cluster 1 702, the SMC 128 and/or the user can determine or identify that cell cluster 1 702 can have the characteristics of the cells of cluster 1 702 having relatively low maximum hourly signaling and relatively low average number of signals. With regard to cell cluster 2 704, the SMC 128 and/or the user can determine or identify that cell cluster 2 704 can have the characteristics of the cells of cluster 2 704 having relatively high maximum hourly signaling and relatively high average number of signals. With regard to cell cluster 3 706, the SMC 128 and/or the user can determine or identify that cell cluster 3 706 can have the characteristics of the cells of cluster 3 706 having a relatively high ratio of maximum hourly signaling in relation to average number of signals. With regard to cell cluster 4 708, the SMC 128 and/or the user can determine or identify that cell cluster 4 708 can have the characteristics of the cells of cluster 4 708 having relatively high maximum hourly signaling.

With further regard to FIG. 6 (along with FIGS. 1 and 2), after the training of stage 1 602 and stage 2 604 of the multi-stage process 600 have been performed, the disclosed subject matter can have a set of cell clusters and an assigned cluster for each cell (e.g., cells 116, 118, 120, 122, 124, and/or 126). As desired, periodically (e.g., once per week, once per month, once per quarter, once per year, or once per other desired period) or aperiodically (e.g., dynamically in response to conditions being satisfied), the SMC 128 can perform the training stages, stage 1 602 and stage 2 604, of the multi-stage process to learn and capture changes to and/or trends in signaling behavior or activity associated with the cells (e.g., cells 116, 118, 120, 122, 124, and/or 126) of the communication network 102, in accordance with the defined network security criteria.

At this point or at another desired time, the SMC 128 and/or the user can determine and assign respective parameters and/or respective threshold values relating to signaling associated with respective cells (e.g., cells 116, 118, 120, 122, 124, and/or 126) according to the respective cell clusters to which the respective cells have been assigned to facilitate detection (e.g., automatic detection) of anomalous (e.g., abnormal) signaling activity associated with cells and/or aggressive (e.g., excessive signaling) communication devices (e.g., communication device 104), in accordance with the defined network security criteria. The SMC 128 can store information regarding the respective parameters and/or respective threshold values in the cell cluster repository 134.

For example, the SMC 128 and/or the user can determine a respective defined threshold vector range for each cell cluster based at least in part on (e.g., as a function of) the vector range that the cell cluster covers (e.g., based at least in part on the vector range associated with the encoded reduced dimensionality vectors of the cells of the cluster), and can assign the respective defined threshold vector ranges to the respective cell clusters. In some embodiments, a defined threshold vector range for a cell cluster can be the same as the vector range associated with the cell cluster. In other embodiments, a defined threshold vector range for a cell cluster can extend out by a desired amount beyond the vector range associated with the cell cluster such that the defined threshold vector range can be larger than the vector range associated with the cell by the desired amount. By making the defined threshold vector range larger than the vector range by a desired amount (e.g., by adding a buffer amount to the vector range of the cell cluster when determining the defined threshold vector range), this can reduce over-alerting regarding potential abnormal signaling conditions and/or false positives relating to abnormal signaling conditions associated with the cell cluster. There can be instances where an encoded reduced dimensionality vector associated with a cell may be close to being in, but is outside of, the vector range of the cell cluster to which the cell is assigned. In such instances, it can or may be desirable to treat the slightly "abnormal" signaling behavior associated with the cell as de minimis, and not trigger an alert indicating that the cell is experiencing abnormal signaling behavior.

As another example, as an alternative to, or in addition to, determining and assigning defined threshold vector ranges to the cell clusters, the SMC 128 and/or the user can determine a respective defined threshold number of signals (e.g., defined threshold maximum number of signals) for each cell cluster (e.g., over a defined time period) based at least in part on (e.g., as a function of) the vector range that the cell cluster covers and/or a number of signals that can be determined to correspond to the vector range that the cell cluster covers, and can assign the respective defined threshold number of signals to the respective cell clusters. In some embodiments, a defined threshold number of signals for a cell cluster can be the same as the number of signals that corresponds to the vector range associated with the cell cluster. In other embodiments, a defined threshold number of signals for a cell cluster can be higher, by a desired amount, than the number of signals that corresponds to the vector range associated with the cell cluster, to facilitate reducing or mitigating over-alerting regarding potential abnormal signaling conditions and/or false positives regarding abnormal signaling conditions.

The third stage 606 of the multi-stage process 600 can be performed by the SMC 128 (e.g., employing the feature reformer component 132 and the NN component 130, in particular the desired NN) using information relating to the cell clusters, to detect outlier cells that are experiencing anomalous conditions. The detection in stage 3 606 can be detection of an anomalous condition or behavior (e.g., an abnormal or excessive signaling condition and/or change in behavior) associated with a cell (e.g., at the cell level) of a cell cluster, rather than detection or identification of a particular communication device(s) (e.g., communication device 104) that is engaging in aggressive and/or malicious activity (e.g., excessive and/or malicious signaling) against a cell(s) of the communication network 102. The detection of an anomalous condition associated with a cell in stage 3 606 can provide at least an indication that there is or at least may be excessive and/or malicious signaling associated with the cell. In some embodiments, based upon such detection of the anomalous condition, the SMC 128 can perform another detection process (e.g., a communication device detection process) to determine or identify a particular communication device(s) that is or may be engaging in excessive signaling against the cell(s), as more fully described herein.

With further regard to the third stage 606, the SMC 128 can form respective third time-intervaled signal measurements time series associated with the respective cells (e.g., cells 116, 118, 120, 122, 124, and/or 126) of the communication network 102 based at least in part on the results of analyzing respective third signal data received from or with regard to the respective cells, as indicated at reference numeral 630, and as more fully described herein. The feature reformer component 132 can analyze the respective third time-intervaled signal measurements time series, and, based at least in part on such analysis, can perform feature reforming on the respective third time-intervaled signal measurements time series to generate respective frequency feature reduced dimensionality (e.g., 24×1 or 48×1) vectors associated with the respective cells (e.g., cells 116, 118, 120, 122, 124, and/or 126), as indicated at reference numerals 632 and 634, and as more fully described herein.

As indicated at reference numeral 636 of the multi-stage process 600, the SMC 128 can input the respective frequency feature reduced dimensionality vectors associated with the respective cells (e.g., cells 116, 118, 120, 122, 124, and/or 126) to the desired (e.g., selected, suitable, optimal, or most accurate) NN, and the NN (e.g., employing the encoder component 206) can encode the respective frequency feature reduced dimensionality vectors to generate respective encoded reduced dimensionality (e.g., 2×1) vectors associated with the respective cells. In some embodiments, each output point (e.g., each of the respective encoded reduced dimensionality vectors) output from the encoder component 206 can represent a reduced form of a signal measurement from a single cell (e.g., cell 116) at a single time (e.g., single moment or period in time). In certain embodiments, the output (e.g., the respective encoded reduced dimensionality vectors) from the NN (and associated encoder component 206) can be overlayed in a 2-D area to facilitate determining whether any encoded reduced dimensionality vector associated with a cell is located outside of the cell cluster to which that cell has been assigned.

As shown at reference numeral 638 of the multi-stage process 600, the SMC 128, employing a classifier component 214, can analyze the respective encoded reduced dimensionality vectors associated with the respective cells (e.g., cells 116, 118, 120, 122, 124, and/or 126) and information relating to the cell clusters, and can classify the respective cells, in relation to the respective cell clusters of the respective cells, based at least in part on the results of analyzing the respective encoded reduced dimensionality vectors and the information relating to the cell clusters, in accordance with the defined network security criteria. For instance, the classifier component 214 can retrieve information relating to the cell clusters from the cell cluster repository 134, wherein such information can identify the cells that are in each cell cluster, can identify the respective vector ranges associated with the respective cell clusters, can identify respective parameters and/or respective threshold values (e.g., respective defined threshold vector ranges and/or respective defined threshold number of signals) that are associated with the respective cell clusters, and/or can comprise other desired (e.g., relevant) information relating to the cell clusters and associated cells.

For example, with regard to each cell, if, based at least in part on the results of such analysis, the classifier component 214 determines that an encoded reduced dimensionality vector associated with a particular cell is outside of the vector range associated with the cell cluster to which the particular cell is assigned and/or the encoded reduced dimensionality vector satisfies (e.g., breaches or exceeds) a defined threshold vector range associated with (e.g., applicable to) the cell cluster, the classifier component 214 can classify or identify the particular cell as being outside of the vector range associated with the cell cluster and/or as having its encoded reduced dimensionality vector satisfy the defined threshold vector range associated with the cell cluster. If, instead, based at least in part on the results of such analysis, the classifier component 214 determines that an encoded reduced dimensionality vector associated with a particular cell is within the vector range associated with the cell cluster to which the particular cell is assigned and/or the encoded reduced dimensionality vector does not satisfy (e.g., does not breach or exceed) the defined threshold vector range associated with the cell cluster, the classifier component 214 can classify or identify the particular cell as being within the vector range associated with the cell cluster and/or as having an encoded reduced dimensionality vector that does not satisfy the defined threshold vector range associated with the cell cluster.

As indicated at reference numeral 640 of the multi-stage process 600, with regard to the respective cells, based at least in part on the classification results from the classifier component 214, the SMC 128, employing a cell anomaly detector component 216 (e.g., of the NN component 130), can determine whether one or more cells of the respective cell clusters are experiencing or exhibiting an anomalous condition (e.g., an anomalous or abnormal signaling condition), in accordance with the defined network security criteria. For example, if the classification results indicate or specify that an encoded reduced dimensionality vector associated with a particular cell satisfies (e.g., breaches or exceeds, or is outside of) the defined threshold vector range associated with the cell cluster, the cell anomaly detector component 216 can determine that the particular cell is experiencing or exhibiting an anomalous condition (e.g., an anomalous or abnormal signaling condition), in accordance with the defined network security criteria. If, instead, based at least in part on the classification results, the cell anomaly detector component 216 determines that an encoded reduced dimensionality vector associated with a particular cell is within the vector range associated with the cell cluster to which the particular cell is assigned and/or does not satisfy (e.g., does not breach or exceed) the defined threshold vector range associated with the cell cluster, the cell anomaly detector component 216 can determine that no anomalous condition associated with the particular cell is detected, in accordance with the defined network security criteria.

With further regard to FIGS. 1 and 2, the SMC 128 also can comprise an alert component 218. In some embodiments, the cell anomaly detector component 216, in response to detecting that a particular cell is experiencing or exhibiting an anomalous condition, the cell anomaly detector component 216 can communicate information indicating that the particular cell is experiencing or exhibiting the anomalous condition to the alert component 218. In response, the alert component 218 can generate an alert signal (e.g., alert or notification message) relating to the detection of the anomalous condition, wherein the alert signal can comprise information (e.g., alert information) that can relate to or identify the particular cell (e.g., a cell identifier), characteristics associated with the particular cell or associated cell cluster, the defined threshold vector range, the encoded reduced dimensionality vector associated with the particular cell, a time that the anomalous condition occurred or was detected, a location of the cell, and/or other desired (e.g., relevant) information. The alert component 218 can communicate the alert signal to a communication device (e.g., communication device 136) associated with the user, an interface component associated with the user, a messaging account associated with the user, and/or to another component(s) (e.g., detector component 220 and/or connection manager component 222) of or associated with the SMC 128. The user, detector component 220, connection manager component 222, or other component of the SMC 128 can review and evaluate the information (e.g., alert information) in the alert signal and can take appropriate action in response to the alert signal, in accordance with the defined network management criteria, as more fully described herein.

In accordance with various embodiments, if the detector component 220 receives an alert signal indicating that an anomalous condition associated with a cell (e.g., cell 116) has been detected and/or otherwise receiving information indicating, or making a determination, that an anomalous condition associated with the cell has been detected or is or has occurred, the detector component 220 can determine whether one or more communication devices (e.g., communication device 104) are aggressive communication devices that are engaging in excessive and/or malicious signaling against the cell (e.g., cell 116). As more fully described herein, the RAN 110 and SMC 128 typically will not have standard device identifiers or subscriber identifiers (e.g., IMEI, IMSI) available to identify individual communication devices and signaling being communicated by individual communication devices, and, instead, temporary identifiers (e.g., temporary random identifiers, such as C-RNTI and TMSI) can be assigned to communication devices (e.g., communication devices 104, 106, or 108) and subscribers. The temporary identifiers for communication devices often can be changed, and, as a result, the temporary identifiers typically may not be useful and/or cannot be used to identify which communication device sent which signal (e.g., control signal) to a cell.

The detector component 220 can overcome such problems. In accordance with various embodiments, in response to receiving an alert signal indicating that an anomalous condition associated with a cell (e.g., cell 116) has been detected and/or otherwise receiving information indicating, or making a determination, that an anomalous condition associated with the cell has been detected or is or has occurred, the detector component 220 can identify one or more communication devices (e.g., communication device 104) associated with the cell (e.g., cell 116) based at least in part on the results of analyzing information relating to respective communication conditions associated with respective communication devices (e.g., communication devices 104, 106, or 108) associated with (e.g., connected to) the base station. The detector component 220 can determine that a set of signaling can be attributed to a certain communication device (e.g., an aggressive or excessive signaling, and/or malicious acting, communication device) by analyzing the signal characteristics associated with the communication device (e.g., communication device 104) in relation to (e.g., in contrast to) the signal characteristics of other communication devices (e.g., communication devices 106 or 108). For instance, the detector component 220 can identify measurements of communication conditions that can identify (e.g., be a communication signature of) a communication device (e.g., communication device 104), wherein, for example, multiple same or similar measurements of communication conditions can indicate that such communication conditions are associated with the same communication device. The communication conditions associated with a communication device (e.g., communication devices 104, 106, or 108) can comprise, for example, a received signal strength indicator (RSSI), a received signal received power (RSRP), a received signal received quality (RSRQ), a channel quality indicator (CQI), a signal to interference and noise ratio (SINR), and/or a timing advance (TA) associated with the communication device. By identifying the respective signal characteristics (e.g., respective communication signatures) of the respective communication devices (e.g., communication devices 104, 106, and/or 108), the detector component 220 can correlate signals or messages associated with different temporary identifiers and can attribute all of those signals or messages to a single communication device (e.g., an aggressive or excessive signaling, and/or malicious acting, communication device (e.g., 104)), even though such signals or messages are associated with different temporary identifiers.

In some embodiments, the \ detector component 220 can determine (e.g., calculate) a calculated parameter value for a communication device (e.g., communication device 104, 106, or 108) based at least in part on (e.g., as a function of or as a combination of) a group of communication condition parameters (e.g., RSSI, RSRP, RSRQ, CQI, SINR, TA, and/or another desired communication condition parameter) associated with the communication device, wherein the calculated parameter value can represent, at least in part, the communication signature associated with the communication device. For instance, the detector component 220 can determine a first calculated parameter value associated with a first communication device (e.g., communication device 104) based at least in part on a first group of communication condition parameters associated with the first communication device, and can determine a second calculated parameter value associated with a second communication device (e.g., communication device 106) based at least in part on a second group of communication condition parameters associated with the second communication device. The detector component 220 can distinguish between and identify the first communication device (e.g., communication device 104) and the second communication device (e.g., communication device 106) based at least in part on the results of analyzing the first calculated parameter value associated with the first communication device and the second calculated parameter value associated with the second communication device.

By identifying or determining the respective signal characteristics (e.g., respective communication signatures) of the respective communication devices, the detector component 220 can correlate signals or messages associated with different temporary identifiers and can attribute all of those signals or messages to a single communication device (e.g., an aggressive or excessive signaling, and/or malicious acting, communication device), even though such signals or messages are associated with different temporary identifiers. For example, the cell 116 or associated base station 112 can receive a set of signals (e.g., control signals, other type of signals, or messages) with temporal identifiers from communication devices (e.g., communication devices 104, 106, and/or 108), wherein the set of signals can comprise a first signal associated with a first temporal identifier (e.g., 10), a second signal associated with a second temporal identifier (e.g., 20), a third signal associated with a third temporal identifier (e.g., 30), a fourth signal associated with a fourth temporal identifier (e.g., 50), a fifth signal associated with a fifth temporal identifier (e.g., 60), a sixth signal associated with a sixth temporal identifier (e.g., 90), a seventh signal associated with a seventh temporal identifier (e.g., 110), and an eighth signal associated with an eighth temporal identifier (e.g., 160).

The detector component 220 can analyze the respective signal characteristics (e.g., RSSI, RSRP, RSRQ, CQI, SINR, TA, and/or other type of signal characteristic (e.g., communication condition)) associated with the respective signals of the respective signals of the set of signals. Based at least in part on the results of analyzing the signal characteristics of the respective signals, the detector component 220 can determine or identify that the respective signal characteristics of the second signal, fourth signal, fifth signal, seventh signal, and eighth signal can be the same or substantially the same as each other, while the first signal, third signal, and sixth signal can have relatively different signal characteristics than the second, fourth, fifth, seventh, and eighth signals. As a further result of such analysis, the detector component 220 can determine that a subset of the signals (e.g., the second signal, fourth signal, fifth signal, seventh signal, and eighth signal) can be attributed to the same communication device (e.g., communication device 104), based at least in part on the result of determining that the respective signal characteristics of the respective signals of the subset of signals are the same or substantially the same as each other (e.g., same or similar calculated parameter values, same or similar RSSI values, same or similar RSRP values, same or similar RSRQ values, same or similar CQI values, same or similar SINR values, same or similar TA values, and/or same or similar other communication condition parameter values), even though the second signal, fourth signal, fifth signal, seventh signal, and eighth signal are associated with different temporal identifiers. The detector component 220 also can determine that the other signals (e.g., the first signal, third signal, and sixth signal) can be attributed to one or more other communication devices (e.g., communication devices 106 and/or 108) based at least in part on the analysis results indicating that the signal characteristics of these other signals are significantly different from the signal characteristics of the subset of signals attributed to the other communication device (e.g., communication device 104).

While in many (e.g., most) cases a combination of measurements of communication conditions can provide a sufficient communication signature associated with a communication device, there still potentially can be cases where false positives can occur with regard to the identification of a communication device or whether a communication device is acting in a benign manner or is engaging in excessive signaling (e.g., where a benign communication device has similar measurements of communication conditions as an excessive signaling communication device). In some embodiments, to improve (e.g., increase) accuracy in identifying communication devices, in addition to analyzing communication conditions associated with communication devices (e.g., communication devices 104, 106, and/or 108), the detector component 220 can analyze respective configuration parameters and/or other information associated with respective communication devices to facilitate identifying communication devices. The configuration parameters associated with a communication device (e.g., communication devices 104, 106, or 108) can comprise, for example, a quality of service class identifier (QCI), allocation and retention priority (ARP) parameter, a mobility management entity or access management function (MME/AMF) code, a MME/AMF group identifier, a band frequency associated with the communication device, or another desired configuration parameter. Different communication devices can or may have a different configuration parameter or different groups of configuration parameters, which the detector component 220 can utilize to facilitate distinguishing between and identifying communication devices.

The detector component 220 can analyze the configuration parameters, for example, to confirm an identification of a communication device that was determined based on the communication conditions associated with that communication device, improve (e.g., increase) or at least attempt to improve, a confidence level in the identification of the communication device, and/or eliminate false positives. In certain embodiments, the detector component 220 can determine (e.g., calculate) a calculated parameter value for a communication device (e.g., communication device 104, 106, or 108) based at least in part on (e.g., as a function of) the group of communication condition parameters and a group of configuration parameters (e.g., QCI, ARP, MME/AMF code, MME/AMF group identifier, band frequency, and/or another desired configuration parameter) associated with the communication device, wherein the calculated parameter value can represent, at least in part, the communication signature associated with the communication device.

The detector component 220 can evaluate one or more communication devices (e.g., one or more identified communication devices), and, for each communication device (e.g., communication devices 104, 106, or 108), can determine whether to classify the communication device as an excessive signaling device based at least in part on whether the number of control signals received from the communication device (e.g., communication device 104) by the cell (e.g., cell 116) during a defined time period satisfies (e.g., breaches, or meets or exceeds) a defined threshold number of control signals that can be indicative of excessive signaling by the communication device, in accordance with the defined communication management criteria. If the detector component 220 determines that a communication device (e.g., communication device 106) does not satisfy (e.g., does not breach, or does not meet or exceed) the defined threshold number of control signals, the detector component 220 can determine that the communication device is not to be classified as an excessive signaling device. If, instead, the detector component 220 determines that the communication device (e.g., communication device 104) satisfies the defined threshold number of control signals, the detector component 220 can determine that the communication device can be classified as an excessive signaling (and/or malicious acting) device.

In response to determining that a communication device(s) (e.g., communication device 104) is an excessive signaling and/or malicious acting communication device, the detector component 220 can determine (e.g., calculate) and generate a set of statistics relating to the excessive signaling of the communication device(s). In accordance with various embodiments, the detector component 220 can determine and generate a set of statistics with regard to an individual excessive signaling communication device (e.g., communication device 104), or can determine and generate a set of statistics for a group of excessive signaling communication devices. The set of statistics can provide desired (e.g., relevant or suitable) information regarding the excessive signaling to enable the SMC 128 or user to learn more about the excessive signaling and/or to facilitate making determinations regarding how to respond to the excessive signaling (e.g., taking mitigation action to mitigate the excessive signaling). The set of statistics can comprise a device identifier (e.g., UE_ID) that the detector component 220 can assign to an excessive signaling communication device to facilitate identifying the communication device (e.g., since the IMEI and IMSI are not available to the detector component 220).

The set of statistics also can comprise an exception level, which can indicate the how exceptional or concerning the excessive signaling of the excessive signaling communication device is. The detector component 220 can determine the exception level based at least in part on one or more defined threshold exception levels and the results of analyzing information relating to the excessive signaling of a communication device. The exception levels can relate to respective response categories, such as, for example, alert (e.g., alert the SMC 128, communication network 102, or user about the detected excessive signaling), log and learn (e.g., track and log more information regarding the excessive signaling to learn more about the excessive signaling and/or excessive signaling device(s)), throttle (e.g., recommend, suggest, or indicate that the excessive signaling is particularly problematic or harmful, or potentially harmful, to the RAN 110, cell 116, base station 112, or communication network 102, and throttling (e.g., partially blocking) of the excessive signaling device(s) to block at least a portion of the attempts by the device to attach to, connect to, or communicate with the cell 116 (or other cells) may be warranted), block (e.g., recommend, suggest, or indicate that the excessive signaling is particularly problematic or harmful, or potentially harmful, to the RAN 110, cell 116, base station 112, or communication network 102, and blocking of the excessive signaling device(s) may be warranted), or another desired response category. If the detector component 220 determines that a lower defined threshold exception level has been satisfied with regard to an excessive signaling communication device, the detector component 220 can assign a relatively lower exception level (e.g., alert exception level, or log and learn exception level) to the excessive signaling communication device. If the detector component 220 determines that a higher (e.g., highest) defined threshold exception level has been satisfied with regard to an excessive signaling communication device, the detector component 220 can assign a higher exception level (e.g., block exception level) to the excessive signaling communication device.

The set of statistics also can comprise an exception trend. Based at least in part on the results of analyzing information relating to the excessive signaling of a communication device (e.g., communication device 104), the detector component 220 can determine an exception trend of the signaling by the communication device. For instance, if the detector component 220 determines that the signaling by the excessive signaling communication device has been increasing over time, the detector component 220 can determine that the excessive signaling is trending upward and can indicate that the exception trend is upward. If, instead, the detector component 220 determines that the signaling by the excessive signaling communication device has been decreasing over time, the detector component 220 can determine that the excessive signaling is trending downward and can indicate that the exception trend is downward. If, instead, the detector component 220 determines that the signaling by the excessive signaling communication device has been relatively stable over time, the detector component 220 can determine that the excessive signaling is relatively stable and can indicate that the exception trend is stable. If, instead, the detector component 220 is unable to determine the trend of the signaling by the excessive signaling communication device, the detector component 220 can indicate that the exception trend is unknown.

In some embodiments, the set of statistics can comprise calculated periodic communication values. For example, the detector component 220 can determine an average number of control signals (e.g., attach signals, update signals, or other type of control signal) associated with an excessive signaling communication device (e.g., communication device 104) over each time period of a set of time periods. The average number can be or represent a true average, a median, a mean, a mode, or other mid-point value that can represent or indicate a level or frequency of control signaling over a particular time period. As another example, the detector component 220 can determine a variance value relating to the communication of control signals by an excessive signaling communication device. The variance value can indicate whether there is one or more spikes (e.g., peaks) in control signaling by the excessive signaling communication device (e.g., one or more time periods where the excessive signaling spikes higher relative to one or more other time periods where the signaling is relatively lower). The detector component 220 can determine the exception trend based at least in part on the periodic communication values.

The set of statistics also can include time information, such as a start time(s) and end time(s), associated with the various other statistics of the set of statistics. For instance, a start and stop time can be over a one-minute period, a one-hour period, a one-day period, a one-week period, a one-month period, a one-year period, or other desired period of time.

The set of statistics further can comprise a confidence level(s) that can indicate the level of confidence in the identification of a communication device (e.g., communication device 104), the level of confidence in a determination that a communication device is an excessive signaling and/or maliciously acting communication device, and/or an overall confidence level relating to the identification of the communication device and determination that it is an excessive signaling device. The detector component 220 can determine (e.g., calculate) a confidence level(s) based at least in part on the results of analyzing the group of communication condition parameters, the group of configuration parameters, calculated parameter values, and/or other desired (e.g., relevant or suitable) information associated with a communication device(s). For instance, if a group of calculated parameter values are relatively consistent (e.g., same or substantially the same) over a period of time, the detector component 220 can determine that there is a relatively high confidence level that the calculated parameter values of the group of calculated parameter values are associated with a same communication device (e.g., communication device 104) and the group of calculated parameter values can represent a communication signature of the communication device. If, instead, a group of calculated parameter values is not very consistent (e.g., vary somewhat relative to each other) over a period of time, the detector component 220 can determine that there is a relatively lower confidence level that the calculated parameter values of the group of calculated parameter values are associated with a same communication device.

As another example, if the detector component 220 determines that an identified communication device (e.g., communication device 104) has been excessively signaling on a relatively consistent basis over a number of periods of time, the detector component 220 can determine that there is a relatively high confidence level that the communication device is an excessive signaling communication device. If, instead, the detector component 220 determines that an identified communication device was excessively signaling on a relatively inconsistent basis over a number of periods of time (e.g., where the communication device was determined to be excessively signaling over one or a small number of periods of time, but not excessive signaling over most of the periods of time under consideration), the detector component 220 can determine that there is a relatively lower confidence level that the communication device is an excessive signaling communication device.

In certain embodiments, to facilitate determining whether a communication device (e.g., communication device 104, 106, or 108) is an aggressive (e.g., excessive signaling and/or malicious acting) communication device, determining a level of aggressiveness (e.g., excessive signaling) of an excessive signaling communication device, and/or determining a type of communication device that is engaging in aggressive behavior against the RAN 110, a cell (e.g., cell 116), and/or a base station (e.g., base station 112), the detector component 220 can receive information relating to device type reputations of communication devices via a desired interface from the core network of the communication network 102. While information relating to device type reputations of communication devices may not always be available to the detector component 220, in some instance, the detector component 220 can obtain such information from the core network.

For example, if a communication device (e.g., communication device 104) is an aggressive communication device that was not yet identified as aggressive (e.g., excessive signaling) by the detector component 220 or was not blocked by the SMC 128, the communication device can be allowed to continue its registration attempt all the way to the core network (e.g., using non-access stratum (NAS) messages). In such instances, the device identifiers (e.g., IMEI, IMSI) can be revealed to the core network and information relating to the device identifiers (but not the device identifiers themselves) can be received by the detector component 220.

Such information can comprise, for example, the device vendor and model of a communication device, which can be represented in the type allocation code (TAC) associated with the communication device (e.g., communication device 104). The TAC of a communication device (e.g., communication device 104, 106, or 108) can be mapped to the C-RNTI and/or TMSI, wherein such mapping can be part of the information relating to the device type reputation that can be received by the detector component 220. The device type reputation information can be useful to facilitate detecting aggressive communication devices of a certain type (e.g., device vendor and/or device model) that can or potentially can engage in common aggressive behavior (e.g., due to a vulnerability in the type of communication device that renders it susceptible to being infected with malware).

The detector component 220 can maintain information relating to the device type reputations of devices, including information regarding common aggressive behavior of certain types (e.g., certain device vendor(s) and/or device model(s)) of communication devices (e.g., communication devices 104, 106, and/or 108). The detector component 220 also can maintain information regarding signaling patterns of certain types of communication devices. The detector component 220 can use the information regarding common aggressive behavior of certain types of communication devices and/or the information regarding signaling patterns of certain types of communication devices to facilitate detecting aggressive communication devices and/or determining when certain types of communication devices, while engaging in relatively higher levels of communicating control signaling than other communication devices, are not aggressive signaling devices, but rather are devices that merely engage in more signaling than other types of communication devices. Information relating to the device type reputations of communication devices, such as, for example, certain information relating to certain types (e.g., certain device vendor(s) and/or device model(s)) of communication devices, can be attributed (e.g., by the detector component 220) to all future attempts (e.g., attach attempts or other control signaling) to signal the core network by communication devices of that certain type, as the temporary identifiers of the certain types of communication devices can be mapped to the TAC.

Information relating to common aggressive behavior of certain types of communication devices can be useful (e.g., helpful) in cases, for example, where the detector component 220 can know a-priory that a certain device model has a vulnerability that can cause the certain device model of communication device to undesirably (e.g., excessively) attempt to attach to the core network once every two seconds, or another particular device model has a vulnerability that can cause the particular device model of communication device to undesirably (e.g., excessively) attempt to attach to the core network every time the particular device model of communication device is moved. As part of its analysis to determine whether a communication device(s) (e.g., communication devices 104, 106, and/or 108) is an aggressive (e.g., excessive signaling) communication device, the detector component 220 can analyze the information relating to device type information, the information relating to cell classification or an anomalous condition associated with a cell (e.g., cell 116), and other received information (e.g., information relating to communication conditions, and/or information relating to configuration parameters), and based at least in part on the analysis results, can determine whether a communication device(s) (e.g., communication devices 104, 106, and/or 108) is an aggressive communication devices(s), in accordance with the defined communication management criteria. This can enable the detector component 220 to more accurately determine whether a communication device is an aggressive communication device or not (e.g., can reduce false positive determinations of aggressive signaling by devices, and/or can reduce false positive determinations of benign actions by communication devices that actually are aggressive communication devices).

As another example, a particular type of communication device (e.g., particular device vendor(s) and/or device model (s)) can, as part of normal operation, communicate a relatively higher number of control signals to a cell (e.g., cell 116) than other types of communication devices. The detector component 220 can receive information relating to the device type information of such particular type of communication device, and can take into account (e.g., incorporate into its analysis) that this particular type of communication device, as part of its normal operation, communicates a relatively higher number of control signals to the base stations. This can enable the detector component 220 to be more accurate in determining whether a communication device (e.g., the particular type of communication device) is an aggressive communication device or not, as this can reduce false positive determinations that this particular type of communication device is an aggressive communication device in instances where such communication device is merely engaging in normal (albeit a relatively higher level of) communication of control signaling to a cell (e.g., cell 116).

As disclosed, the SMC 128 also can comprise the connection manager component 222. The connection manager component 222 can determine whether to perform a mitigation action or other action (e.g., logging and learning action, alert action) with regard to an aggressive (e.g., excessive signaling) communication device (e.g., communication device 104) based at least in part on the information, including the set of statistics, received from the detector component 220, in accordance with the defined communication management criteria. For example, if, based at least in part on the results of the analysis of the set of statistics and/or other information relating to a communication device (e.g., communication device 104), the connection manager component 222 determines that the exception level is not too high (e.g., level of excessive signaling is not too high) and/or the exception trend is not indicating that the excessive signaling is trending upward, the connection manager component 222 can or may determine that an action(s), such as an alert action or a logging and learning action, other than blocking or throttling of the communication device (e.g., communication device 104) can be the action(s) to be performed (e.g., by the SMC 128), when doing so is in accordance with the defined communication management criteria. In response to determining that an alert action or a logging and learning action is to be performed with regard to the communication device (e.g., communication device 104), the connection manager component 222 can generate alert instructions or logging and learning instructions and can communicate the alert instructions or logging and learning instructions to the RAN 110, base station 112, cell 116, detector component 220, another component of the SMC 128, another component of the communication network 102, or the communication device 136 associated with the user. In response to such instructions, the RAN 110, base station 112, cell 116, detector component 220, another component of the SMC 128, another component of the communication network 102, or communication device 136 can generate an alert regarding the excessive signaling communication device (e.g., to alert the user or a component of or associated with the core network regarding the excessive signaling communication device), or can log information regarding the excessive signaling communication device to facilitate learning more about the excessive signaling communication device, other similar excessive signaling communication devices, and/or vulnerabilities or malware associated with the excessive signaling communication device.

As another example, if, based at least in part on the results of the analysis of the set of statistics and/or other information relating to a communication device (e.g., communication device 104), the connection manager component 222 determines that the exception level is relatively high (e.g., level of excessive signaling is relatively high) and/or the exception trend is indicating that the excessive signaling is trending upward (e.g., and is at or is heading towards a relatively high level), the connection manager component 222 can or may determine that a mitigation action to block or throttle the communication device (e.g., communication device 104) can be the action(s) to be performed (e.g., by the SMC 128), when doing so is in accordance with the defined communication management criteria. In response to determining that the mitigation action to block the communication device (e.g., communication device 104) is to be performed, the connection manager component 222 can generate blocking instructions and can communicate the blocking instructions to the base station 112 or cell 116. In response to the blocking instructions, the base station 112 or cell 116 can block or disconnect the excessive signaling communication device (e.g., communication device 104) to disconnect the communication from the base station 112 or cell 116, or can prevent the communication device from connecting to the base station 112 or cell 116. In response to determining that the mitigation action to throttle (e.g., partially block) the communication device (e.g., communication device 104) is to be performed, the connection manager component 222 can generate throttling instructions and can communicate the throttling instructions to the base station 112 or cell 116. In response to the throttling instructions, the base station 112 or cell 116 can throttle the excessive signaling communication device (e.g., communication device 104) to block at least a desired portion (e.g., 50%, 60%, 70%, 80%, or other desired portion greater or less than 80%) of the attempts of the excessive signaling communication device to attach to, connect to, or communicate with the base station 112 or cell 116 (or other base stations or cells, such as other base stations or cells associated with the RAN 110).

For instance, with regard to blocking or disconnecting of an excessive signaling communication device (e.g., communication device 104) by or from the base station 112 or cell 116, even though the SMC 128 does not know the permanent device or subscriber identifiers (e.g., IMEI, IMSI) associated with the excessive signaling communication device, the detector component 220 has identified the communication signature of the excessive signaling communication device. To facilitate blocking or disconnecting the excessive signaling communication device (e.g., communication device 104), the connection manager component 222 can instruct the RAN 110, base station 112, and/or cell 116 to block or disconnect all or some (e.g., a desired portion or percentage of) communication devices that have a communication signature that is same as or substantially similar to the communication signature identified for the excessive signaling communication device (e.g., communication device 104), which will, or at least very likely will, result in the blocking or disconnecting of the excessive signaling communication device (e.g., communication device 104) by or from the base station 112 or cell 116. For example, if the excessive signaling communication device (e.g., communication device 104) has a particular calculated parameter value, a particular communication condition value, or a particular set of communication condition values, the connection manager component 222 can instruct the RAN 110, base station 112, and/or cell 116 to block or disconnect all or some communication devices (e.g., communication device 104) that have a calculated parameter value that falls in a range of calculated parameter values that can be determined based at least in part on, and can comprise, the particular calculated parameter value; block or disconnect all or some communication devices (e.g., communication device 104) that have a communication condition value that falls in a range of communication condition values that can be determined based at least in part on, and can comprise, the particular communication condition value; or block or disconnect all or some communication devices (e.g., communication device 104) that have a particular set of communication condition values where the respective communication condition values in the set fall in respective ranges of communication condition values that can be determined based at least in part on, and can comprise, the particular set of communication condition values. The connection manager component 222 can thereby effectively block the excessive signaling communication device (e.g., communication device 104) without having to block benign acting (e.g., non-aggressive or non-malicious) communication devices (e.g., communication devices 106 or 108), which can have communication signatures that can be different from the communication signature of the excessive signaling communication device (e.g., communication device 104).

In some embodiments, the SMC 128 can comprise a communicator component 224 can communicate (e.g., transmit and/or receive) information, including information relating to cells, signal measurement data, alert signals, detection of anomalous conditions, communication conditions associated with communication devices, configuration parameters associated with communication devices, mitigation or other actions, statistics, metadata, or other desired information relating to management of communications and the communication network 102. For instance, the communicator component 224 can receive information relating to signaling associated with cells, communication conditions associated with communication devices, and/or configuration parameters associated with communication devices from cells, associated base stations, or associated RANs. The communicator component 224 also can transmit information relating to alert signals to communication devices or interface components associated with users, and/or information relating to mitigation actions (e.g., blocking or throttling actions) or other desired actions (e.g., response actions) to RANs, base stations, or cells.

In certain embodiments, the SMC 128 can comprise an operations manager component 226 that can control (e.g., manage) operations associated with the SMC 128. For example, the operations manager component 226 can facilitate generating instructions to have components of the SMC 128 perform operations, and can communicate respective instructions to respective components (e.g., NN component 130, feature reformer component 132, alert component 218, detector component 220, connection manager component 222, communicator component 224, processor component 228, data store 230, or other component) of the SMC 128 to facilitate performance of operations by the respective components of the SMC 128 based at least in part on the instructions, in accordance with the defined communication management or network security criteria, and communication management or network security algorithms (e.g., AI, NN, or machine learning algorithms, NN selection algorithms, cluster assignment algorithms, anomalous condition detection algorithms, aggressive or malicious event detection algorithms, connection management algorithms, parsing algorithms, filtering algorithms, or other algorithm, as disclosed, defined, recited, or indicated herein by the methods, systems, and techniques described herein). The operations manager component 226 also can facilitate controlling data flow between the respective components of the SMC 128 and controlling data flow between the SMC 128 and another component(s) or device(s) (e.g., a communication device, a RAN, a base station or other network component or device of the communication network, data sources, or applications) associated with (e.g., connected to) the SMC 128.

The SMC 128 also can include a processor component 228 that can work in conjunction with the other components (e.g., NN component 130, feature reformer component 132, alert component 218, detector component 220, connection manager component 222, communicator component 224, operations manager component 226, data store 230, or other component) to facilitate performing the various functions of the SMC 128. The processor component 228 can employ one or more processors, microprocessors, or controllers that can process data, such as information relating to cells, cell clusters, cell or base station classification information, characteristics associated with cells or cell clusters, the cell cluster repository, NNs, signal measurement data, vectors relating to signal measurement data, feature reforming of data, FFTs, truncation of data, anomalous conditions associated with cells, threshold values, alert signals, communication devices, communication conditions associated with communication devices, configuration parameters associated with communication devices, device reputation information associated with communication devices, characteristics associated with communication devices or groups of communication devices, identifiers or authentication credentials associated with communication devices, network conditions, metadata, messages, data parsing, data filtering, aggressive or malicious events, aggressive or malicious event determinations, false positive determinations, connection management determinations, parameters, traffic flows, policies, defined communication management criteria, defined network security criteria, algorithms (e.g., AI, NN, or machine learning algorithms, NN selection algorithms, clustering algorithms, anomalous condition detection algorithms, aggressive or malicious event detection algorithms, connection management algorithms, parsing algorithms, filtering algorithms, or other algorithm), protocols, interfaces, tools, and/or other information, to facilitate operation of the SMC 128, as more fully disclosed herein, and control data flow between the SMC 128 and other components (e.g., a communication device, a RAN, a base station or other network component or device of the communication network, data sources, applications) associated with the SMC 128.

The data store 230 can store data structures (e.g., user data, metadata), code structure(s) (e.g., modules, objects, hashes, classes, procedures) or instructions, information relating to cells, cell clusters, cell or base station classification information, characteristics associated with cells or cell clusters, the cell cluster repository, NNs, signal measurement data, vectors relating to signal measurement data, feature reforming of data, FFTs, truncation of data, anomalous conditions associated with cells, threshold values, alert signals, communication devices, communication conditions associated with communication devices, configuration parameters associated with communication devices, device reputation information associated with communication devices, characteristics associated with communication devices or groups of communication devices, identifiers or authentication credentials associated with communication devices, network conditions, metadata, messages, data parsing, data filtering, aggressive or malicious events, aggressive or malicious event determinations, false positive determinations, connection management determinations, parameters, traffic flows, policies, defined communication management criteria, defined network security criteria, algorithms (e.g., AI, NN, or machine learning algorithms, NN selection algorithms, clustering algorithms, anomalous condition detection algorithms, aggressive or malicious event detection algorithms, connection management algorithms, parsing algorithms, filtering algorithms, or other algorithm), protocols, interfaces, tools, and/or other information, to facilitate controlling operations associated with the SMC 128. In some embodiments, the cell cluster repository 134 can be stored in the data store 230. In an aspect, the processor component 228 can be functionally coupled (e.g., through a memory bus) to the data store 230 in order to store and retrieve information desired to operate and/or confer functionality, at least in part, to the NN component 130, feature reformer component 132, alert component 218, detector component 220, connection manager component 222, communicator component 224, operations manager component 226, processor component 228, data store 230, or other component, and/or substantially any other operational aspects of the SMC 128.

Described herein are systems, methods, articles of manufacture, and other embodiments or implementations that can facilitate detecting and mitigating malicious events against a RAN of a communication network, and managing connection of communication devices to the RAN, as more fully described herein. The detecting and mitigating malicious events against a RAN of a communication network, and managing connection of communication devices to the RAN, and/or other features of the disclosed subject matter, can be implemented in connection with any type of device with a connection to, or attempting to connect to, the communication network (e.g., a wireless or mobile device, a computer, a handheld device, etc.), any Internet of things (IoT) device (e.g., health monitoring device, toaster, coffee maker, blinds, music players, speakers, etc.), and/or any connected vehicles (e.g., cars, airplanes, space rockets, and/or other at least partially automated vehicles (e.g., drones)). In some embodiments, the non-limiting term user equipment (UE) is used. It can refer to any type of wireless device that communicates with a radio network node in a cellular or mobile communication system. Examples of UE can be a target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles, etc. Note that the terms element, elements, and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller component that can control routing of traffic within the network and between the network and traffic destinations. The SDN controller component can be merged with the 5G network architecture to enable service deliveries via open Application Programming Interfaces (APIs) and move the network core towards an all Internet Protocol (IP), cloud based, and software driven telecommunications network. The SDN controller component can work with, or take the place of, Policy and Charging Rules Function (PCRF) network elements so that policies such as quality of service and traffic management and routing can be synchronized and managed end to end.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Figure 9:
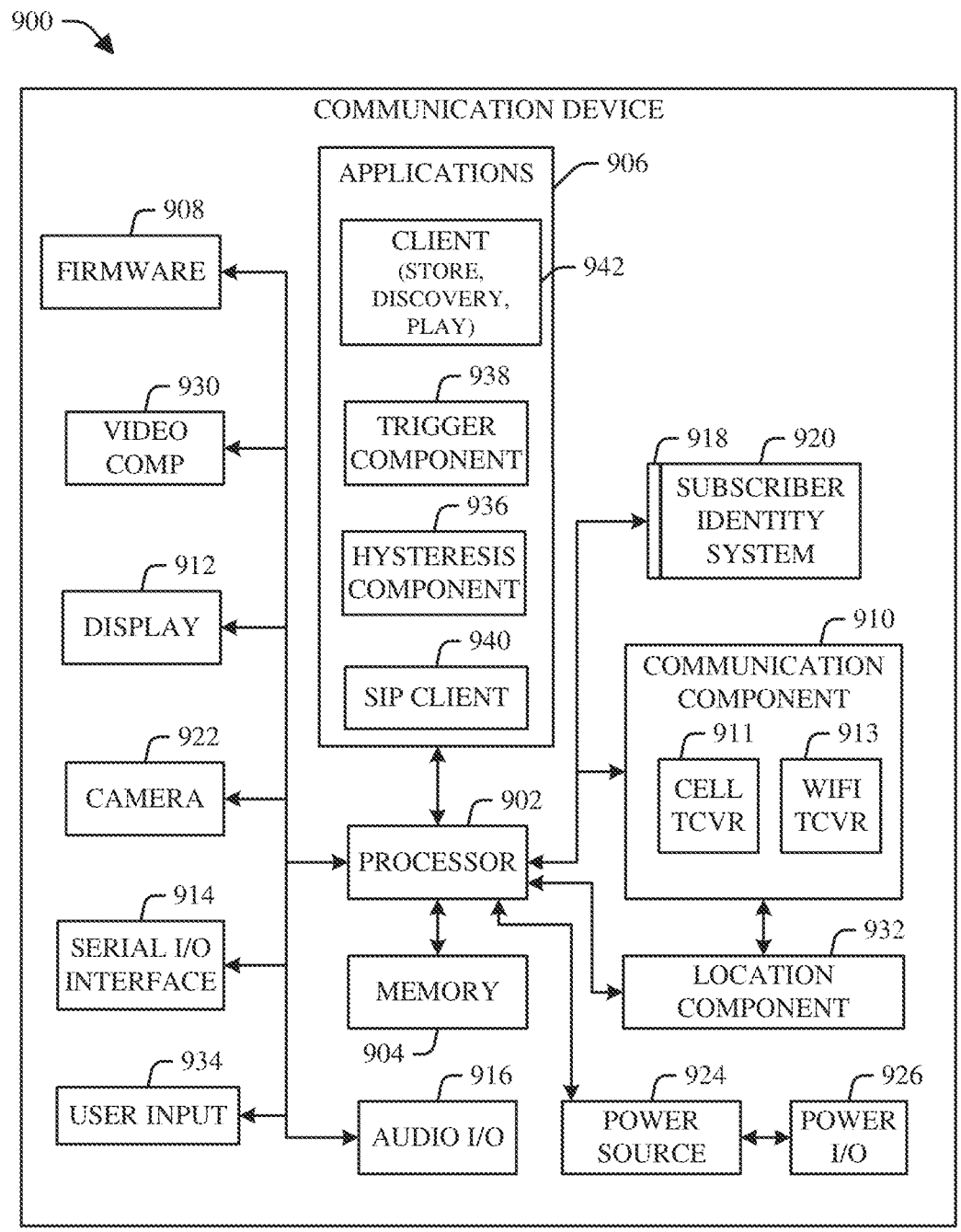
FIG. 9 depicts a block diagram of an example communication device operable to engage in a system architecture that facilitates wireless communications according to one or more embodiments described herein.

Referring now to FIG. 9, depicted is an example block diagram of an example communication device 900 (e.g., wireless or mobile phone, electronic pad or tablet, electronic eyewear, electronic watch, or other electronic bodywear, IoT device, or other type of communication device) operable to engage in a system architecture that facilitates wireless communications according to one or more embodiments described herein. Although a communication device is illustrated herein, it will be understood that other devices can be a communication device, and that the communication device is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the disclosed subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The communication device 900 can include a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the communication device 900. A communication component 910 interfaces to the processor 902 to facilitate wired/wireless communication with external systems, e.g., cellular networks, VoIP networks, and so on. Here, the communication component 910 can also include a suitable cellular transceiver 811 (e.g., a GSM transceiver) and/or an unlicensed transceiver 813 (e.g., Wi-Fi, WiMax) for corresponding signal communications. The communication device 900 can be a device such as a cellular telephone, a PDA with mobile communications capabilities, and messaging-centric devices. The communication component 910 also facilitates communications reception from terrestrial radio networks (e.g., broadcast), digital satellite radio networks, and Internet-based radio services networks.

The communication device 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the communication device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The communication device 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the communication device 900, and updated by downloading data and software.

The communication device 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the communication device 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The communication device 900 also includes a power source 924 in the form of batteries and/or an AC power subsystem, which power source 924 can interface to an external power system or charging equipment (not shown) by a power 110 component 926.

The communication device 900 can also include a video component 930 for processing video content received and, for recording and transmitting video content. For example, the video component 930 can facilitate the generation, editing and sharing of video quotes. A location tracking component 932 facilitates geographically locating the communication device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the communication device 900 to support SIP protocols and register the subscriber with the SIP registrar server. The applications 906 can also include a client 942 that provides at least the capability of discovery, play and store of multimedia content, for example, music.

The communication device 900, as indicated above related to the communication component 910, includes an indoor network radio transceiver 913 (e.g., Wi-Fi transceiver). This function supports the indoor radio link, such as IEEE 802.11, for the dual-mode GSM device (e.g., communication device 900). The communication device 900 can accommodate at least satellite radio services through a device (e.g., handset device) that can combine wireless voice and digital radio chipsets into a single device (e.g., single handheld device).

Figure 10:
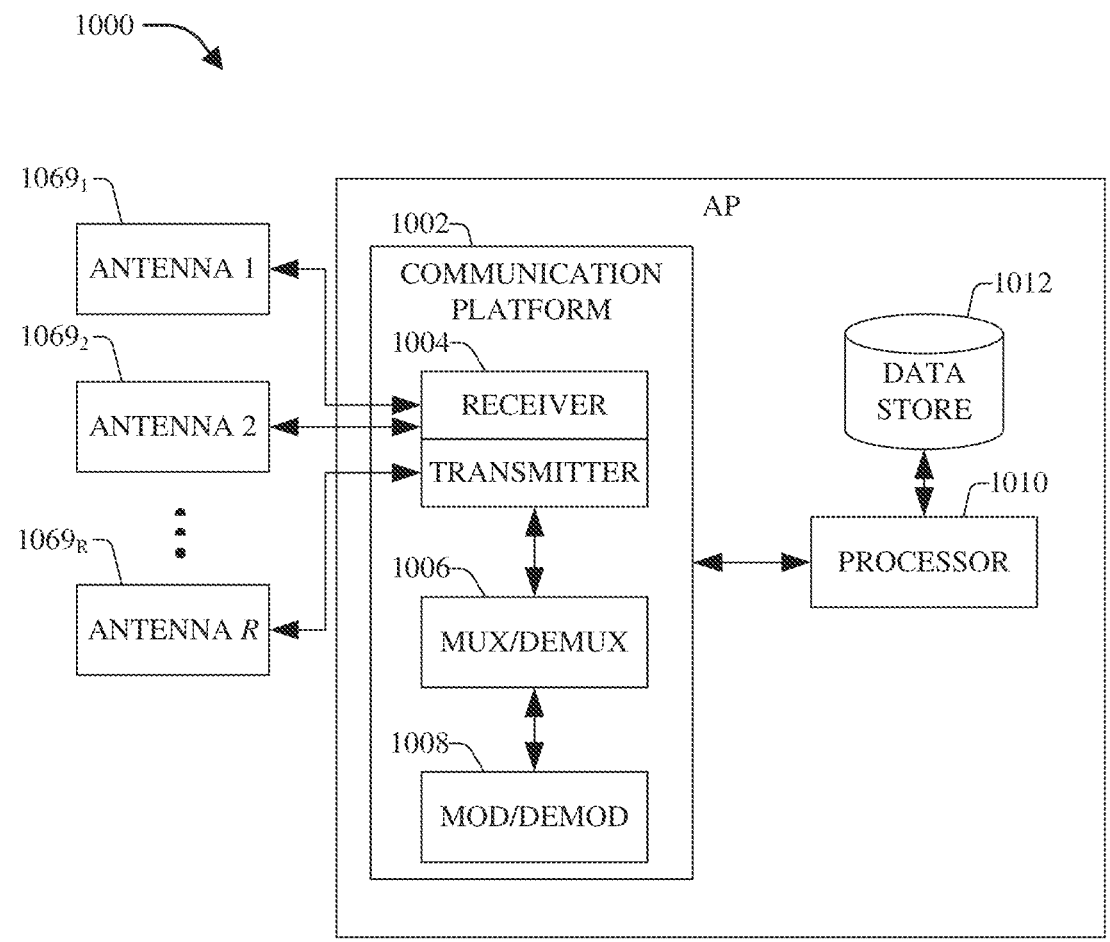
FIG. 10 illustrates a block diagram of an example access point, in accordance with various aspects and embodiments of the disclosed subject matter.

FIG. 10 illustrates a block diagram of an example AP 1000 (e.g., macro base station, femto AP, pico AP, Wi-Fi AP, Wi-Fi-direct AP, or other type of AP), in accordance with various aspects and embodiments of the disclosed subject matter. The AP 1000 can receive and transmit signal(s) from and to wireless devices like access points (e.g., base stations, femtocells, picocells, or other type of access point), access terminals (e.g., UEs), wireless ports and routers, and the like, through a set of antennas 1069$_1$-1069R. In an aspect, the antennas 1069$_1$-1069R are a part of a communication platform 1002, which comprises electronic components and associated circuitry that can provide for processing and manipulation of received signal(s) and signal(s) to be transmitted. In an aspect, the communication platform 1002 can include a receiver/transmitter 1004 that can convert signal from analog to digital upon reception, and from digital to analog upon transmission. In addition, receiver/transmitter 1004 can divide a single data stream into multiple, parallel data streams, or perform the reciprocal operation.

In an aspect, coupled to receiver/transmitter 1004 can be a multiplexer/demultiplexer (mux/demux) 1006 that can facilitate manipulation of signal in time and frequency space. The mux/demux 1006 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 1006 can scramble and spread information (e.g., codes) according to substantially any code known in the art, e.g., Hadamard-Walsh codes, Baker codes, Kasami codes, polyphase codes, and so on. A modulator/demodulator (mod/demod) 1008 also can be part of the communication platform 1002, and can modulate information according to multiple modulation techniques, such as frequency modulation, amplitude modulation (e.g., M-ary quadrature amplitude modulation (QAM), with M a positive integer), phase-shift keying (PSK), and the like.

The AP 1000 also can comprise a processor(s) 1010 that can be configured to confer and/or facilitate providing functionality, at least partially, to substantially any electronic component in or associated with the AP 1000. For instance, the processor(s) 1010 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc.

In another aspect, the AP 1000 can include a data store 1012 that can store data structures; code instructions; rate coding information; information relating to measurement of radio link quality or reception of information related thereto; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), or other algorithm), protocols, interfaces, tools, and/or other information, etc.; white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 1010 can be coupled to the data store 1012 in order to store and retrieve information (e.g., information, such as algorithms, relating to multiplexing/demultiplexing or modulation/demodulation; information relating to radio link levels; information relating to communication conditions (e.g., SINR, implicit NACK rate, RSRP, RSRQ, CQI, and/or other wireless communications metrics or parameters) associated with communication devices, the group of parameters (e.g., resource block parameter, MCS parameter, packet repetition parameter, and/or other desired parameter), the respective threshold values associated with the respective parameters, ACK/NACK-related information (e.g., ACK/NACK status information), time-related information, metadata, communication devices, policies and rules, users, applications, services, communication management criteria, traffic flows, signaling, algorithms (e.g., communication management algorithm(s), mapping algorithm(s), or other algorithm), protocols, interfaces, tools, and/or other information) desired to operate and/or confer functionality to the communication platform 1002 and/or other operational components of AP 1000.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 11-15. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 11:
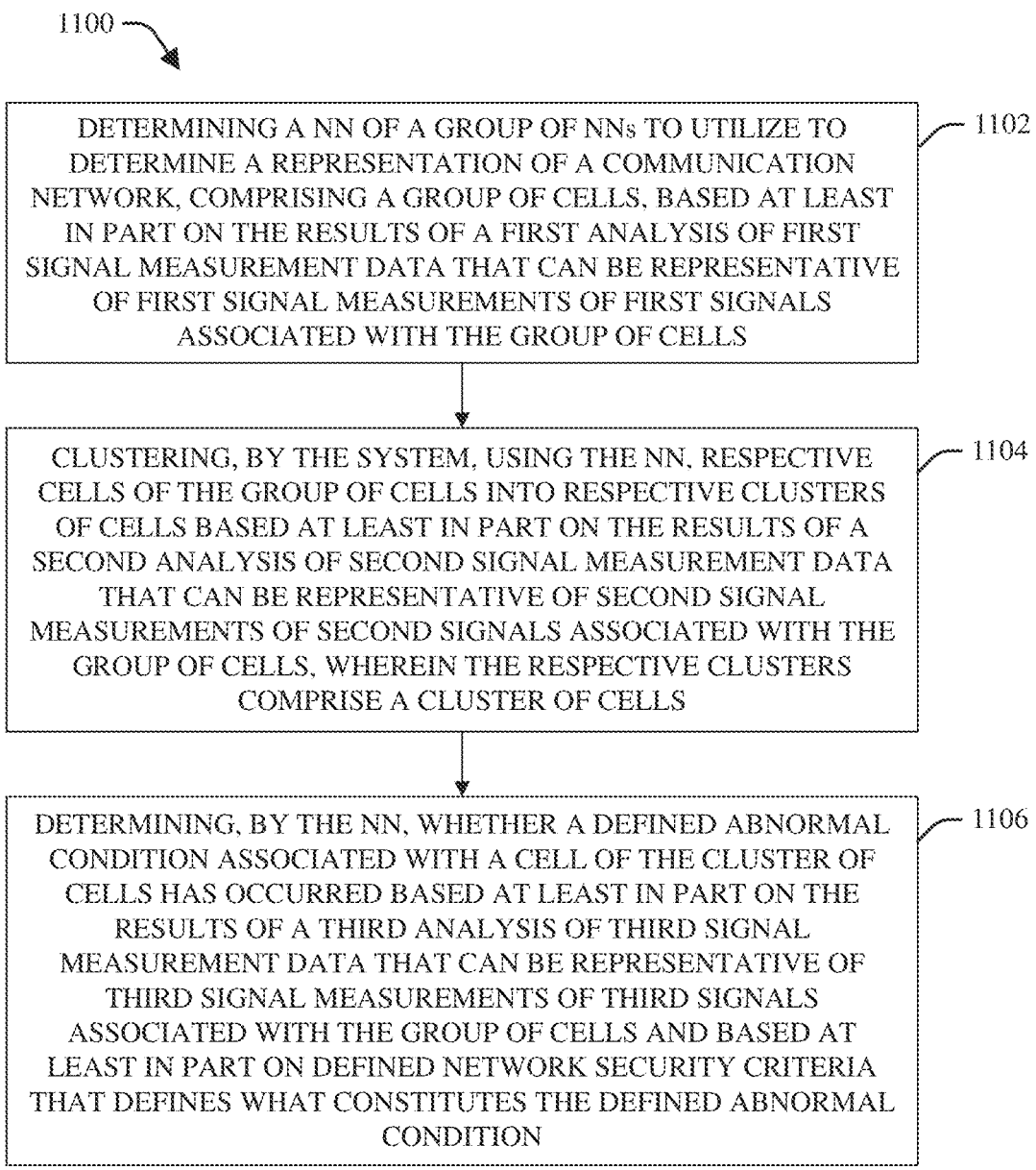
FIG. 11 illustrates a flow chart of an example method that can cluster cells according to their normal signaling behavior and detect abnormal behavior associated with a cell to facilitate detecting aggressive signaling by communication devices against the cell, in accordance with various aspects and embodiments of the disclosed subject matter.

FIG. 11 illustrates a flow chart of an example method 1100 that can cluster cells according to their normal signaling behavior and detect abnormal behavior associated with a cell to facilitate detecting aggressive signaling by communication devices against the cell, in accordance with various aspects and embodiments of the disclosed subject matter. The method 1100 can be employed by, for example, a system comprising the SMC, a processor component (e.g., of or associated with the SMC), and/or a data store (e.g., of or associated with the SMC).

At 1102, a NN of a group of NNs to utilize to determine a representation of a communication network, comprising a group of cells, can be determined based at least in part on the results of a first analysis of first signal measurement data that can be representative of first signal measurements of first signals associated with the group of cells. The communication network (e.g., wireless, cellular, and/or core network) can comprise the group of cells, wherein respective cells can be associated with respective base stations of the communication network. The SMC (e.g., employing a NN) can determine the NN of the group of NNs to utilize to determine the representation (e.g., signaling behavior representation) of the communication network based at least in part on the results of the first analysis of the first signal measurement data associated with the group of cells, as more fully described herein. For example, the SMC (e.g., employing a NN) can determine which NN, of the group of NNs, can most accurately determine the representation of the communication network based at least in part on the results of the first analysis, as more fully described herein. The first signal measurement data can comprise, for example, data regarding a first signal measurements time series associated with the group of cells, wherein respective portions of such data can be associated with respective cells of the group of cells. In some embodiments, the SMC can perform feature reforming on the first signal measurement data to reduce the vector dimensionality of the first signal measurement data to facilitate enhancing encoding and decoding by the NNs of the group of NNs, as more fully described herein.

At 1104, respective cells of the group of cells can be clustered into respective clusters of cells by the system, using the NN, based at least in part on the results of a second analysis of second signal measurement data that can be representative of second signal measurements of second signals associated with the group of cells, wherein the respective clusters comprise a cluster of cells. The NN can cluster the respective cells of the group of cells into the respective clusters of cells based at least in part on the results of the second analysis of the second signal measurement data associated with the group of cells. The second signal measurement data can comprise, for example, data regarding a second signal measurements time series associated with the group of cells, wherein respective portions of such data can be associated with respective cells of the group of cells. The second signal measurement data can be the same as or different from the first signal measurement data.

In some embodiments, if the second signal measurement data is different from the first signal measurement data, the SMC can perform feature reforming on the second signal measurement data to reduce the vector dimensionality of the second signal measurement data to facilitate enhancing encoding and decoding by the NN, as more fully described herein. In certain embodiments, if the second signal measurement data is the same as the first signal measurement data, the SMC can bypass performing feature reforming again on this signal measurement data, and can reuse the feature reforming results on the first signal measurement data (which, in this instance, also is the second signal measurement data) to reduce the vector dimensionality of the first signal measurement data to facilitate enhancing encoding (e.g., encoding of the frequency feature reduced dimensionality vectors relating to the first signal measurement data) by the NN.

As part of the second analysis, the NN can encode the reduced number of vectors associated with (e.g., representative of) the second signal measurement data to further reduce the vector dimensionality associated with (e.g., representative of) the second signal measurement data. For example, the NN can encode the frequency feature reduced dimensionality vectors (e.g., 24×1 vectors) to further reduce the vector dimensionality to a 2×1 vector for each cell, wherein, for each cell, the 2×1 vector associated with such cell can be representative of the portion of the second signal measurement data that is associated with (e.g., relates to) that cell.

The NN can determine (e.g., calculate) relative proximities (e.g., distances or numerical differences) between respective vectors (e.g., respective 2×1 vectors) associated with the respective cells based at least in part on the results of analyzing the respective vectors (e.g., analyzing the respective values (e.g., vector values) of the respective values). The NN can cluster (e.g., iteratively cluster) the respective cells into the respective clusters of cells based at least in part on the relative proximities (e.g., relative distances or differences) between the respective vectors associated with the respective cells, as more fully described herein. The SMC or NN can store information relating to the clusters of cells in the cell cluster repository.

At 1106, a determination can be made, by the NN, regarding whether a defined abnormal condition associated with a cell of the cluster of cells has occurred based at least in part on the results of a third analysis of third signal measurement data that can be representative of third signal measurements of third signals associated with the group of cells and based at least in part on defined network security criteria that defines what constitutes the defined abnormal condition. The third signal measurement data can comprise, for example, data regarding a third signal measurements time series associated with the group of cells, wherein respective portions of such data can be associated with respective cells of the group of cells. As part of the third analysis of the third signal measurement data, the SMC can perform feature reforming on the third signal measurement data to reduce the vector dimensionality of the third signal measurement data to facilitate enhancing encoding by the NN, as more fully described herein.

As part of the third analysis, the NN can encode the frequency feature reduced dimensionality vectors associated with (e.g., representative of) the third signal measurement data to further reduce the number of vectors associated with (e.g., representative of) the third signal measurement data. For example, the NN can encode the frequency feature reduced dimensionality vectors (e.g., 24×1 vectors) to further reduce the dimensionality of those vectors to a 2×1 vector for each cell, wherein, for each cell, the 2×1 vector associated with such cell can be representative of the portion of the third signal measurement data that is associated with (e.g., relates to) that cell.

The NN can classify the respective cells based at least in part on the respective encoded vectors associated with the respective cells and information relating to the respective clusters of cells, which can be retrieved from the cell cluster repository. The NN can determine whether the defined abnormal condition associated with the cell has occurred based at least in part on the classification of the cell, in accordance with the defined network security criteria. For example, the NN can determine whether the encoded vector (e.g., 2×1 vector) associated with the cell is outside of a vector range associated with the cluster of cells with which the cell belongs. If the NN determines that the encoded vector associated with the cell is inside of (e.g., within) the vector range associated with the cluster of cells, the NN can determine that there is no defined abnormal condition associated with the cell at this time, in accordance with the defined network security criteria. If, instead, the NN determines that the encoded vector (e.g., 2×1 vector) associated with the cell is outside of the vector range associated with the cluster of cells, the NN can determine that there is a defined abnormal condition associated with the cell, in accordance with the defined network security criteria. If the defined abnormal condition has been detected, the SMC or NN can generate an alert (e.g., alert or notification message) and can present (e.g., display or communicate) the alert to a user (e.g., a communication device or interface associated with the user), the connection manager component, or another component of or associated with the SMC to notify regarding the detection of the defined abnormal condition associated with the cell to facilitate performing a desired (e.g., appropriate, suitable, or optimal) response action (e.g., mitigation action or other action) to the defined abnormal condition, such as more fully described herein.

Figure 12:
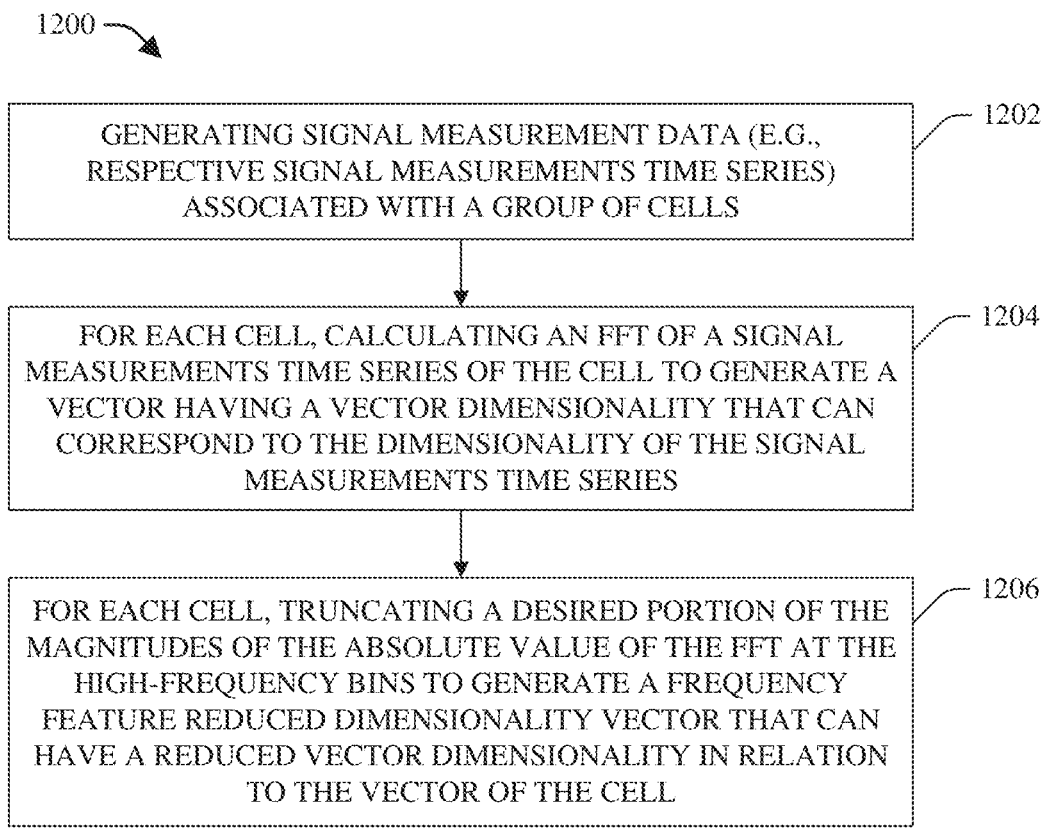
FIG. 12 depicts a flow chart of an example method that can perform feature reforming on signal measurement data associated with cells to facilitate reducing the vector dimensionality of the signal measurement data to facilitate enhancing encoding and/or decoding by neural networks to facilitate detection of abnormal conditions associated with cells, in accordance with various aspects and embodiments of the disclosed subject matter.

FIG. 12 depicts a flow chart of an example method 1200 that can perform feature reforming on signal measurement data associated with cells to facilitate reducing the vector dimensionality of the signal measurement data to facilitate enhancing encoding and/or decoding by NNs to facilitate detection of abnormal conditions associated with cells, in accordance with various aspects and embodiments of the disclosed subject matter. The method 1200 can be employed by, for example, a system comprising the SMC, a processor component (e.g., of or associated with the SMC), and/or a data store (e.g., of or associated with the SMC).

At 1202, signal measurement data (e.g., respective signal measurements time series) associated with a group of cells can be generated. The SMC can receive raw signal measurement data from the cells of the group of cells of a communication network (e.g., wireless, core, and/or cellular network). The SMC can generate (e.g., form) the signal measurement data based at least in part on the result of analyzing the raw signal measurement data, wherein the signal measurement data can comprise, for example, data regarding a signal measurements time series associated with the group of cells, and wherein respective portions of such data can be associated with respective cells of the group of cells. For instance, the SMC can generate a respective signal measurements time series for each cell of the group of cells. The length of time of a signal measurements time series can be virtually any desired length of time (e.g., a day, a week, a month, a year, or other desired length of time) and can have a desired granularity with regard to the timing of measurements of the signals (e.g., measurements every minute, every five minutes, every ten minutes, every fifteen minutes, every hour, every three hours, or another desired granularity for the signaling measurements). The signal measurement data can have a time dimensionality (e.g., 96×1 time dimensionality, 144×1 time dimensionality, or other time dimensionality) that can be based at least in part on the signaling measurement granularity and the time length of measurements of the signal measurements time series.

At 1204, for each cell, an FFT of a signal measurements time series of the cell can be calculated to generate a vector having a vector dimensionality that can correspond to the dimensionality of the signal measurements time series. For each cell of the group of cells, the SMC can determine or calculate the FFT of the signal measurements time series of the cell to generate a vector having a vector dimensionality that can correspond to the dimensionality of the signal measurements time series. For example, if the signal measurements time series associated with a cell has a dimensionality of 96×1, the SMC can determine or calculate the FFT of the signal measurements time series of the cell to generate a corresponding 96×1 vector that can be representative of (e.g., can correspond to) the signal measurements time series of the cell.

At 1206, for each cell, a desired portion of the magnitudes of the absolute value of the FFT at the high-frequency bins can be truncated to generate a frequency feature reduced dimensionality vector that can have a reduced vector dimensionality in relation to (e.g., as compared to) the vector of the cell. The SMC can truncate the desired portion (e.g., half or more than half) of the magnitudes of the absolute value of the FFT (e.g., |FFT|) at the high-frequency bins to generate a frequency feature dimensionality vector that can have a desirably reduced vector dimensionality (e.g., half or less than half of the vector dimensionality) in relation to the vector of the cell. For example, if the cell is associated with a 96×1 vector, the SMC can truncate half of the magnitudes of the absolute value of the FFT at the high-frequency bins to generate a frequency feature 48×1 vector that can have a desirably reduced (e.g., to half of the) vector dimensionality in relation to the 96×1 vector of the cell. As another example, if the cell is associated with a 96×1 vector, the SMC can truncate more than half of the magnitudes of the absolute value of the FFT at the high-frequency bins to generate a frequency feature 24×1 vector that can have a desirably reduced (e.g., to less than half of the) vector dimensionality in relation to the 96×1 vector of the cell.

In accordance with various embodiments, the SMC, employing a desired NN(s), can utilize the respective frequency feature reduced dimensionality vectors associated with the respective cells to facilitate NN selection, cluster assignment to facilitate clustering cells into clusters, and/or detection of outlier cells (e.g., cells that are experiencing abnormal or excessive signaling from communication devices), as more fully described herein.

Figure 13:
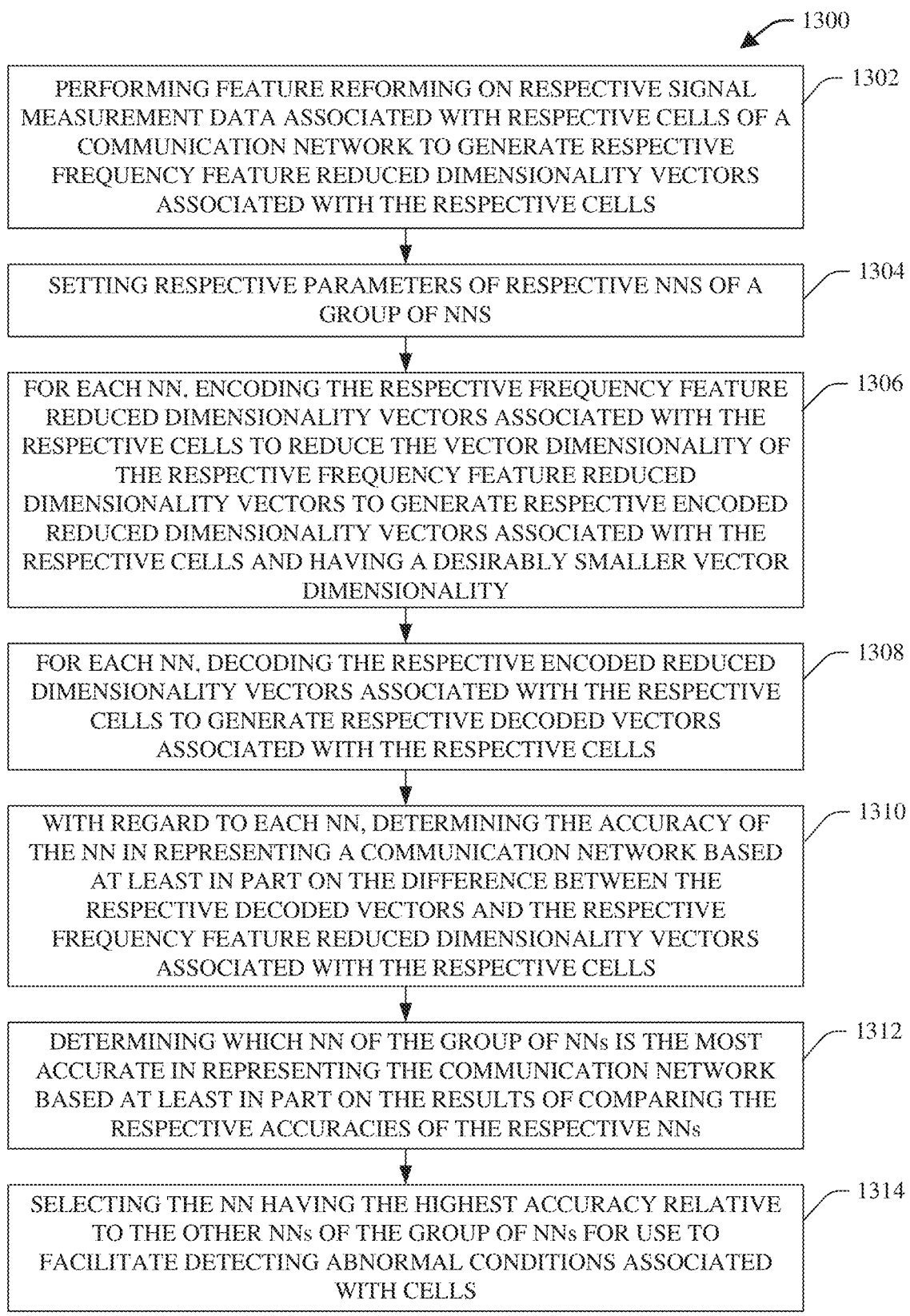
FIG. 13 illustrates a flow chart of an example method that can determine and select a desirable neural network from a group of neural networks where the desired neural network can be employed to facilitate detection of abnormal conditions associated with cells, in accordance with various aspects and embodiments of the disclosed subject matter.

FIG. 13 illustrates a flow chart of an example method 1300 that can determine and select a desirable NN from a group of NNs where the desired neural network can be employed to facilitate detection of abnormal conditions associated with cells, in accordance with various aspects and embodiments of the disclosed subject matter. The method 1300 can be employed by, for example, a system comprising the SMC, a processor component (e.g., of or associated with the SMC), and/or a data store (e.g., of or associated with the SMC).

At 1302, feature reforming can be performed on respective signal measurement data associated with respective cells of a communication network to generate respective frequency feature reduced dimensionality vectors associated with the respective cells. The SMC can perform feature reforming on the respective signal measurement data associated with the respective cells to generate the respective frequency feature reduced dimensionality vectors associated with the respective cells, as more fully described herein. The respective frequency feature reduced dimensionality vectors can have a desirably smaller or reduced vector dimensionality (e.g., 24×1, 48×1, or other smaller vector dimensionality) than the dimensionality (e.g., 96×1 or other higher dimensionality) of the respective signal measurement data. The respective frequency feature reduced dimensionality vectors associated with the respective cells can be representative of the respective signal measurement data associated with respective cells.

At 1304, respective parameters of respective NNs of a group of NNs can be set. The SMC can determine and/or set the respective parameters of the respective NNs of the group of NNs. The respective parameters can comprise or relate to encoding and decoding of data (e.g., frequency feature reduced dimensionality vectors). The respective parameters for the respective NNs can be different for different NNs. For instance, a first NN can be configured based at least in part on first parameters, a second NN can be configured based at least in part on second parameters, a third NN can be configured based at least in part on third parameters, and so on.

At 1306, for each NN, the respective frequency feature reduced dimensionality vectors associated with the respective cells can be encoded to reduce the vector dimensionality of the respective frequency feature reduced dimensionality vectors to generate respective encoded reduced dimensionality vectors associated with the respective cells and having a desirably smaller vector dimensionality. With regard to each NN, the NN (e.g., employing an auto encoder) can encode the respective frequency feature reduced dimensionality (e.g., 24×1 or 48×1) vectors associated with the respective cells to reduce the vector dimensionality of the respective frequency feature reduced dimensionality vectors to generate the respective encoded reduced dimensionality (e.g., 2×1) vectors associated with the respective cells and having the desirably smaller vector dimensionality (e.g., 2×1).

At 1308, for each NN, the respective encoded reduced dimensionality vectors associated with the respective cells can be decoded to generate respective decoded vectors associated with the respective cells. With regard to each NN, the NN (e.g., employing a decoder) can decode the respective encoded reduced dimensionality (e.g., 2×1) vectors associated with the respective cells to generate the respective decoded (e.g., 24×1 or 48×1) vectors associated with the respective cells. The decoded vectors associated with the cells can have the same dimensionality as the frequency feature reduced dimensionality vectors associated with the cells.

At 1310, with regard to each NN, the accuracy of the NN in representing a communication network (e.g., core or cellular network) can be determined based at least in part on the difference between the respective decoded vectors and the respective frequency feature reduced dimensionality vectors associated with the respective cells. With regard to each NN, the NN can determine (e.g., calculate) the accuracy of the NN in representing the communication network based at least in part on (e.g., as a function of) the difference between the output of the NN and the input of the NN. Accordingly, with regard to each NN, the NN can determine the accuracy of the NN in representing the communication network based at least in part on the difference between the respective decoded vectors and the respective frequency feature reduced dimensionality vectors associated with the respective cells.

At 1312, a determination can be made regarding which NN of the group of NNs is the most accurate in representing the communication network based at least in part on the results of comparing the respective accuracies of the respective NNs. The SMC or an NN can compare the respective accuracies of the respective NNs. Based at least in part on the results of the comparison, the SMC or NN can determine which NN of the group of NNs is the most accurate in representing the communication network. For example, the SMC or NN can determine which NN has the smallest amount of error or difference between the respective decoded vectors and the respective frequency feature reduced dimensionality vectors associated with the respective cells.

At 1314, the NN having the highest accuracy relative to the other NNs of the group of NNs can be selected for use to facilitate detecting abnormal conditions associated with cells. The SMC or an NN can select the NN, which is determined to have the highest accuracy (e.g., the smallest amount of error) relative to the other NNs, for use to facilitate detecting abnormal conditions associated with cells.

Figure 14:
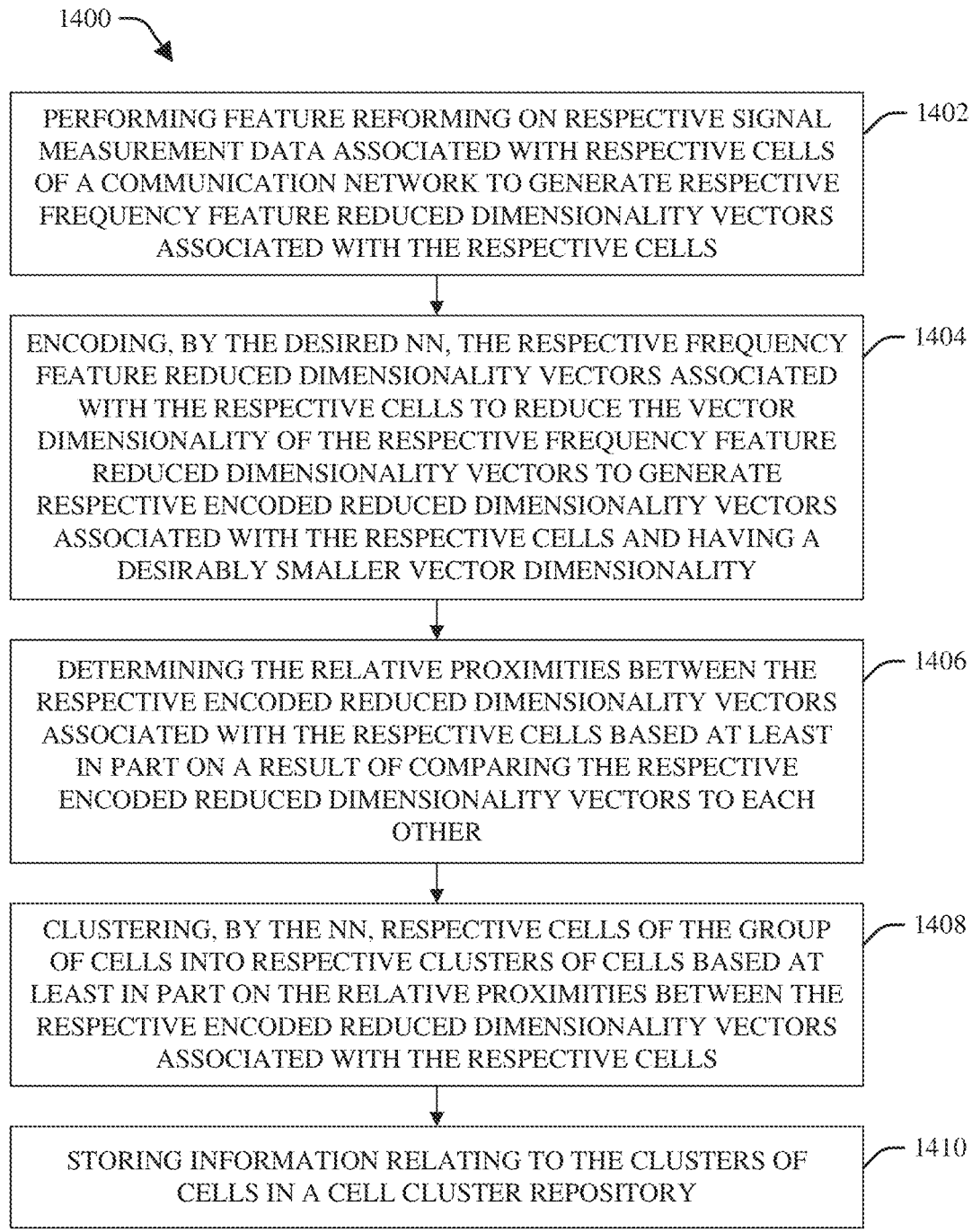
FIG. 14 depicts a flow chart of an example method that can desirably cluster cells into clusters where the clusters of cells can be used to facilitate detection of abnormal conditions associated with cells, in accordance with various aspects and embodiments of the disclosed subject matter.

FIG. 14 depicts a flow chart of an example method 1400 that can desirably cluster cells into clusters where the clusters of cells can be used to facilitate detection of abnormal conditions associated with cells, in accordance with various aspects and embodiments of the disclosed subject matter. The method 1400 can be employed by, for example, a system comprising the SMC, a processor component (e.g., of or associated with the SMC), and/or a data store (e.g., of or associated with the SMC). The SMC can comprise or be associated with a NN that can be selected from a group of NNs (e.g., due to being determined to be the most accurate NN) to be used to facilitate clustering cells into clusters (e.g., assigning cells to clusters) and detection of abnormal conditions associated with cells, as more fully described herein.

At 1402, feature reforming can be performed on respective signal measurement data associated with respective cells of a communication network to generate respective frequency feature reduced dimensionality vectors associated with the respective cells. The SMC can perform feature reforming on the respective signal measurement data associated with the respective cells to generate the respective frequency feature reduced dimensionality vectors associated with the respective cells, as more fully described herein. The respective frequency feature reduced dimensionality vectors can have a desirably smaller or reduced dimensionality (e.g., 24×1, 48×1, or other smaller vector dimensionality) than the dimensionality (e.g., 96×1 or other higher dimensionality) of the respective signal measurement data. The respective frequency feature reduced dimensionality vectors associated with the respective cells can be representative of the respective signal measurement data associated with the respective cells. In some embodiments, if the signal measurement data is the same data that was used during stage 1 of the multi-stage process to facilitate determining which NN of the group of NNs most accurately is representative of the communication network, the SMC can utilize the feature reforming results (e.g., the respective frequency feature reduced dimensionality vectors associated with the respective cells) from stage 1, instead of performing feature reforming on the same data again.

At 1404, the respective frequency feature reduced dimensionality vectors associated with the respective cells can be encoded, by the desired NN, to reduce the vector dimensionality of the respective frequency feature reduced dimensionality vectors to generate respective encoded reduced dimensionality vectors associated with the respective cells and having a desirably smaller vector dimensionality. The desired (e.g., selected and/or most accurate) NN (e.g., employing an auto encoder) can encode the respective frequency feature reduced dimensionality (e.g., 24×1 or 48×1) vectors associated with the respective cells to reduce the vector dimensionality of the respective frequency feature reduced dimensionality vectors to generate the respective encoded reduced dimensionality (e.g., 2×1) vectors associated with the respective cells and having the desirably smaller vector dimensionality (e.g., 2×1). The encoding performed by the NN can be based at least in part on the parameters (e.g., encoding parameters) selected for the NN by the SMC or user.

At 1406, the relative proximities between the respective encoded reduced dimensionality vectors associated with the respective cells can be determined based at least in part on a result of comparing the respective encoded reduced dimensionality vectors to each other. The NN can determine the relative proximities (e.g., distances or numerical differences) between the respective encoded reduced dimensionality vectors associated with the respective cells based at least in part on the result of comparing the respective encoded reduced dimensionality vectors to each other. In some embodiments, the NN can plot or overlay the respective encoded reduced dimensionality vectors in a 2-D area (e.g., on a 2-D graph) to facilitate determining identifying or determining the relative proximities between the respective encoded reduced dimensionality vectors associated with the respective cells.

At 1408, respective cells of the group of cells can be clustered, by the NN, into respective clusters of cells based at least in part on the relative proximities between the respective encoded reduced dimensionality vectors associated with the respective cells. The NN can cluster (e.g., iteratively cluster) the respective cells into the respective clusters of cells based at least in part on the relative proximities between the respective encoded reduced dimensionality vectors associated with the respective cells. For instance, the NN can iteratively cluster the respective cells into the respective clusters by identifying encoded reduced dimensionality vectors associated with cells where such vectors are in relative proximity to each other (e.g., relatively close to each other), as compared to other encoded reduced dimensionality vectors associated with other cells and clustering those cells together into a small cluster, and merging that smaller cluster of cells with (an)other smaller cluster(s) of cells that is determined to be in proximity to the smaller cluster of cells to form a larger cluster of cells, and continuing this iterative clustering process until a desired (e.g., defined) number of clusters of cells are formed.

At 1410, information relating to the clusters of cells can be stored in a cell cluster repository. The SMC or NN can store information relating to the clusters of cells in the cell cluster repository, which can be, or can be stored in, a data store. The information relating to the clusters of cells can indicate which cells are in which clusters, can identify or classify respective characteristics of the respective cell clusters and/or the respective cells within the respective cell clusters, and/or other desired information, as more fully described herein.

Figure 15:
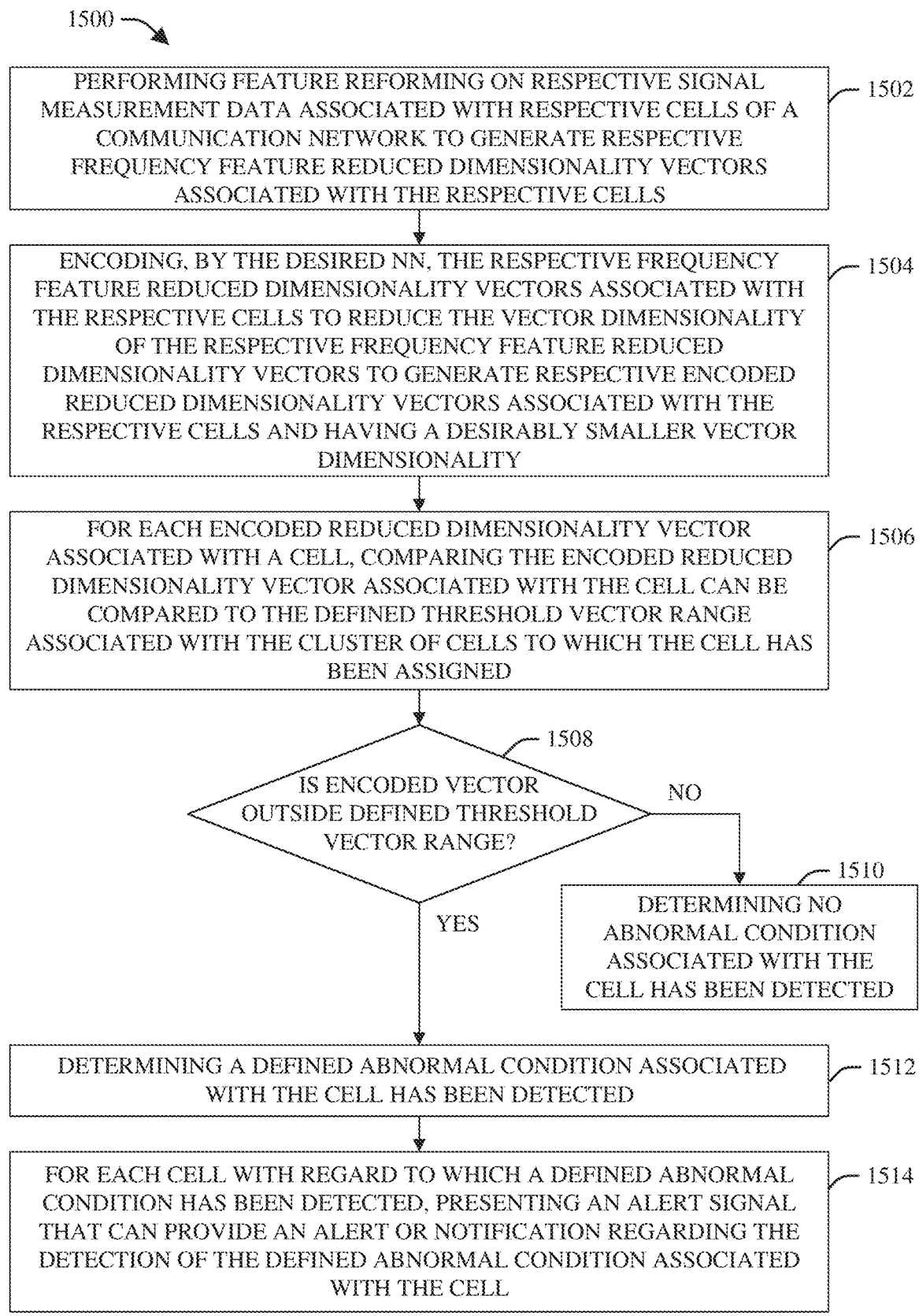
FIG. 15 illustrates a flow chart of an example method that can detect abnormal conditions associated with cells, in accordance with various aspects and embodiments of the disclosed subject matter.

FIG. 15 illustrates a flow chart of an example method 1500 that can detect abnormal conditions associated with cells, in accordance with various aspects and embodiments of the disclosed subject matter. The method 1500 can be employed by, for example, a system comprising the SMC, a processor component (e.g., of or associated with the SMC), and/or a data store (e.g., of or associated with the SMC). The SMC can comprise or be associated with a NN that can be selected from a group of NNs (e.g., due to being determined to be the most accurate NN) to be used to facilitate detecting abnormal conditions associated with cells.

At 1502, feature reforming can be performed on respective signal measurement data associated with respective cells of a communication network to generate respective frequency feature reduced dimensionality vectors associated with the respective cells. The SMC can perform feature reforming on the respective signal measurement data associated with the respective cells to generate the respective frequency feature reduced dimensionality vectors associated with the respective cells, as more fully described herein. The respective frequency feature reduced dimensionality vectors can have a desirably smaller or reduced vector dimensionality (e.g., 24×1, 48×1, or other smaller vector dimensionality) than the dimensionality (e.g., 96×1 or other higher dimensionality) of the respective signal measurement data. The respective frequency feature reduced dimensionality vectors associated with the respective cells can be representative of the respective signal measurement data associated with the respective cells. The signal measurement data can be different signal measurement data than what was used during stage 1 and stage 2 of the multi-stage process.

At 1504, the respective frequency feature reduced dimensionality vectors associated with the respective cells can be encoded, by the desired NN, to reduce the vector dimensionality of the respective frequency feature reduced dimensionality vectors to generate respective encoded reduced dimensionality vectors associated with the respective cells and having a desirably smaller vector dimensionality. The desired (e.g., selected and/or most accurate) NN (e.g., employing an auto encoder) can encode the respective frequency feature reduced vector dimensionality (e.g., 24×1 or 48×1) vectors associated with the respective cells to reduce the vector dimensionality of the respective frequency feature reduced dimensionality vectors to generate the respective encoded reduced dimensionality (e.g., 2×1) vectors associated with the respective cells and having the desirably smaller vector dimensionality (e.g., 2×1). The encoding performed by the NN can be based at least in part on the parameters (e.g., encoding parameters) selected for the NN by the SMC or user.

At 1506, for each encoded reduced dimensionality vector associated with a cell, the encoded reduced dimensionality vector associated with the cell can be compared to the defined threshold vector range associated with the cluster of cells to which the cell has been assigned. For each encoded reduced dimensionality vector associated with a cell, the desired NN can compare the encoded reduced dimensionality vector associated with the cell to the defined threshold vector range associated with the cluster of cells to which the cell has been assigned to facilitate determining whether the cell is an outlier with regard to its cell cluster, which can indicate abnormal behavior by the cell, or is operating within the defined threshold vector range associated with the cell cluster. The defined threshold vector range can be the vector range associated with the cell cluster or can be based at least in part on the vector range associated with the cell cluster, in accordance with the defined network security criteria, as more fully described herein.

At 1508, for each encoded reduced dimensionality vector associated with a cell, a determination can be made regarding whether the encoded reduced dimensionality vector associated with the cell is outside of the defined threshold vector range associated with the cell cluster to which the cell is assigned, based at least in part on the comparison result. For each encoded reduced dimensionality vector associated with a cell, the desired NN can determine whether the encoded reduced dimensionality vector associated with the cell is outside of the defined threshold vector range associated with the cell cluster to which the cell is assigned, based at least in part on the comparison result.

For each encoded reduced dimensionality vector associated with a cell, if, at 1508, based at least in part on the comparison result, it is determined that the encoded reduced dimensionality vector associated with the cell is within the defined threshold vector range associated with the cell cluster to which the cell is assigned, at 1510, it can be determined that no abnormal condition associated with the cell has been detected. For each encoded reduced dimensionality vector associated with a cell, if, based at least in part on the comparison result, the desired NN determines that the encoded reduced dimensionality vector associated with the cell is within the defined threshold vector range associated with its cell cluster, the NN can determine that no abnormal condition (e.g., no abnormal signaling condition) associated with the cell has been detected (e.g., the signaling associated with the cell is normal).

Referring again to reference numeral 1508, for each encoded reduced dimensionality vector associated with a cell, if, at 1508, based at least in part on the comparison result, it is determined that the encoded reduced dimensionality vector associated with the cell is outside of the defined threshold vector range associated with the cell cluster to which the cell is assigned, at 1512, it can be determined that a defined abnormal condition associated with the cell has been detected. For each encoded reduced dimensionality vector associated with a cell, if, based at least in part on the comparison result, the NN determines that the encoded reduced dimensionality vector associated with the cell is outside of the defined threshold vector range associated with its cell cluster, the NN can determine that the defined abnormal condition (e.g., an abnormal or excessive signaling condition) associated with the cell has been detected.

At 1514, for each cell with regard to which a defined abnormal condition has been detected, an alert signal can be presented, wherein the alert signal can provide an alert or notification regarding the detection of the defined abnormal condition associated with the cell. For each cell with regard to which a defined abnormal condition has been detected, the SMC or NN can generate an alert signal, wherein the alert signal can provide an alert or notification regarding the detection of the defined abnormal condition associated with the cell. The SMC or NN can present (e.g., display or communicate) the alert signal to a communication device, interface component, detector component, connection manager component, RAN, base station, cell, and/or user to facilitate providing a notification regarding the detected abnormal condition associated with the cell and/or to facilitate initiating a response action (e.g., mitigation action or other desired action) to respond to and/or mitigate the detected abnormal condition associated with the cell, as more fully described herein.

Figure 16:
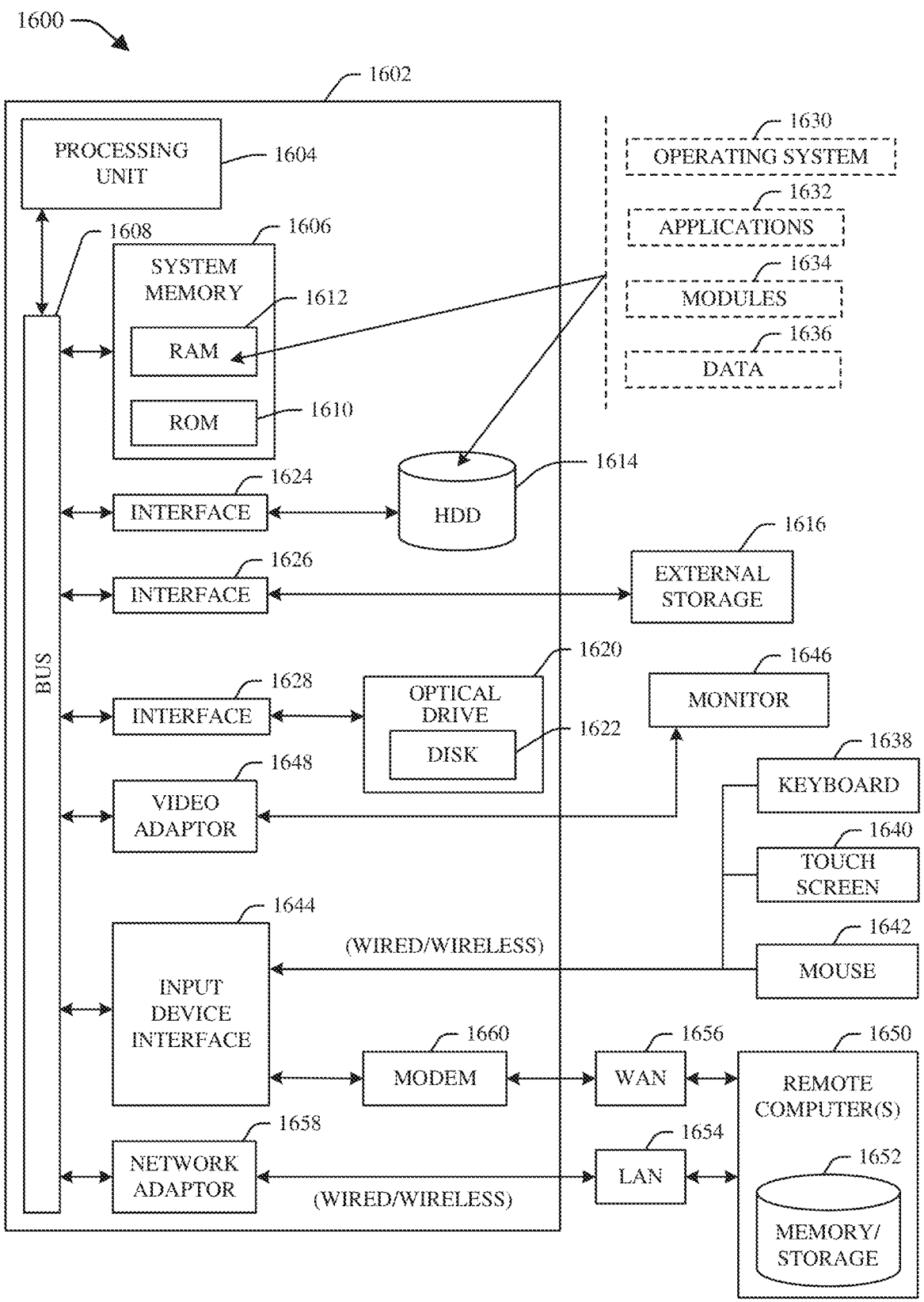
FIG. 16 is a schematic block diagram illustrating a suitable computing environment in which the various embodiments of the embodiments described herein can be implemented.

In order to provide additional context for various embodiments described herein, FIG. 16 and the following discussion are intended to provide a brief, general description of a suitable computing environment 1600 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance, with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH™ interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656, e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be noted that aspects, features, and/or advantages of the disclosed subject matter can be exploited in substantially any wireless telecommunication or radio technology, e.g., Wi-Fi; Gi-Fi; Hi-Fi; BLUETOOTH™; worldwide interoperability for microwave access (WiMAX); enhanced general packet radio service (enhanced GPRS); third generation partnership project (3GPP) long term evolution (LTE); third generation partnership project 2 (3GPP2) ultra mobile broadband (UMB); 3GPP universal mobile telecommunication system (UMTS); high speed packet access (HSPA); high speed downlink packet access (HSDPA); high speed uplink packet access (HSUPA); GSM (global system for mobile communications) EDGE (enhanced data rates for GSM evolution) radio access network (GERAN); UMTS terrestrial radio access network (UTRAN); LTE advanced (LTE-A); etc. Additionally, some or all of the aspects described herein can be exploited in legacy telecommunication technologies, e.g., GSM. In addition, mobile as well non-mobile networks (e.g., the internet, data service network such as internet protocol television (IPTV), etc.) can exploit aspects or features described herein.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field PGA (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component", "system", "platform", "framework", "layer", "interface", "agent", and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment" (UE), "mobile station," "mobile," "wireless device," "wireless communication device," "subscriber station," "subscriber equipment," "access terminal," "terminal," "handset," and similar terminology are used herein to refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point" (AP), "base station," "node B," "evolved node B" (eNode B or eNB), "home node B" (HNB), "home access point" (HAP), and the like are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "owner," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., communication device, RAN, cell, base station, communication network, security management component, NN component, feature reformer component, detector component, connection manager component, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
based on a first analysis of first signal measurement data representative of first signal measurements of first signals associated with a group of cell devices, determining, by a system comprising a processor, a neural network of a group of neural networks to utilize to determine a representation of a cellular network, comprising the group of cell devices;
clustering, by the system using the neural network, respective cell devices of the group of cell devices into respective clusters of cell devices based on a second analysis of second signal measurement data representative of second signal measurements of second signals associated with the group of cell devices; and
determining, by the system using the neural network, whether a defined abnormal condition associated with a cell device of a cluster of cell devices, of the respective clusters of cell devices, has occurred based on a third analysis of third signal measurement data representative of third signal measurements of third signals associated with the group of cell devices, based on classifying the cell device, and based on a defined network security criterion that defines the defined abnormal condition,
wherein the classifying of the cell device comprises classifying, by the system using the neural network, the respective cell devices, comprising the cell device, based on respective encoded reduced dimensionality vectors associated with the respective cell devices and information relating to the respective clusters of cell devices, and wherein the respective encoded reduced dimensionality vectors are generated based on performing feature reforming of the third signal measurement data to generate respective frequency feature reduced dimensionality vectors and encoding the respective frequency feature reduced dimensionality vectors.

2. The method of claim 1, wherein the neural network is a first neural network, wherein the group of neural networks comprises the first neural network and a second neural network, wherein the first neural network is created based on first parameter values of parameters, and wherein the second neural network is created based on second parameter values of the parameters.

3. The method of claim 1, wherein the feature reforming is first feature reforming, wherein the respective frequency feature reduced dimensionality vectors are respective first frequency feature reduced dimensionality vectors, and wherein the method further comprises:
as part of the first analysis, performing, by the system, second feature reforming on the first signal measurement data to reduce a dimensionality of vectors representative of the first signal measurement data to generate respective second frequency feature reduced dimensionality vectors that are representative of the first signal measurement data, wherein the reduced dimensionality is lower than the dimensionality.

4. The method of claim 3, further comprising:
as part of the feature reforming:
performing, by the system, a fast Fourier transform on the first signal measurement data to generate respective frequency feature vectors representative of the first signal measurement data; and
truncating, by the system, magnitudes of an absolute value of the fast Fourier transform with regard to the respective frequency feature vectors to reduce the dimensionality to generate the respective second frequency feature reduced dimensionality vectors.

5. The method of claim 3, wherein the respective encoded reduced dimensionality vectors are respective first encoded reduced dimensionality vectors, and wherein the method further comprises:
respectively encoding, by respective neural networks of the group of neural networks, the respective second frequency feature reduced dimensionality vectors to generate respective second encoded reduced dimensionality vectors representative of the first signal measurement data, wherein the respective second encoded reduced dimensionality vectors have a lower dimensionality than the respective second frequency feature reduced dimensionality vectors.

6. The method of claim 5, further comprising:
respectively decoding, by the system using the respective neural networks, the respective second encoded reduced dimensionality vectors to generate respective decoded versions of the respective second encoded reduced dimensionality vectors representative of the first signal measurement data;
comparing, by the system, the respective second frequency feature reduced dimensionality vectors to the respective decoded versions of the respective second encoded reduced dimensionality vectors; and
based on the comparing, determining, by the system, respective differences between the respective second frequency feature reduced dimensionality vectors and the respective second encoded reduced dimensionality vectors,
wherein the determining of the neural network of the group of neural networks comprises determining the neural network of the group of neural networks to utilize to determine the representation of the cellular network based on the respective differences, and wherein the neural network is associated with a smallest difference of the respective differences relative to other differences of the respective differences that are associated with other neural networks of the group of neural networks.

7. The method of claim 1, wherein the feature reforming is first feature reforming, wherein the respective frequency feature reduced dimensionality vectors are respective first frequency feature reduced dimensionality vectors, wherein the respective encoded reduced dimensionality vectors are respective first encoded reduced dimensionality vectors, and wherein the method further comprises:
performing, by the system, second feature reforming of the second signal measurement data to generate respective second frequency feature reduced dimensionality vectors that are representative of the second signal measurement data;
encoding, by the system using the neural network, the respective second frequency feature reduced dimensionality vectors to generate respective second encoded reduced dimensionality vectors representative of the second signal measurement data, wherein the respective second encoded reduced dimensionality vectors have a lower dimensionality than the respective second frequency feature reduced dimensionality vectors; and
determining, by the system using the neural network, relative distances between the respective second encoded reduced dimensionality vectors associated with the respective cell devices, wherein the clustering comprises iteratively clustering, by the system using the neural network, the respective cell devices into the respective clusters of cell devices based on the relative distances between the respective second encoded reduced dimensionality vectors associated with the respective cell devices.

8. The method of claim 1, comprising:
storing, by the system, cluster information relating to the respective clusters of cell devices in a cell cluster repository.

9. The method of claim 1, further comprising:
performing, by the system, the feature reforming of the third signal measurement data to generate the respective frequency feature reduced dimensionality vectors that are representative of the third signal measurement data; and
encoding, by the system using the neural network, the respective frequency feature reduced dimensionality vectors to generate the respective encoded reduced dimensionality vectors representative of the third signal measurement data, wherein the respective encoded reduced dimensionality vectors have a lower dimensionality than the respective frequency feature reduced dimensionality vectors, and wherein the respective encoded reduced dimensionality vectors are associated with the respective cell devices.

10. The method of claim 9, wherein the respective encoded reduced dimensionality vectors comprise an encoded reduced dimensionality vector associated with the cell device, and wherein the determining whether the defined abnormal condition associated with the cell device has occurred based on the classification of the cell device comprises:
determining, by the system using the neural network, the defined abnormal condition associated with the cell device has occurred, in response to determining that the encoded reduced dimensionality vector associated with the cell device is outside of a vector range associated with the cluster of cell devices; or
determining, by the system using the neural network, no defined abnormal condition associated with the cell device has occurred, in response to determining that the encoded reduced dimensionality vector associated with the cell device is within the vector range associated with the cluster of cell devices.

11. The method of claim 10, wherein the determining that the defined abnormal condition associated with the cell device has occurred indicates that at least one device associated with the cell device is an excessive signaling device.

12. The method of claim 1, wherein the second signal measurement data comprises same data as, or comprises different data than, the first signal measurement data, and wherein the first signal measurement data comprises a first time series of first signal measurements in a first time sequence order, the second signal measurement data comprises a second time series of second signal measurements in a second time sequence order, and the third signal measurement data comprises a third time series of third signal measurements in a third time sequence order.

13. The method of claim 1, wherein the first signal measurement data, the second signal measurement data, or the third signal measurement data comprise data relating to an attach request signal, an update attach request signal, an authentication update request, a packet data network gateway update request, a connection request signal, or a device handover-related signal.

14. A system, comprising:
a processor; and
a memory that stores executable instructions that, when executed by the processor, facilitate performance of operations, comprising:
based on a first analysis of first signal measurement information associated with a group of cell devices, determining a neural network of a group of neural networks to utilize to determine a behavioral representation of the group of cell devices with regard to signals;
clustering, based on first information from the neural network, respective cell devices of the group of cell devices into respective clusters of cell devices based on a second analysis of second signal measurement information associated with the group of cell devices, wherein the respective clusters comprise a cluster of cell devices that comprises a cell device; and
determining, based on the first information from the neural network, whether a defined anomalous condition associated with the cell device has occurred based on a third analysis of third signal measurement information associated with the group of cell devices, based on classifying the cell device, and based on a defined network security criterion relating to defining the defined anomalous condition, wherein the defined anomalous condition relates to anomalous signaling,
wherein the classifying of the cell device comprises classifying the respective cell devices based on the respective encoded reduced dimensionality vectors associated with the respective cell devices and second information relating to the respective clusters of cell devices, and wherein the respective encoded reduced dimensionality vectors are determined based on performing feature reforming of the third signal measurement information to generate respective frequency feature reduced dimensionality vectors and encoding the respective frequency feature reduced dimensionality vectors.

15. The system of claim 14, wherein the feature reforming is first feature reforming, wherein the respective frequency feature reduced dimensionality vectors are respective first frequency feature reduced dimensionality vectors, and wherein the operations further comprise:
  as part of the first analysis, performing second feature reforming on the first signal measurement information to reduce a dimensionality of vectors representative of the first signal measurement information to generate respective second frequency feature reduced dimensionality vectors that are representative of the first signal measurement information, wherein the reduced dimensionality is smaller than the dimensionality.

16. The system of claim 15, wherein the respective encoded reduced dimensionality vectors are respective first encoded reduced dimensionality vectors, wherein the determining of the neural network of the group of neural networks to utilize to determine the behavioral representation of the group of cell devices comprises determining the neural network of the group of neural networks based on determining that the neural network encodes the respective second frequency feature reduced dimensionality vectors to generate respective second encoded reduced dimensionality vectors and decodes the respective second encoded reduced dimensionality vectors to generate respective decoded versions of the respective second encoded reduced dimensionality vectors more accurately than other neural networks of the group of neural networks, and wherein the respective second encoded reduced dimensionality vectors have a smaller dimensionality than the respective second frequency feature reduced dimensionality vectors.

17. The system of claim 14, wherein the feature reforming is first feature reforming, wherein the respective frequency feature reduced dimensionality vectors are respective first frequency feature reduced dimensionality vectors, and wherein the operations further comprise:
  performing second feature reforming of the second signal measurement information to generate respective second frequency feature reduced dimensionality vectors that are representative of the second signal measurement information;
  encoding, based on the first information from the neural network, the respective second frequency feature reduced dimensionality vectors to generate respective second encoded reduced dimensionality vectors representative of the second signal measurement information, wherein the respective second encoded reduced dimensionality vectors have a smaller dimensionality than the respective second frequency feature reduced dimensionality vectors; and
  determining, based on the first information from the neural network, relative distances between the respective second encoded reduced dimensionality vectors associated with the respective cell devices, wherein the clustering comprises iteratively clustering, based on the first information from the neural network, the respective cell devices into the respective clusters of cell devices based on the relative distances between the respective second encoded reduced dimensionality vectors associated with the respective cell devices.

18. The system of claim 14, wherein the operations further comprise:
  performing the feature reforming of the third signal measurement information to generate the respective frequency feature reduced dimensionality vectors that are representative of the third signal measurement information; and
  encoding, based on the first information from the neural network, the respective frequency feature reduced dimensionality vectors to generate the respective encoded reduced dimensionality vectors representative of the third signal measurement information, wherein the respective encoded reduced dimensionality vectors have a smaller dimensionality than the respective frequency feature reduced dimensionality vectors, and wherein the respective encoded reduced dimensionality vectors are associated with the respective cell devices.

19. A non-transitory machine-readable medium, comprising executable instructions that, when executed by a processor, facilitate performance of operations, comprising:
  based on a first evaluation of first signal measurement data representative of first measurements of first signals associated with a group of cell devices, determining a neural network of a group of neural networks to employ to determine a signal behavior representation of the group of cell devices;
  clustering, via the neural network, respective cell devices of the group of cell devices into respective clusters of cell devices based on a second evaluation of second signal measurement data representative of second measurements of second signals associated with the group of cell devices, wherein the respective clusters comprise a cluster of cell devices that comprises a cell device; and
  determining, via the neural network, whether a defined anomalous condition associated with the cell device has occurred based on a third evaluation of third signal measurement data representative of third measurements of third signals associated with the group of cell devices, based on classifying the cell device, and based on a defined network security criterion that indicates what constitutes the defined anomalous condition, wherein the defined anomalous condition relates to excessive signaling,
  wherein the classifying of the cell device comprises classifying, via the neural network, the respective cell devices, comprising the cell device, based on respective encoded reduced dimensionality vectors associated with the respective cell devices and information relating to the respective clusters of cell devices, and wherein the respective encoded reduced dimensionality vectors are based on performing feature reforming of the third signal measurement data to generate respective frequency feature reduced dimensionality vectors and encoding the respective frequency feature reduced dimensionality vectors.

20. The non-transitory machine-readable medium of claim 19, wherein the respective frequency feature reduced dimensionality vectors are respective third frequency feature reduced dimensionality vectors, and wherein the operations further comprise:
  to facilitate performing encoding associated with the first signal measurement data, the second signal measurement data, or the third signal measurement data, respectively:
    as part of the first evaluation, performing first feature reforming on the first signal measurement data to generate respective first frequency feature reduced dimensionality vectors that are representative of the first signal measurement data, wherein the respective first frequency feature reduced dimensionality vectors have a smaller dimensionality than the first signal measurement data;
as part of the second evaluation, performing second feature reforming on the second signal measurement data to generate respective second frequency feature reduced dimensionality vectors that are representative of the second signal measurement data, wherein the respective second frequency feature reduced dimensionality vectors have the smaller dimensionality than the second signal measurement data; or
as part of the third evaluation, performing third feature reforming on the third signal measurement data to generate the respective third frequency feature reduced dimensionality vectors that are representative of the third signal measurement data, wherein the third frequency feature reduced dimensionality vectors have the smaller dimensionality than the signal measurement data.

\* \* \* \* \*